(12) United States Patent
Okubo et al.

(10) Patent No.: US 7,510,366 B2
(45) Date of Patent: Mar. 31, 2009

(54) VERTICAL AXIS TYPE WIND POWER STATION

(75) Inventors: Kazuo Okubo, Ise (JP); Kazumichi Kato, Ise (JP); Hirosuke Imabayashi, Ise (JP); Toshio Miki, Ise (JP); Hideki Tamura, Ise (JP); Hiroo Mike, Ise (JP); Akira Shiozaki, Ise (JP); Yushi Sato, Ise (JP); Tomoyuki Matsunaga, Ise (JP); Tetsuyuki Kimura, Ise (JP); Nobuhiro Saito, Ise (JP); Hiroki Kataoka, Ise (JP)

(73) Assignee: Shinko Electric Co., Ltd., Tokyo (JP)

( * ) Notice: Subject to any disclaimer, the term of this patent is extended or adjusted under 35 U.S.C. 154(b) by 0 days.

(21) Appl. No.: 10/489,307

(22) PCT Filed: Jan. 7, 2004

(86) PCT No.: PCT/JP2004/000034

§ 371 (c)(1),
(2), (4) Date: Oct. 20, 2005

(87) PCT Pub. No.: WO2004/109100

PCT Pub. Date: Dec. 16, 2004

(65) Prior Publication Data

US 2006/0120872 A1    Jun. 8, 2006

(30) Foreign Application Priority Data

| Jun. 9, 2003 | (JP) | ............................. 2003-164266 |
| Jun. 18, 2003 | (JP) | ............................. 2003-173752 |
| Jul. 15, 2003 | (JP) | ............................. 2003-196964 |
| Sep. 12, 2003 | (JP) | ............................. 2003-321452 |
| Oct. 22, 2003 | (JP) | ............................. 2003-361399 |
| Oct. 23, 2003 | (JP) | ............................. 2003-363098 |
| Oct. 23, 2003 | (JP) | ............................. 2003-363107 |
| Oct. 24, 2003 | (JP) | ............................. 2003-364241 |

(51) Int. Cl.
*F03D 3/00* (2006.01)

(52) U.S. Cl. .................... 415/4.4; 415/229; 415/907; 416/135; 416/210 R; 416/211; 416/226; 416/235; 416/232; 416/244 R

(58) Field of Classification Search ............... 415/4.2, 415/4.4, 204, 229, 907; 416/210 R, 211, 416/226, 235, 236 R, 239, 232, 244 R, 142; 290/44, 55

See application file for complete search history.

(56) References Cited

U.S. PATENT DOCUMENTS 3,400,904 A * 9/1968 Bede ........................ 244/124

(Continued)

FOREIGN PATENT DOCUMENTS

EP    1568883 A2 *  8/2005

(Continued)

*Primary Examiner*—Ninh H Nguyen
(74) *Attorney, Agent, or Firm*—Oblon, Spivak, McClelland, Maier & Neustadt, P.C.

(57) ABSTRACT

A vertical axis type wind power station and a blade manufacturing process, which can stabilize the turning motions of blades and can raise the power generation efficiency by lightening the blades to smoothen the turning motions of the blades; a structure and method for mounting the wind-driven device of a wind power station, by which the wind-driven device can be easily disposed at the upper portion of a building; and a windbreak wind power plant for breaking the wind by using the vertical axis type wind power stations or wind-driven devices arranged along the shoreline or the like.

38 Claims, 38 Drawing Sheets

U.S. PATENT DOCUMENTS

| | | | |
|---|---|---|---|
| 3,970,409 A * | 7/1976 | Luchuk | 416/145 |
| 4,255,085 A * | 3/1981 | Evans | 416/197 A |
| 4,274,809 A * | 6/1981 | Delgado et al. | 416/117 |
| 4,430,044 A * | 2/1984 | Liljegren | 416/119 |
| 4,452,568 A * | 6/1984 | Andersson | 416/119 |
| 4,525,124 A * | 6/1985 | Watson et al. | 416/132 B |
| 4,625,256 A * | 11/1986 | Scuka et al. | 361/117 |
| 4,979,871 A * | 12/1990 | Reiner | 415/4.2 |
| 5,419,683 A * | 5/1995 | Peace | 416/227 A |
| 6,602,045 B2 * | 8/2003 | Hickey | 415/1 |
| 6,755,608 B2 * | 6/2004 | Boughton | 415/4.5 |
| D511,495 S * | 11/2005 | Okubo et al. | D13/115 |

FOREIGN PATENT DOCUMENTS

| | | |
|---|---|---|
| JP | 57-32076 | 2/1982 |
| JP | 57-126263 | 8/1982 |
| JP | 63-154865 | 6/1988 |
| JP | 2-8699 | 1/1990 |
| JP | 2-144673 | 12/1990 |
| JP | 3-16360 | 4/1991 |
| JP | 6-330843 | 11/1994 |
| JP | 2000-234582 | 8/2000 |
| JP | 3075953 | 12/2000 |
| JP | 2001-271738 | 10/2001 |
| JP | 2002-364517 | 12/2002 |
| JP | 2003-104294 | 4/2003 |
| JP | 2003-206849 | 7/2003 |
| JP | 2003-278638 | 10/2003 |
| RU | 2000469 C | 9/1993 |
| SU | 992799 | 1/1983 |
| SU | 1671954 A1 | 8/1991 |

* cited by examiner

WIND

US 7,510,366 B2

VERTICAL AXIS TYPE WIND POWER STATION

TECHNICAL FIELD

The present invention relates to: improvements in a vertical axis type wind power station having a vertical blade Darrieus type device, which has longitudinal blades disposed along a rotating post perpendicular to a wind direction and turned by the wind in the rotating direction of the rotating post; a structure and method for mounting the wind-driven device of the wind power station; and a windbreak wind power plant.

BACKGROUND ART

The technique such as the vertical axis type wind power station or wind power plant has been well known in the art.

An example is disclosed in JP-A-10-110666. What is disclosed in JP-A-10-110666 is the straight-blade vertical axis (H-Darrieus) type wind-driven device, the blades of which are fixed at their two end portions by a pair of support members positioned in the vertical direction along the direction of the rotating post. For preventing the global warming or for rational use of energy, on the other hand, the wind-driven device has to be disposed at a higher position for a higher electric power thereby to increase the turning motions of the wind-driven device, as shown in FIG. 1, FIG. 2 and FIG. 7 of JP-A-10-110666. For this necessity, it is preferred that the wind-driven device is placed on the roof of a house or building (as will be generally called the "building").

In another vertical axis type wind-driven device of the prior art, on the other hand, blades made of glass fibers are supported by two upper and lower arms of glass fibers, which are horizontally extended from an upright rotating post made of a hollow outer rotor of a metal, as disclosed in Japanese Patent No. 3,368,537. Moreover, this wind-driven device is a straight blade type, in which straight blades are arranged around the vertical axis and connected to the post side through support blades. Considering the efficiency, the self-startability and the noises, the wind-driven device is intended to optimize the solidity, the angle of attachment and the blade thickness.

As disclosed in JP-A-2003-56447, on the other hand, there is a power generating wind-driven device, in which the portions of the device attaching the blades are made movable to switch the direction and angle of the pitch automatically according to the wind direction so that the turning direction of the device may always be constant no matter whether the wind direction might be changed to positive/negative directions. In place of the windbreak forest, the power generating wind-driven devices are disposed long in parallel for the windbreak purpose, and the wind is utilized to turn the devices so that the turning forces are connected to construct the windbreak power generating plant for driving the power generator.

However, the wind-driven devices may make the turning motions of the blades unstable, because they cannot arrange the flows of wind around the blades. For raising the power generation efficiency of the wind, moreover, it is still necessary to improve the structure of the blades. Depending on the situation of the building, still moreover, the wind-driven device cannot be disposed on the roof of the building and may be arranged on a pole fixed in the ground. In this case, the wind-driven device is exposed to a strong force by a strong wind, and the pole supporting the wind-driven device has to be reliably fixed in the ground. Therefore, it is necessary to take a long time for disposing the wind-driven device such as for digging the ground deeply. This necessity may raise the cost for the disposition.

On the other hand, the power generating wind-driven device of Japanese Patent No. 3,368,537 cannot sufficiently suppress the bending moment caused by the centrifugal force either at the joint portions between the arms and the blades or at the central portions of the blades. At the high-speed turning time of the blades, the bending moment rises to such a high value as may break the blades. In order to suppress the bending moment, measures have to be taken by thickening the arms or by raising the strength of the blades, thereby to invite a large weight of the vertical axis type wind-driven device. Moreover, the rotating post is subjected, when it receives a cross wind, to an extremely high bending moment. This makes it necessary to thicken the rotating post considerably and to enlarge the diameter of the bearings of the rotating post accordingly. This necessity raises a problem that the device is too much enlarged to be used as the power generating device.

In the power generating wind-driven device of JP-A-2003-56447, the direction and angle of the pitch are automatically switched according to the wind direction by making movable the blade attaching portions of the wind-driven device. Therefore, the adjoining wind-driven devices may contact with each other unless they are arranged at a predetermined or more spacing. This has made it impossible to achieve the efficient windbreak effects.

An object of the present invention is to provide: a vertical axis type wind power station and a blade manufacturing process, which can stabilize the turning motions of blades and can raise the power generation efficiency; a structure and method for mounting the wind-driven device of a wind power station, by which the wind-driven device can be easily disposed at the upper portion of a building; and a windbreak wind power plant for breaking the wind by using the wind power devices.

DISCLOSURE OF THE INVENTION

According to the invention, there is provided a vertical axis type wind power station comprising: a rotating post disposed upright; and a plurality of longitudinal blades attached in the circumferential direction to said rotating post, wherein said blades include horizontal straightening plates.

According to the invention, there is provided a vertical axis type wind power station comprising: a rotating post disposed upright; and a plurality of longitudinal blades attached in the circumferential direction to said rotating post, wherein said blades include: main supporting members longitudinal of said blades; a multiplicity of wings-like boards inserted into and fixed on said main supporting members; and contouring sheets applied around said wings-like boards.

According to the invention, there is provided a process for manufacturing a blade by inserting and fixing a multiplicity of wings-like boards to main supporting members in the longitudinal direction of the blade and by applying a contouring sheet around said wings-like board, comprising: a first step of positioning one end side of the contouring sheet with respect to one side of the wings-like boards and fixing the one end side of the contouring sheet on one face of said wings-like boards; and a second step of positioning the other end side of the contouring sheet with respect to the other face of said wings-like boards while pulling the other end side of the contouring sheet, and fixing the other end side of the contouring sheet on the other face of said wings-like boards.

According to the invention, there is provided a vertical axis type wind power station comprising: a rotating post disposed upright; and a plurality of longitudinal blades attached in the circumferential direction to said rotating post, wherein said rotating post includes transverse support members having leading ends to which the longitudinally intermediate portions of said blades are attached through hinges and spring members, so as to be inclined in the longitudinal direction of said blades.

According to the invention, there is provided a vertical axis type wind power station comprising: a rotating post disposed upright; and a plurality of longitudinal blades attached in the circumferential direction to said rotating post, wherein said rotating post includes transverse support members having leading ends to which the longitudinally intermediate portions of said blades are attached through hinges and spring members, so as to be inclined in the transverse direction of said blades.

According to the invention, there is provided a vertical axis type wind power station comprising: a rotating post disposed upright; and a plurality of longitudinal blades attached in the circumferential direction to said rotating post, wherein said rotating post is provided with transversely upward upper support members and transversely downward lower support members, and wherein said blades are attached at their longitudinally upper and lower portions to the leading ends of said upper support members and said lower support members.

According to the invention, there is provided a vertical axis type wind power station comprising: a rotating post disposed upright; and a plurality of longitudinal blades arranged in the circumferential direction of said rotating post, further comprising: a rotor mounted on the leading end of said rotating post; two upper and lower arms attached obliquely downward or upward to said rotor for supporting the two longitudinally upper and lower portions of the blade; and two intermediate arms attached to said rotors or said upper and lower arms, for supporting the two intermediate portions of said blade.

According to the invention, there is provided a vertical axis type wind power station comprising: a rotating post disposed upright; and a plurality of longitudinal blades attached in the circumferential direction to said rotating post, wherein said rotating post includes: an upper side rotating post on the side of said blade; a lower side rotating post on the side of a generator; and a fitting portion of the two rotating posts, and wherein said fitting portion is formed to have a fitting clearance at the portion to transmit a turning torque.

According to the invention, there is provided a vertical axis type wind power station comprising: a rotating post disposed upright; and a plurality of longitudinal blades attached in the circumferential direction to said rotating post, further comprising: a tube-shaped member arranging said rotating post therein; a radial bearing disposed at the upper portion or the intermediate portion in the tube-shaped member for supporting said rotating post rotatably; a thrust bearing arranged at the lower portion in said tube-shaped member for supporting said rotating post rotatably; and a bearing disposed near said thrust bearing and in the inner wall of said tube-shaped member with a clearance from said rotating post, wherein said rotating post contacts, when it is transversely rocked, with the bearing disposed in the inner wall of said tube-shaped member.

According to the invention, there is provided a vertical axis type wind power station comprising: a rotating post disposed upright; and a plurality of longitudinal blades attached in the circumferential direction to said rotating post, further comprising: an electric brush for leaking the electricity from said rotating post; or an insulating member sandwiched between said rotating post and the outer tube of the bearing for supporting said rotating post.

According to the invention, there is provided a vertical axis type wind power station comprising: a rotating post disposed upright; and a plurality of longitudinal blades attached in the circumferential direction to said rotating post, further comprising: a tube-shaped rotor arranged concentrically of the center axis of said rotating post and in the vicinity of the upper portion of said rotating post; a plate-shaped member disposed to have a horizontal flat face in said tube-shaped rotor; and a bearing for supporting said rotating post rotatably, wherein said tube-shaped rotor is connected to said rotating post through said plate-shaped member in the vicinity of the vertical center in said tube-shaped rotor, and wherein said bearing is arranged near just below said connected position.

According to the invention, there is provided a structure for mounting to a building a wind-driven device of a small-sized wind power station including: a rotating post disposed upright; and a plurality of longitudinal blades attached in the circumferential direction to said rotating post, comprising: a fixing pole having an upper end portion supporting said wind-driven device and having its lower end portion fixed in the ground; and a connecting member for connecting at least one portion of the region positioned above the central portion of said fixing pole, to said building.

According to the invention, there is provided a method for mounting to building a wind-driven device of a small-sized wind power station including: a rotating post disposed upright; and a plurality of longitudinal blades attached in the circumferential direction to said rotating post, comprising: attaching said wind-driven device to the leading end portion of a fixing pole; fixing the lower end portion of said fixing pole in the ground; and then connecting at least a portion of the region positioned above the central portion of said fixing pole, to said building.

According to the invention, there is provided a windbreak wind power plant comprising a plurality of vertical axis type wind power stations including: a rotating post disposed upright; and a plurality of longitudinal blades attached in the circumferential direction to said rotating post, wherein the individual ones of said vertical axis type wind power stations are closely arranged while keeping the blades of the adjoining ones of said vertical axis type wind power stations out of contact during the turning motions of said blades.

BRIEF DESCRIPTION OF THE DRAWINGS

FIG. 36(a) is a diagram showing the case, in which the vertical axis type wind power stations are arranged in only one row on the ground along the shoreline, and FIG. 36(b) is a diagram showing the case, in which the vertical axis type wind power stations of a second row are arranged on the land side between the rows of FIG. 36(a).

FIG. 38(a) is a side elevation showing the arrangement, in which the loci of turning motions of the blades overlap just at one point when the windbreak wind power plant is viewed from above, and FIG. 38(b) is a side elevation showing the arrangement, in which the loci of turning motions of the blades overlap when the windbreak wind power plant is viewed from above.

BEST MODE FOR CARRYING OUT THE INVENTION

Here will be specifically described embodiments of the present invention, to which the invention should not be limited.

Figure 1:
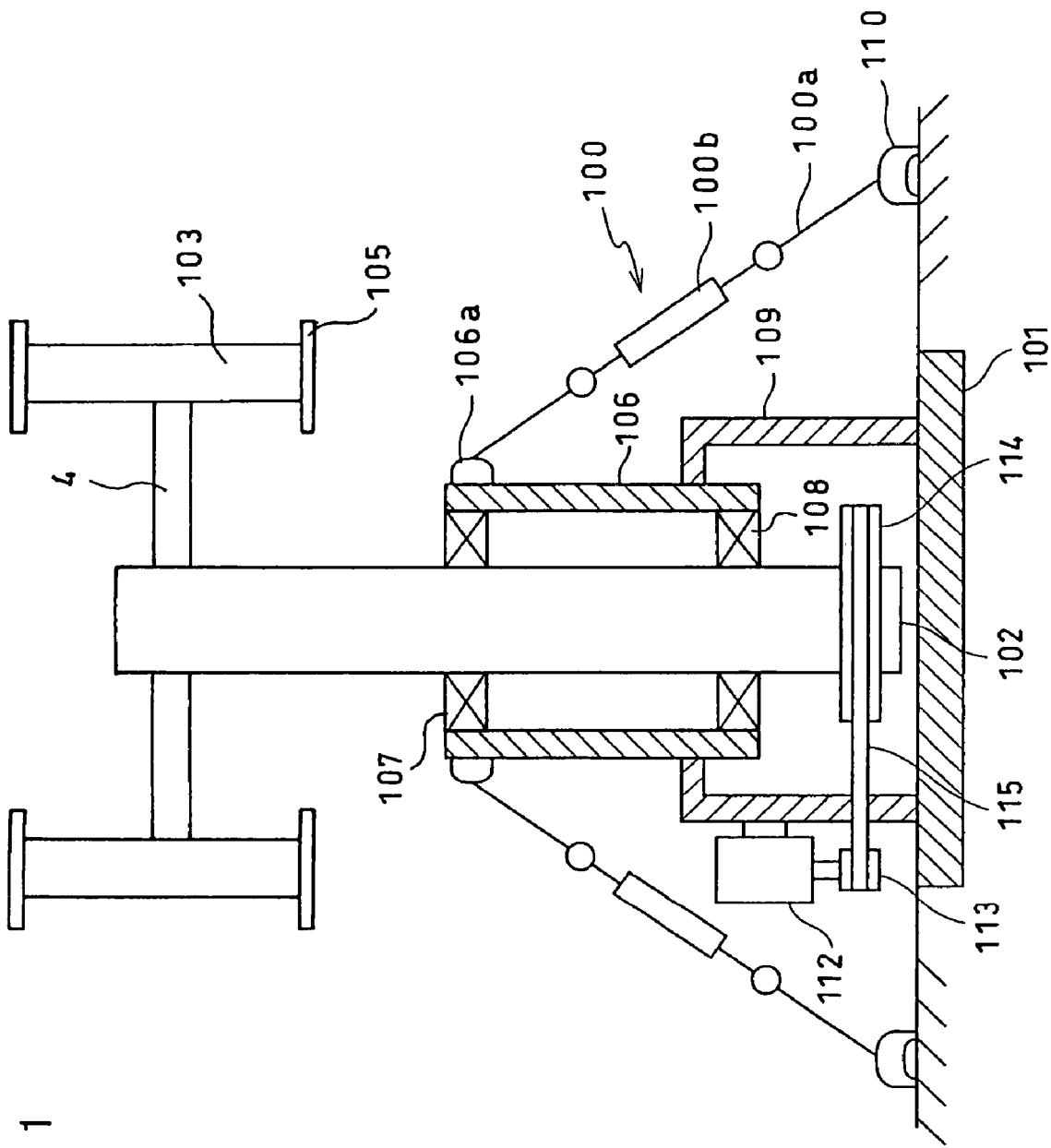
FIG. 1 is a sectional front elevation of a vertical axis type wind power station according to the invention.

FIG. 1 is a sectional front elevation of a vertical axis type wind power station according to the invention. Numeral 101 designates a foundation, which is formed of simple concrete. Numeral 102 designates a rotating post, which is held in an upright state by the later-described means. Numeral 103 designates blades for generating a force for the wind power generation. These blades 103 are arranged in plurality between the individual confronting faces of support members 104 fixed at the upper portion of the rotating post 102 and perpendicularly of the axial direction and along the circumferential edge portions of the support members 104. The blade 103 is provided at its upper and lower ends with straightening plates 105 for straightening the flows of wind around the blade 103. Numeral 106 designates a tube-shaped member, which positions the rotating post 102 in its internal space and supports the rotating post 102 rotatably with bearings 107 and 108 positioned in its upper and lower inner faces. Numeral 109 designates a member supporting frame member, which is so fixed at a suitable position of the foundation 101 as to hold the lower end portion of the tube-shaped member 106. Numeral 100 designates fixing wire means, which is composed of a wire 100a and a wire tension adjusting mechanism 100b for urging a tension to that wire 100a. The two ends of this fixing wire means 100 are arranged in at least three (with an interval of 120 degrees) positions between fixing portions 106a of the tube-shaped member 106 and fixing portions 100 on the ground side. And, the wire fixing means 100 constructs self-supporting means for keeping the vertical state of the rotating post 102, which is subjected to a stress from the wind pressure received by the blades 103, so that it might otherwise be displaced perpendicularly of the axis. Numeral 112 designates a power generator, which is fixed on the frame member 109 and provided with a pulley 113 on the rotating post. Numeral 114 designates a pulley, which is fixed on the rotating post 102 at the same height position as that of the pulley 113. Numeral 115 designates a belt, which engages with the pulleys 113 and 114 for transmitting the turning force of the rotating post 102 to the power generator 112. Alternatively, the belt 115 can also cause the power generator 112 to play the role of a starting motor in case the wind-driven device does not start because of the factors such as the positional relation between the wind direction and the blades or the strength of the wind.

Figure 2:
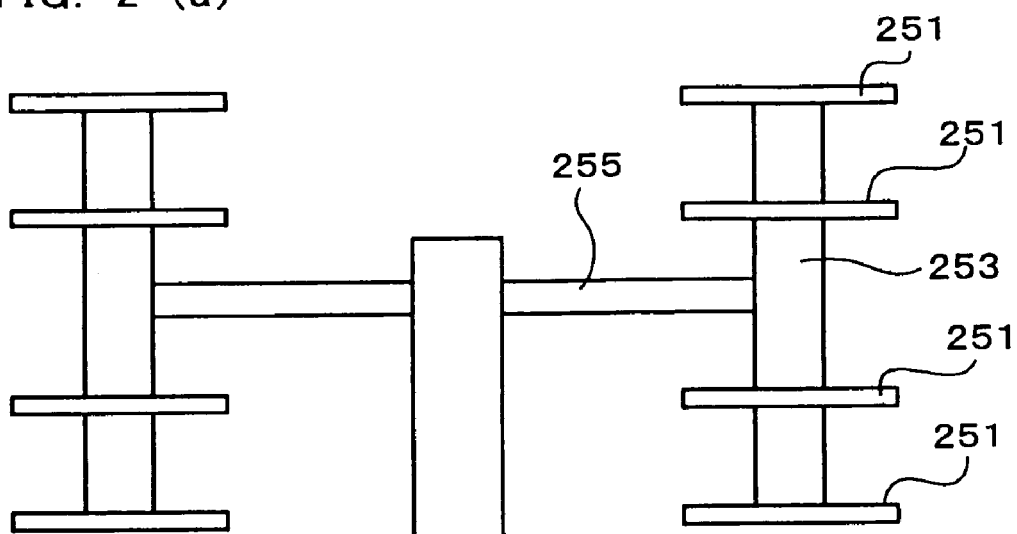
FIG. 2(a) is a diagram showing a mode of embodiment, in which four straightening plates are attached to the blade.
FIG. 2(b) is a perspective view of the blade, in which a straightening plate in FIG. 2(a) is attached upward with respect to the wind direction.
FIG. 2(c) is a side elevation of FIG. 2(b).
Figure 2:
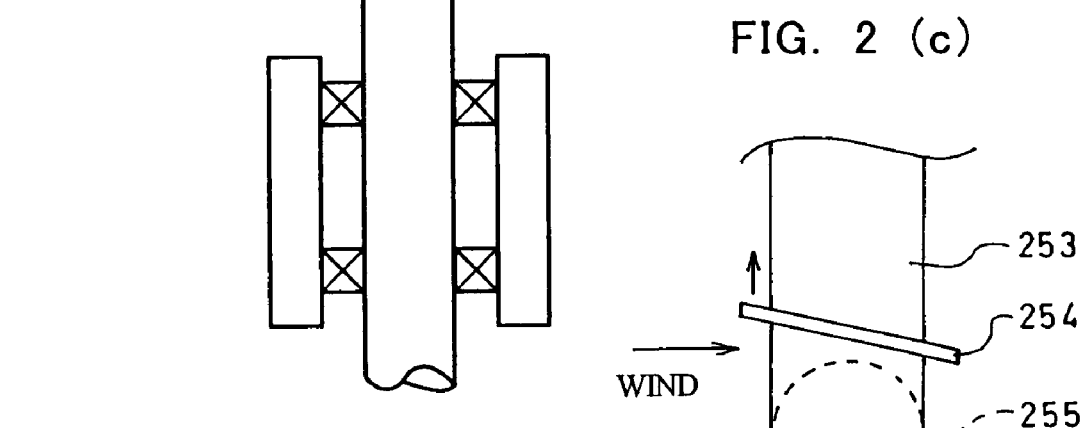
Figure 2:
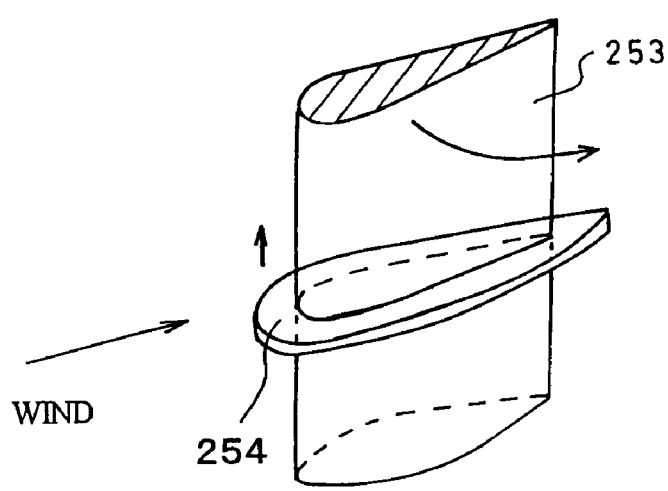

FIG. 2(a) is a diagram showing a mode of embodiment, in which four straightening plates are attached to the blade.

The straightening plates 251 are individually attached to the upper end portion and the lower end portion of the blade 253 and to the upper and lower midway portions of the joint portion of the blade 253 to a support member 255.

With the construction thus far described, it is possible to prevent leaks of the air flows from the blades and to silence the turning noises of the blades thereby to retain smooth rotations of the blades. This retention results in an efficient power generation.

Here, this mode of embodiment is exemplified by attaching the four straightening plates to each blade, but a necessary number of plates may be additionally attached to the midway portion of the blade.

FIGS. 2(b) and 2(c) are diagrams showing examples of the blades, in which a straightening plate 254 disposed near the support member 255 of FIG. 2(a) is attached upward with respect of the wind direction. The straightening plate 254 is attached at an inclination to the blade 253.

If the straightening plates are arranged in plurality, a lift can be generated to reduce the loads on the bearings. As a result, it is possible to raise the power generation efficiency due to the reduction in the mechanical loss of the bearings and to elongate the lifetime of the bearings. Moreover, the straightening plates receive such winds homogeneously as will flow off the ends of the blade, so that they can straighten the flow of the winds toward the blade more reliably thereby to adjust the rotations of the blade.

Figure 3:
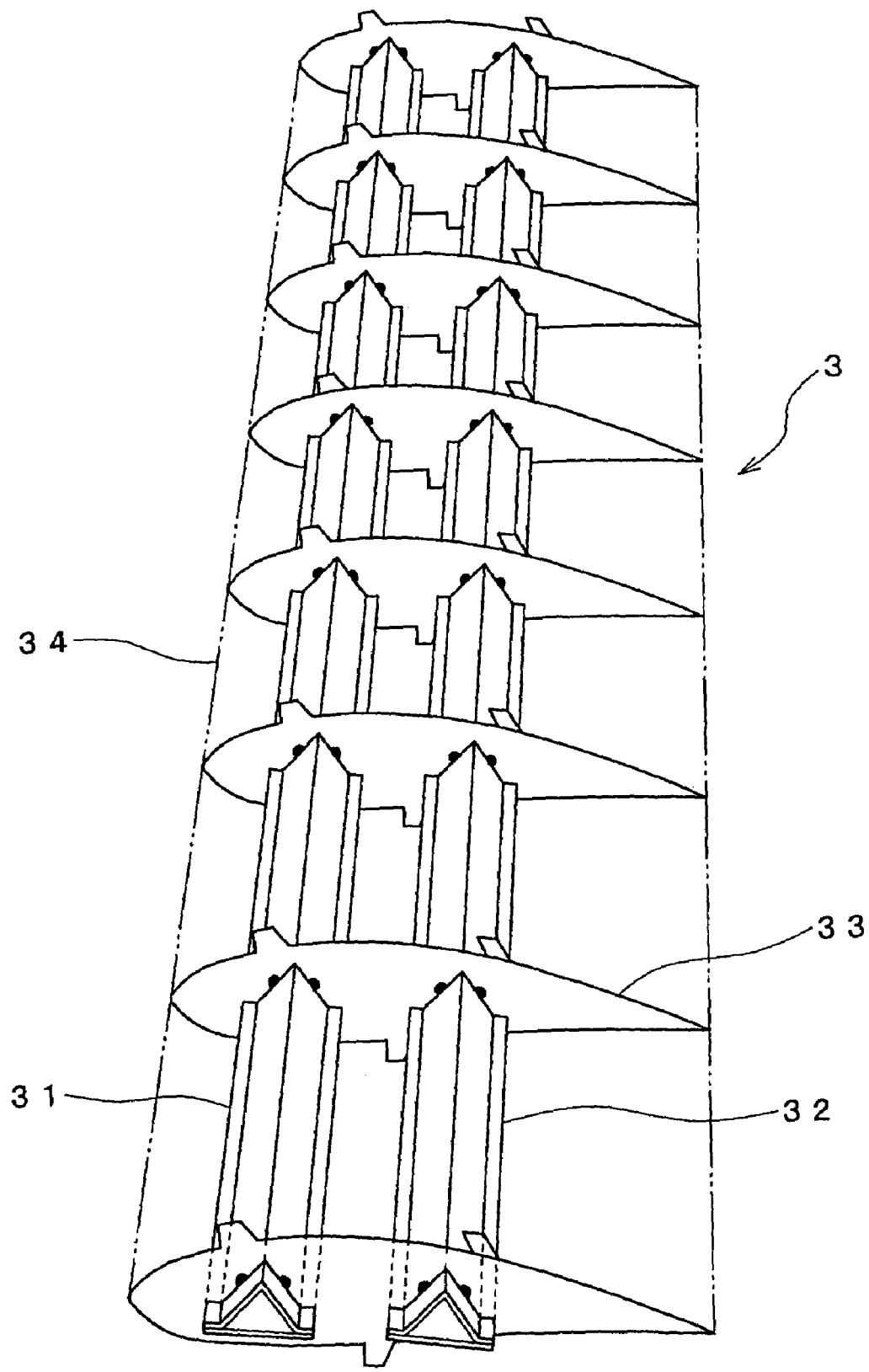
FIG. 3 is a perspective view showing the blade of a framed structure of the vertical axis type wind power station according to the invention with a contouring sheet being removed.
Figure 6:
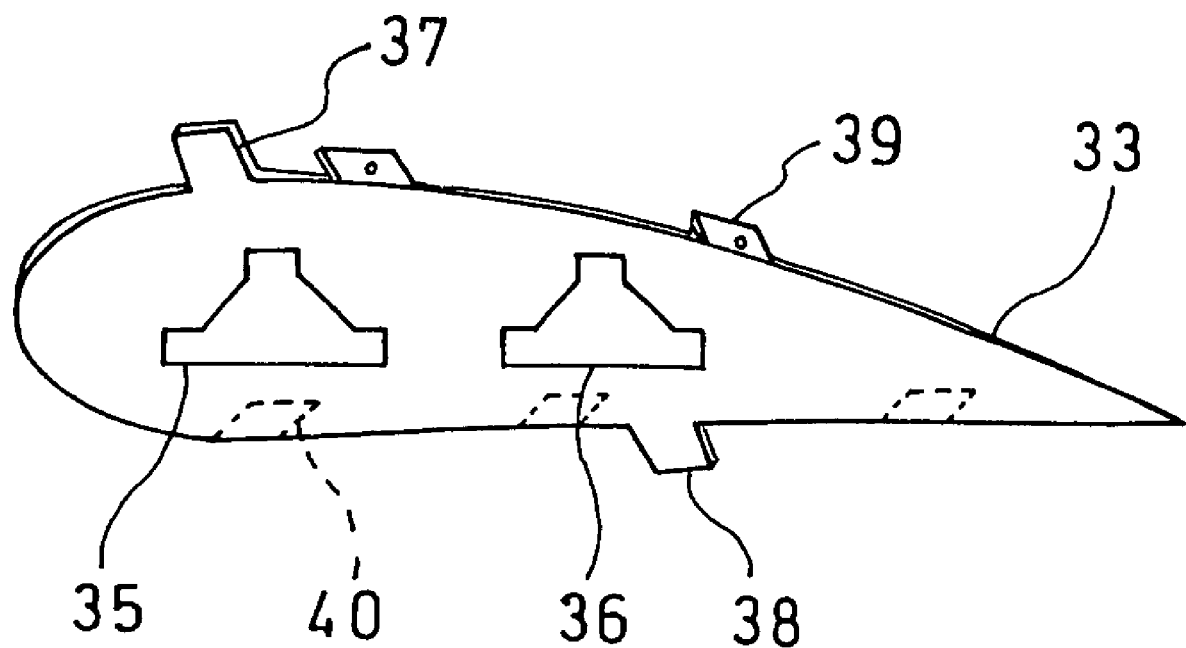
FIG. 6 is a perspective view of a wings-like board.
Figure 7A:
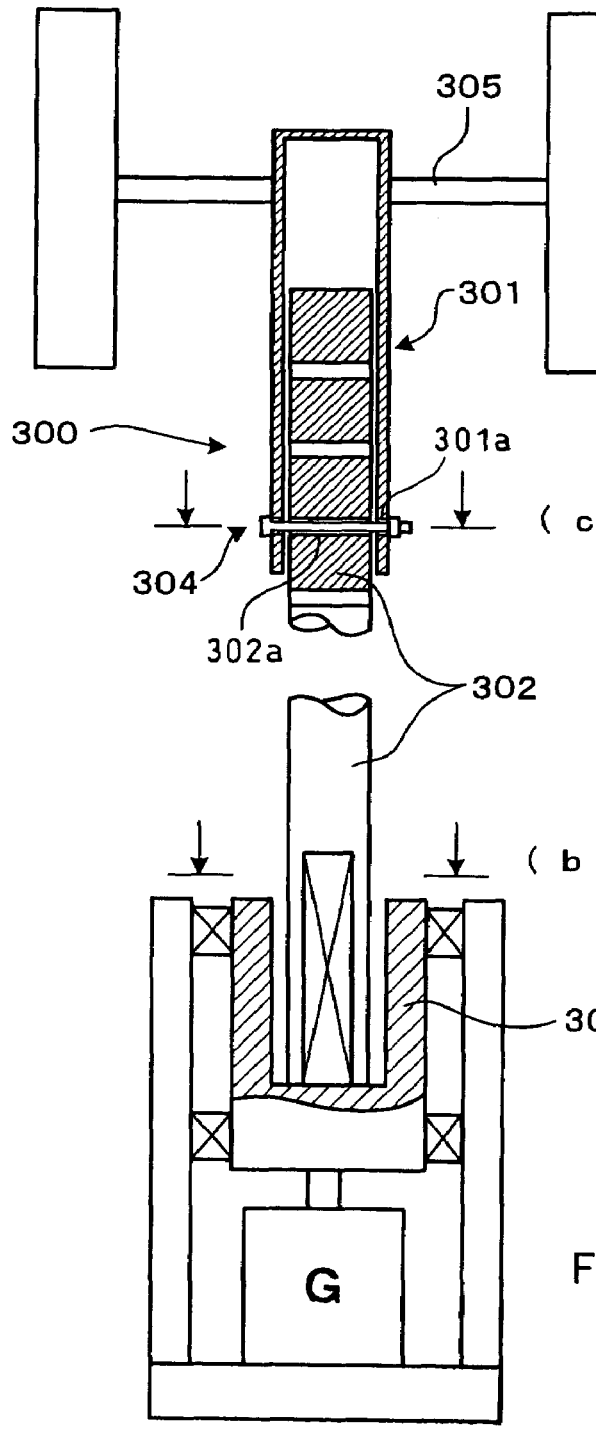
FIG. 7 is a diagram showing a rotating post height adjusting mechanism and a rotating post supporting mechanism.
Figure 7B:
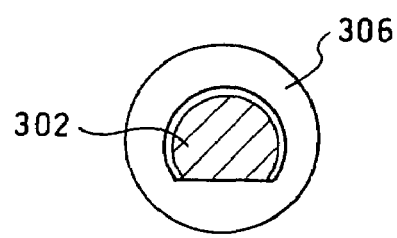
Figure 7C:
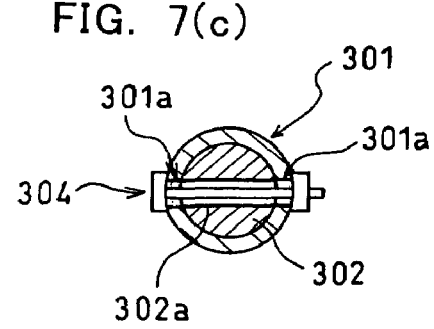
Figure 7D:
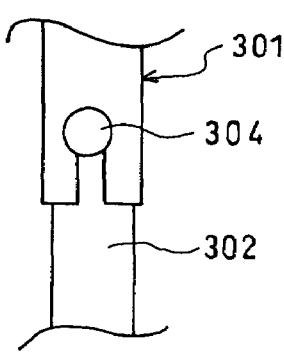

FIG. 3 is a perspective view showing a framed structure of a wind-driven device blade, and FIG. 6 is a perspective view of a wings-like board of the framed structure. The blade shown in FIG. 3 can be used as that of the vertical axis type wind power station of FIG. 1, for example.

Figure 27:
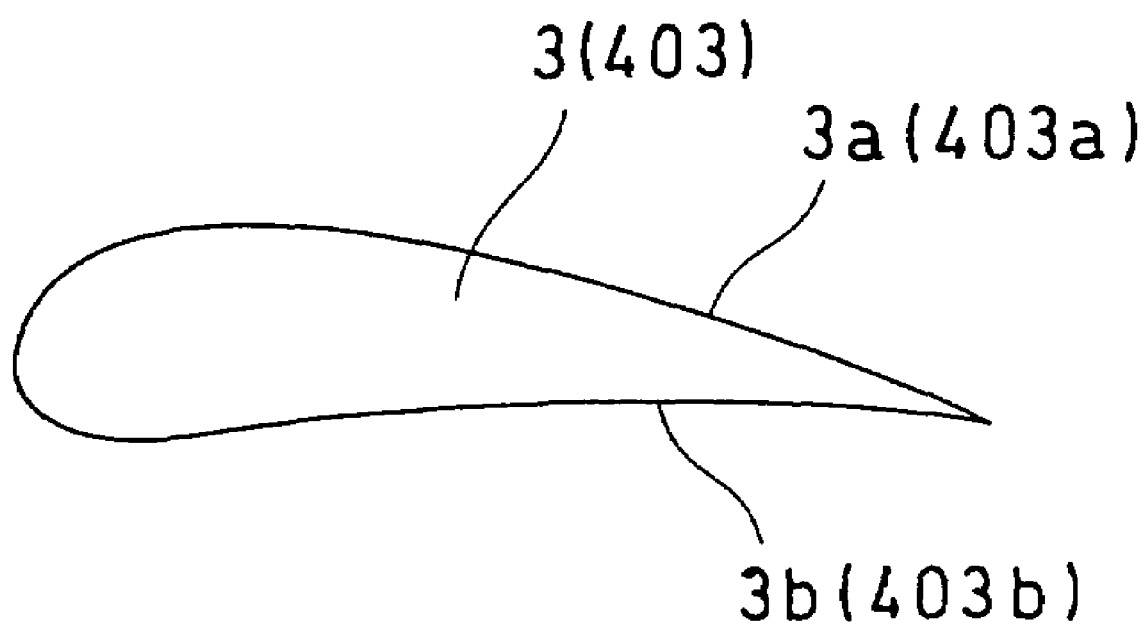
FIG. 27 is a diagram showing the sectional shape of a blade of the vertical axis type wind power station according to the invention.

As shown in FIG. 27, the blade 3 has a shape of the wing section of an aeroplane, and its one face 3a is formed convex to elongate the streamlines whereas its other face 3b is formed flat to shorten the stream lines. Here, the one face 3a should not be limited to the arrangement confronting the outside, as shown, but may also be arranged to confront the inside and to be in direction toward the axis.

In FIG. 3, the blade 3 is formed of a framed structure, which is composed of main supporting members 31 and 32 extending in the longitudinal direction of the blade; and a number of wings-like boards 33 fixed in inserting manner into those main supporting members 31 and 32; and a contouring sheet (or skin) 34 applied around the wings-like boards 33.

Figure 10:
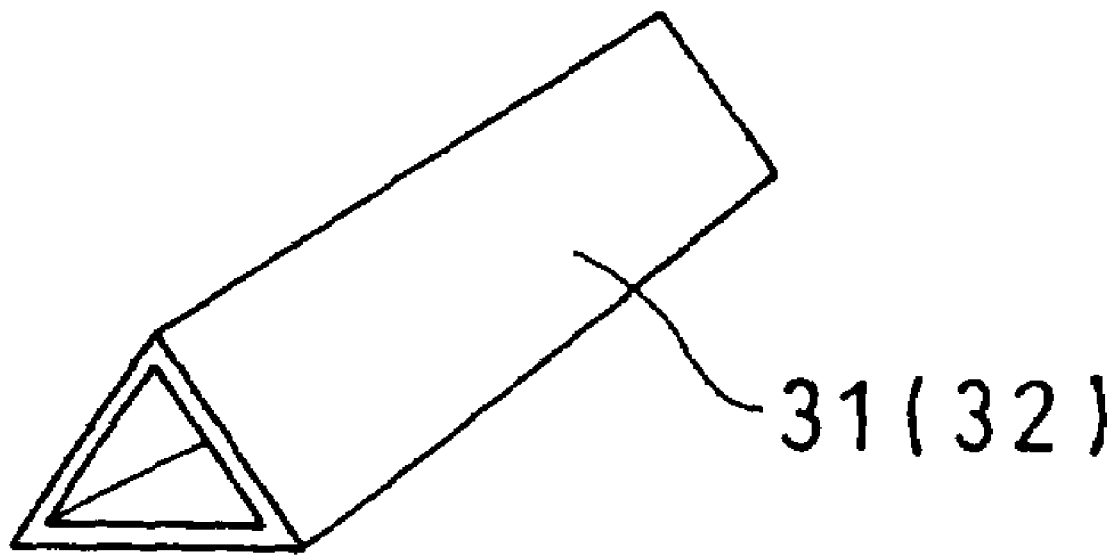
FIG. 10 is a perspective view of a main supporting member made of an extruded material.

The main supporting member 31 or 32 is formed of a hollow member of a triangular section and is either made of an extruded material of an aluminum alloy, as shown in FIG. 10, or formed by folding an aluminum alloy sheet or of a joint structure of an aluminum alloy sheet. The member used in FIG. 3 is manufactured by rivet jointing a first plate folded in a triangular shape and a second plate formed flat. The two main supporting members 31 and 32 are arranged across the wings-like board 33. Three main supporting members can also be arranged according to the size of the blade 3. Moreover, the aforementioned support members 12 and 13 are jointed to the main supporting members 31 and 32 by means of bolts or the like.

As shown in FIG. 6, the wings-like board 33 is prepared by pressing out an aluminum alloy sheet into the contour of the wings-like board. This pressing operation is done by using an NC machine. Therefore, the wings-like board 33 has a periphery fitted with approximate curves by a combination of straight lines. In another method, the wings-like board 33 is punched out with a so-shaped die.

The wings-like board 33 is formed of cut holes 35 and 36, into which the main supporting members 31 and 32 are to be inserted, and projections 37 and 38, through which the skin 34 described later is to be inserted and positioned, and is formed of a plurality of seats 39 and 40, on which the skin 34 is to be stabilized, by folding them at 90 degrees with respect to the wings-like board 33. The projection 37 and the two seats 39 are arranged on the convex face side of the wings-like board 33, and the projection 38 and the three seats 40 are arranged on the flat face side of the wings-like board 33.

As shown in FIG. 3, the wings-like boards 33 are inserted at a predetermined interval onto the main supporting members 31 and 32. And, the main supporting members 31 and 32 and the wings-like board 33 are fixed by welding them at a plurality of portions. By fixing the two members, the framed structure is made strong, as shown in FIG. 3.

The skin 34 or the contouring sheet is made of a thin sheet of an aluminum alloy and is applied around the wings-like board 33. The skin 34 is so placed on the seats 39 and 40 of the wings-like board 33 as to receive the projections 37 and 38 of the wings-like board 33. Here in FIG. 3, the projections 37 and 38 are left as they are, after the skin 34 was applied. However, the projections 37 and 38 may be either cut off along the surface of the skin 34 or folded along the skin 34. Moreover, the skin 34 is fixed on the seats 39 and 40 by means of rivets.

Figure 11:
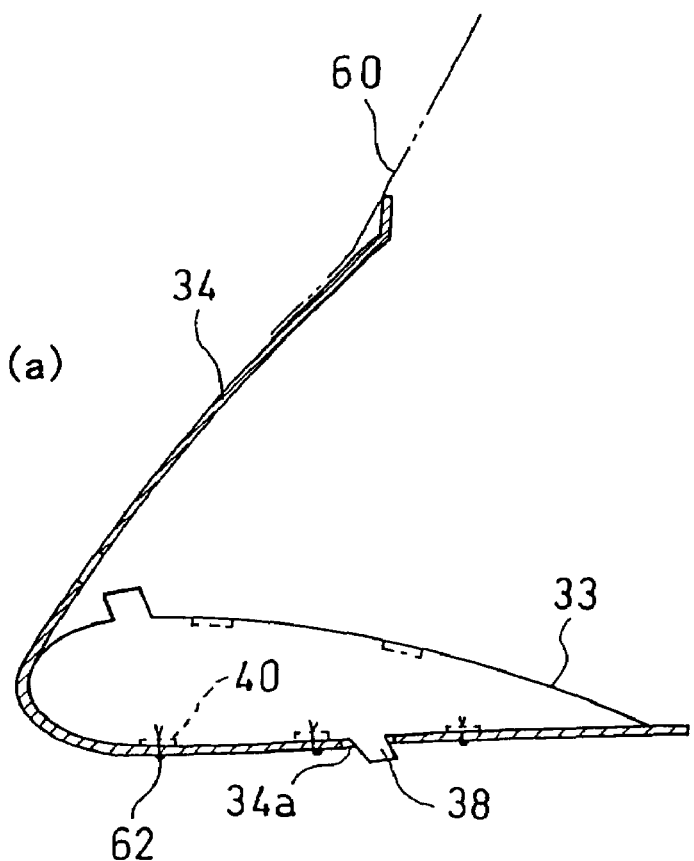
FIG. 11 is a diagram showing a process for applying a skin.
Figure 11:
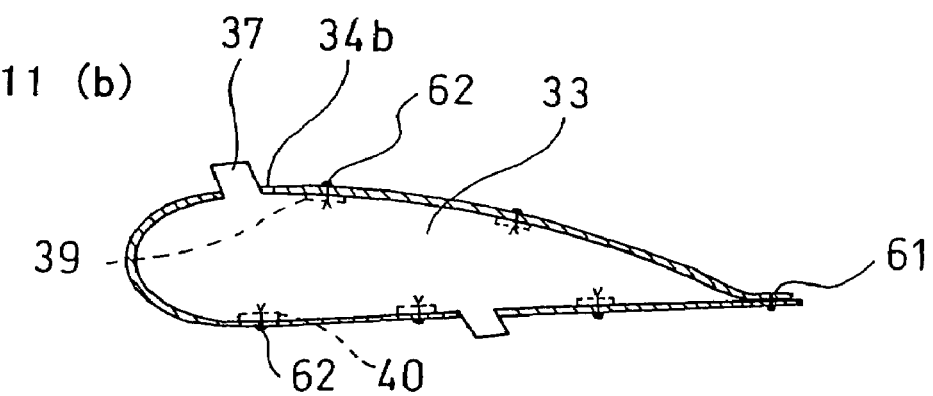
Figure 11:
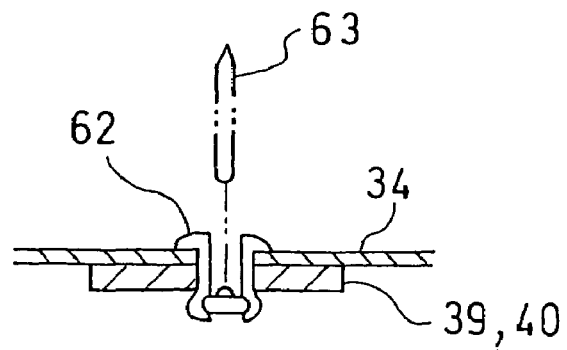

FIG. 11 shows a process for applying the skin 34.

[First Step]

As shown in FIG. 11(a), the skin 34 is positioned by inserting its one side hole 34a onto the projection 38 of the flat face (or one face) of the wings-like board 33 and is extended along the wings-like board 33 by pulling the other end side of the skin 34. This pulling operation is carried out by pulling an extending tape member 60 adhered to the other end side of the skin 34. With this extending tape member 60, the skin 34 can be homogeneously pulled out without any wrinkle.

And, the skin 34 is fixed on the seat 40 by means of rivets 62. As shown in FIG. 11(c), a blind rivet is used as the rivet 62. A blind rivet assembly is inserted into the preformed through hole of the seat 40 and a pin 63 is pulled out. Then, the blind rivet bulges at its lower portion so that the pin 63 is pushed out to form the fixed state by the rivet 62, as shown. Here, side of the flat face of seat 40 Here, the other end side of the skin 34 has a generally L-shaped character. The other end side of the skin 34 is folded out in advance so that it can be made to mate the one end side flatly.

[Second Step]

Next, the skin 34 is positioned by inserting the hole 34b of its other end side on the projection 37 on the convex face (or other face) of the wings-like board 33, as shown in FIG. 11(b), and is extended along the remaining portion of the wings-like board 33 by pulling the other end side of the skin 34. This pulling operation is carried out by pulling the extending tape member 60 adhered to the other end side of the skin 34. With this extending tape member 60, the skin 34 can be homogeneously pulled out without any wrinkle. And, the mating portions 61 of the one end side and the other end side of the skin 34 are fixed by spot-welding them.

And, the skin 34 is fixed on the seats 39 by means of the rivets 62. As shown in FIG. 11(c), a blind rivet is used as the rivet 62. A blind rivet assembly is inserted into the preformed through hole of the seat 39 from the side of the skin 34 and the pin 63 is pulled out. Then, the blind rivet bulges at its lower portion so that the pin 63 is pushed out to form the fixed state by the rivet 62, as shown.

The blade 3 formed by that process has a strength holding structure with the hollow main supporting members 31 and 32 of an aluminum alloy and has a shape holding structure with the wings-like boards 33 of an aluminum alloy. Moreover, the skin 34 can be positioned through the hole 34b of its other end side by the projection 37 so that it can be easily extended along the wings-like boards 33. Therefore, the contour of the blade 3 can be easily formed with the thin skin 34 of an aluminum alloy.

Thus, the blade 3 can be finished light and strong as a whole. As a result, the blade 3 can be efficiently turned by the wind acting thereon.

Here, the number of blades 3 attached to the vertical axis type wind power station may be two or more. Moreover, the blades 3 may be so concentrically arranged with a plurality of blades on the inner circumference side and a plurality of blades on the outer circumference side.

Moreover, the arrangement of the convex face of the blade 3 should not be limited to that toward the outer circumference, but the blade 3 may also have its flat face arranged toward the outer circumference.

The blades 3 are light and strong, as described above, so that a proper number of blades 3 can be efficiently turned with the wind.

Figure 12:
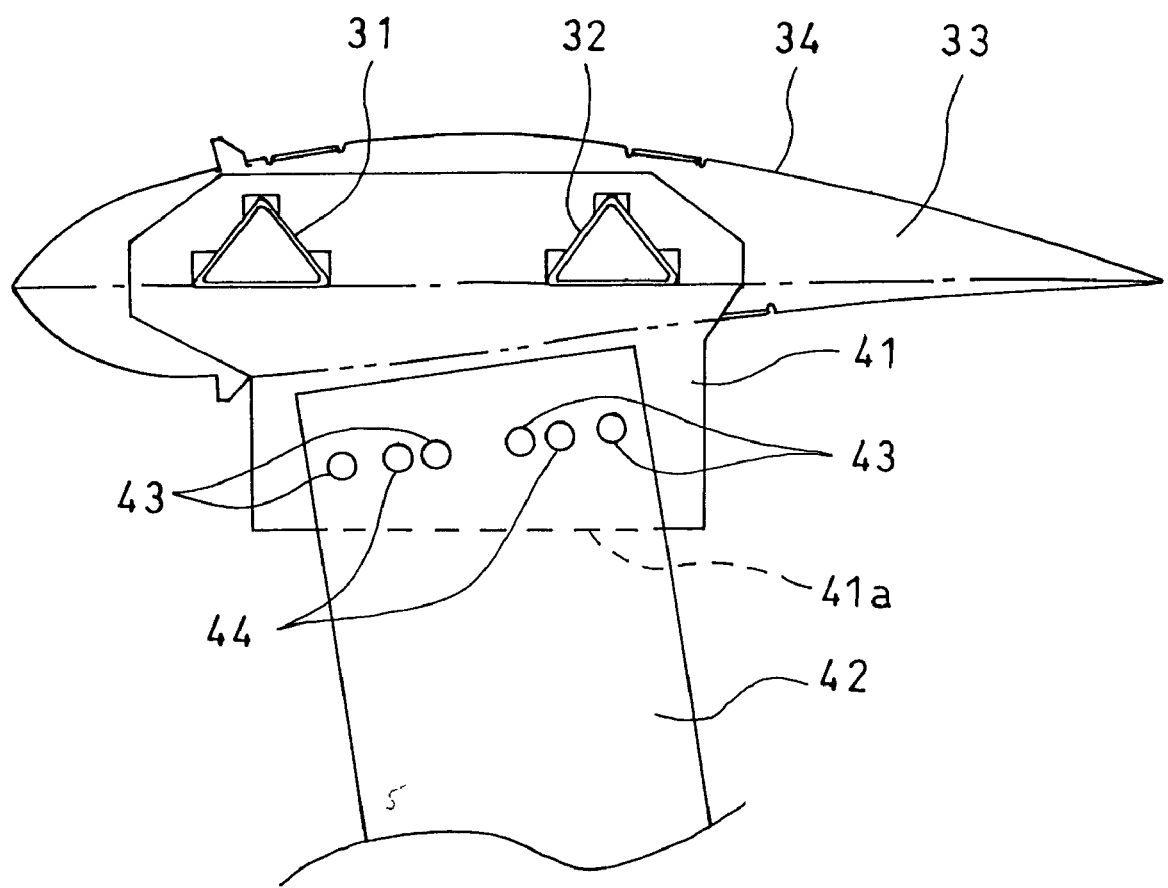
FIG. 12 is a sectional view of a mounting structure of the blade.

Here will be described a blade mounting structure of the invention. FIG. 12 is a sectional view of the blade mounting structure.

As shown in FIG. 10 and FIG. 12, the main supporting members 31 and 32 are made of an extruded material having a triangular section, each side of which is arranged in parallel with the chord length.

A mounting bracket 41 is a plate-shaped member having two generally convex holes for fitting the main supporting members 31 and 32 therein. Moreover, the mounting bracket 41 is so attached that its portion may extend through the skin 34 and project out toward the rotating post 2 and that its parallel face may be horizontal. Moreover, the mounting bracket 41 has a side 41a formed in its projecting portion in parallel with the chord length (as indicated by a single-dotted line in FIG. 12).

A support member 42 is a pipe-shaped member or a plate-shaped member. In the case of the pipe-shaped member, for example, a pipe having a slender elliptical shape may also be used to suppress the resistance of the wind.

Bolts 43 are used to joint the mounting bracket 41 and the support member 42. In FIG. 12, the joint is made with the four bolts but may be made with at least two bolts 43.

Pins 44 are used to position the mounting bracket 41 and the support member 42 thereby to position and joint the mounting bracket 41 and the support member 42. In FIG. 12, the pin joint is made with the two pins 44 but may be made with at least one pin 44. For a more reliable positioning, however, it is preferred that the mounting bracket 41 and the support member 42 are jointed with the two or more pins 44. On the other hand, the positioning joint may be made by using reamer bolts or convex-concave fittings in place of the pins.

With this blade mounting structure, the mounting bracket 41 is provided at its projecting portion with the side 41a parallel to the chord length so that it can grasp the chord length direction of the blade 3 easily thereby to facilitate the adjustment of the mounting angle of the blade 3.

Moreover, the positioning can be ensured so that the mounting angle can eliminate the discrepancy and can keep the desired value.

Since each side of the triangle of the section of the main supporting members 31 or 32 is arranged in parallel with the chord length, the chord length direction of the blade 3 can be grasped with respect to one side of the triangle so that the mounting angle of the blade can be adjusted without using the mounting bracket 41. Moreover, the main supporting members 31 and 32 may have not only the triangular section but also other polygonal shapes. If these polygonal main supporting members have one side parallel to the chord length direction of the blade 3, it is possible to achieve effects like those of the case of the main supporting members having the triangular section.

Figure 4:
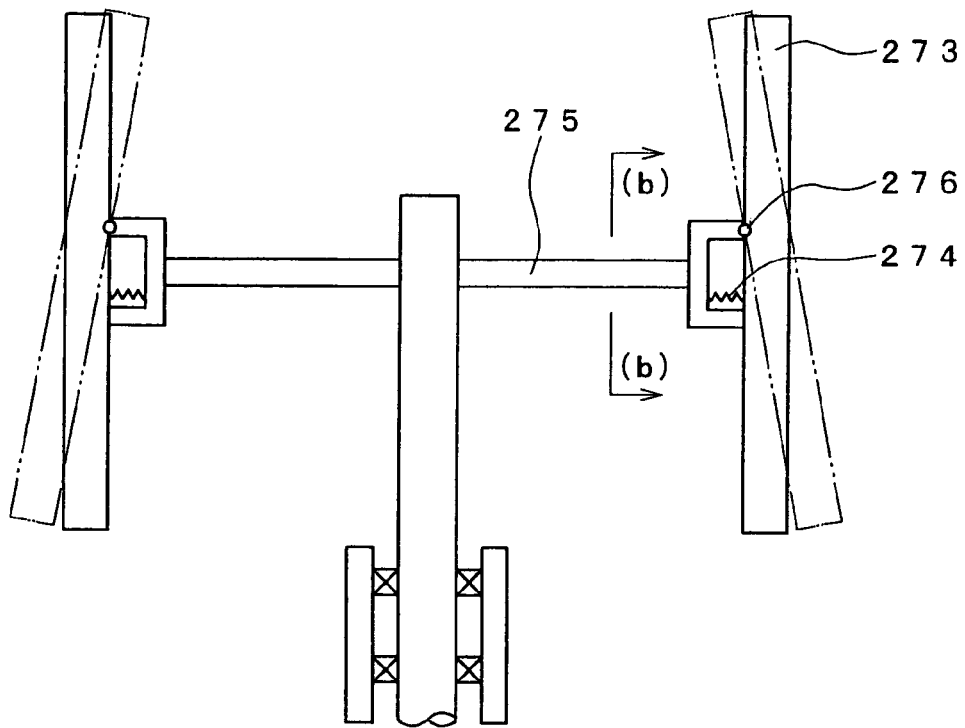
FIG. 4(a) is a diagram showing a mode of embodiment, in which the blades are so mounted on the support members with hinges or springs that they can be longitudinally inclined.
FIG. 4(b) is a view taken in the direction of arrows (b) and (b) of FIG. 4(a)
FIG. 4(c) is a diagram showing a mode of embodiment, in which the blades are so mounted on the support members with hinges or springs that they can be longitudinally inclined.
Figure 4:
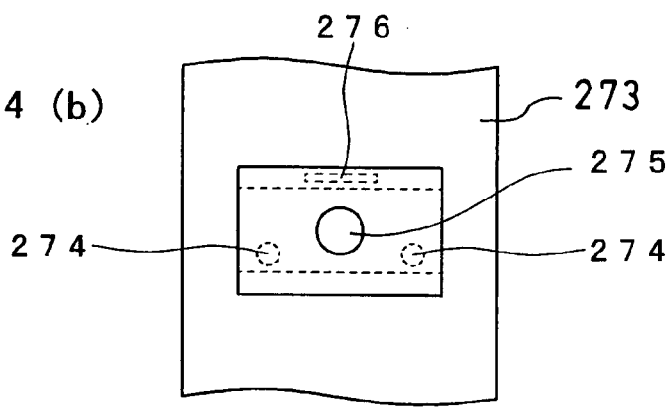
Figure 4:
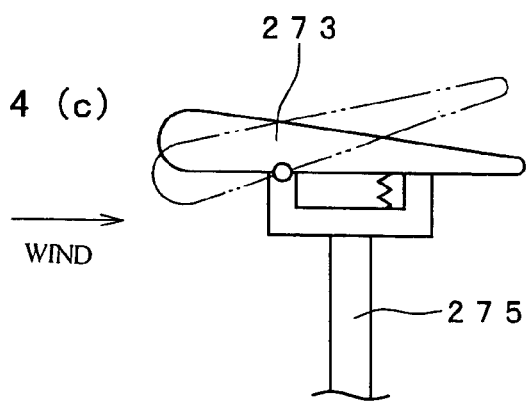

FIG. 4(a) is a diagram showing a mode of embodiment, in which the blades are so mounted on the support members with hinges or springs that they can be longitudinally inclined. FIG. 4(b) is a view taken in the direction of arrows (b) and (b) of FIG. 4(a).

A support member 275 is a member having a generally T-shaped section normal to the ground. A blade 273 is hinged in a rocking manner at its leading end portion 276. In the vicinity of the leading end portion on the side opposite to the leading end portion 276, moreover, the blade 273 is also so attached by a spring 274 as to be freely inclined longitudinally of the blade 273.

According to the mode of embodiment thus far described, the blade 273 can be freely inclined longitudinally of itself as a centrifugal force or wind pressure at a predetermined or higher level is generated at the blade 273 by a strong wind. Therefore, the centrifugal force or wind pressure at the predetermined or higher level can be reduced so that the blade is not subjected to any abrupt stress but is hardly broken. Here, the blade 273 can be freely rocked longitudinally and transversely of itself, if the leading end portion 276 and the blade 273 are jointed with a pin, although not shown.

In FIG. 4(c), the support member 275 of FIG. 4(a) is turned by 90 degrees on its axis, and the blade 273 is so jointed with a hinge and a spring like FIG. 4(a) as may be freely inclined in the transverse direction.

According to this mode of embodiment, it is possible to achieve effects like those of the mode of embodiment of FIG. 4(a).

Figure 8:
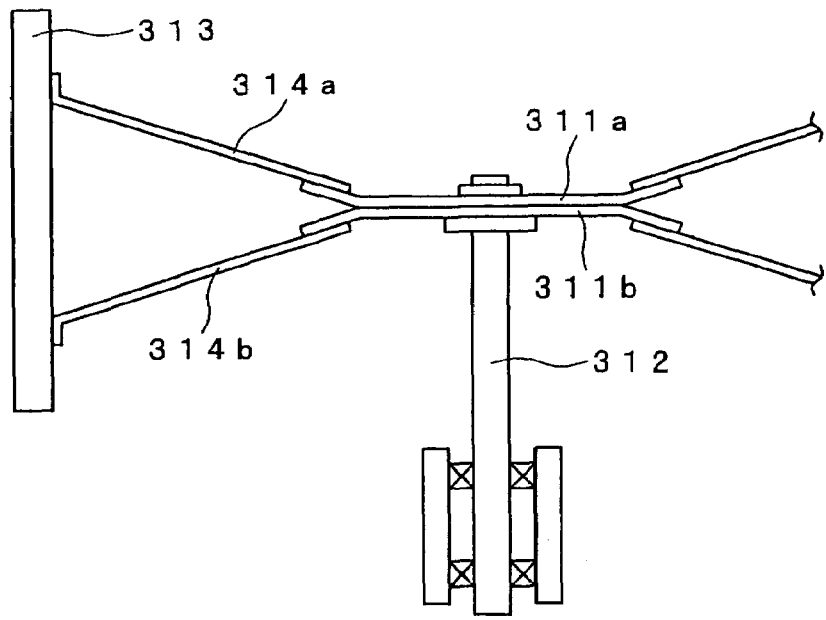
FIG. 8(a) is a diagram showing a mode of embodiment, in which the rotating post is provided with a transversely upward upper support member and a transversely downward lower support member and in which the blade is attached at its longitudinally upper and lower portions to the leading ends of the upper support member and the lower support member.
FIG. 8(b) is a top plan view of a portion of FIG. 8(a)
FIG. 8(c) is a sectional view taken in the direction of arrows (c) and (c) of FIG. 8(b)
FIG. 8(d) is a sectional view taken in the direction of arrows (d) and (d) of FIG. 8(b).
Figure 8:
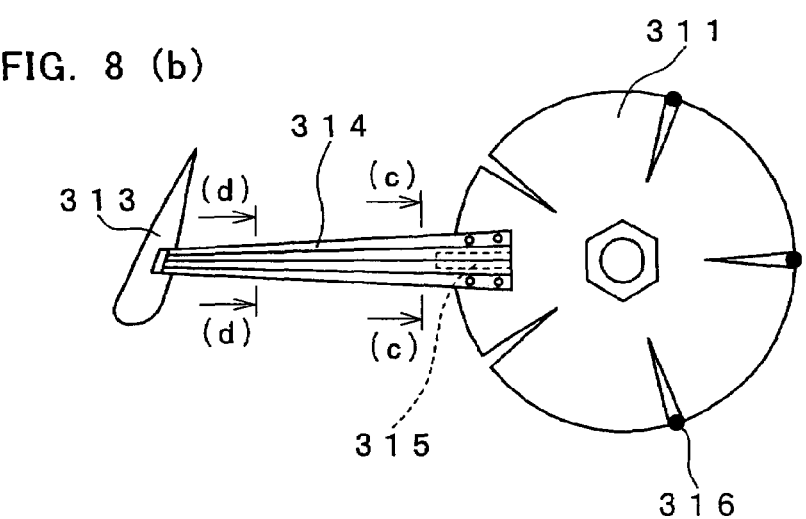
Figure 8:
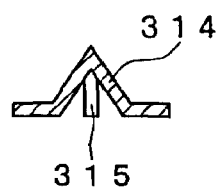
Figure 8:

FIG. 8(a) is a diagram showing the vicinity of the upper portion of a rotating post 312 of the vertical axis type wind power station. In the rotating post 312, two upper and lower discs 311a and 311b mounted on the upper portion of the rotating post 312 are provided with a transversely upward upper support member 314a and a transversely downward lower support member 314b, respectively. A blade 313 is attached at its longitudinally upper and lower portions to the leading ends of the upper support member 314a and the lower support member 314b. The discs 311a and 311b are fixed on and supported by the rotating post 312 at their central portions by means of bolts or the like. The discs 311a and 311b for carrying the first support member 314a and the lower support member 314b are slitted at their edge portions so that they can be folded to easily mount the individual support members. However, the portions 316 near the circumference in the slits at portions left unfolded are fixed by welding them.

FIG. 8(b) is a top plan view of FIG. 8(a); FIG. 8(c) is a view taken in the direction of arrows (c) and (c) of FIG. 8(b); and FIG. 8(d) is a view taken in the direction of arrows (d) and (d) of FIG. 8(b). As shown in FIGS. 8(b), 8(c) and 8(d), the upper support member 314a and the lower support member 314b are generally formed into such an angle section as has a smaller modulus of section toward the leading end and have substantial triangle sections. Moreover, the upper support member 314a and the lower support member 314b are reinforced to stand the force (i.e., the force by the wind pressure received by the blade 313) in the circumferential direction of the discs 311a and 311b by a plate member 315, which is mounted at its one side face in the radial direction of the discs 311a and 311b and fixed at its other side face on the angle back sides of the upper support member 314a and the lower support member 314b on the disc side end.

According to the embodiment thus far described, the blade 313 can be stably supported to prevent troubles while it is being turned.

In order to cope with the centrifugal force to be generated in the blades, the structure may be modified such that the blades adjoining in the circumferential direction are connected to each other. In a modified embodiment, for example, the blades may be connected to each other by a plate-shaped member, or the joint portions of the upper support members 314a and the blades 313 may be jointed by means of wires.

Here, the wind power station can be lightened if the individual blades are made of aluminum.

Figure 13:
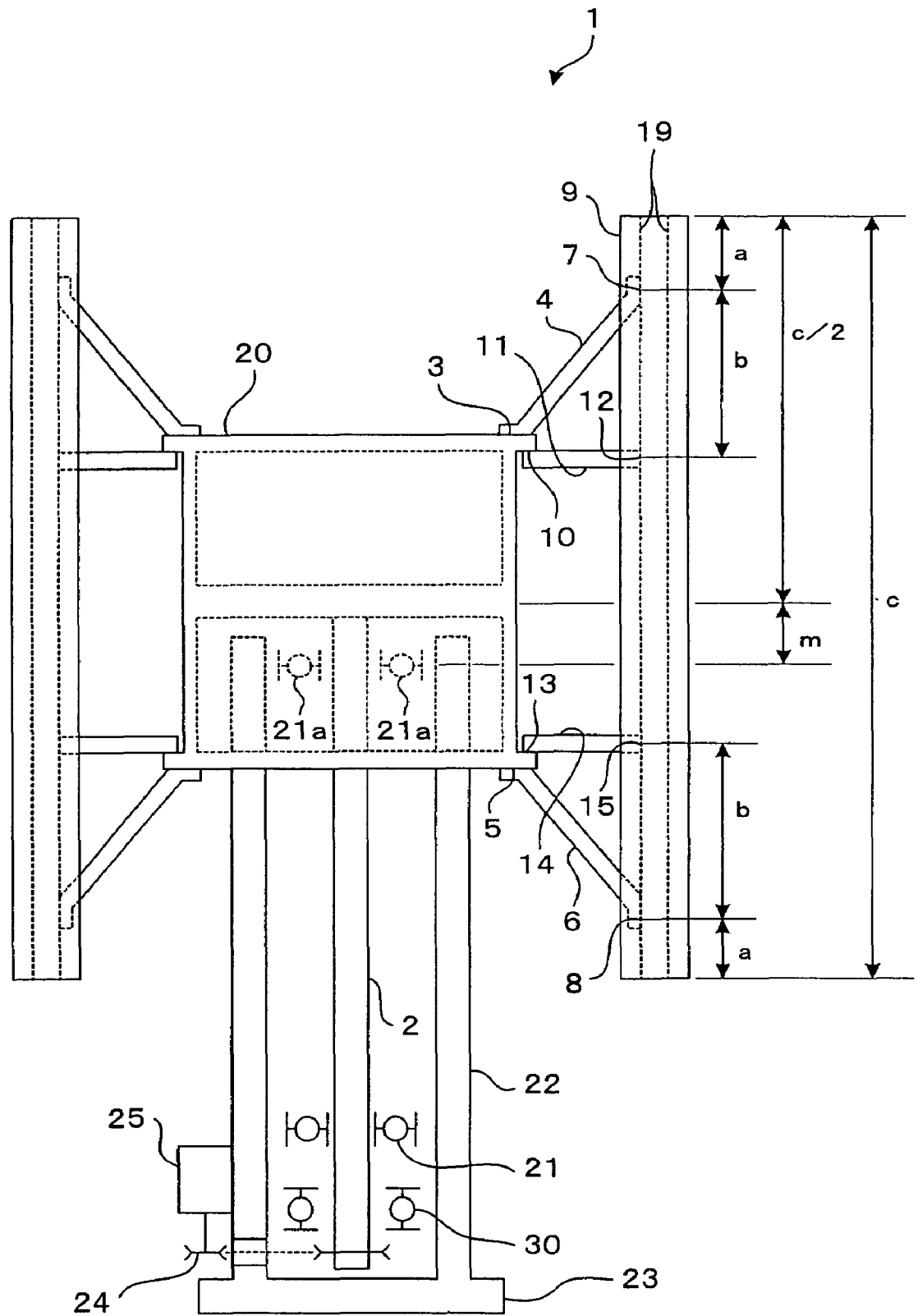
FIG. 13 is a schematic diagram illustrating a construction of the vertical axis type wind power station according to the invention.
Figure 14:
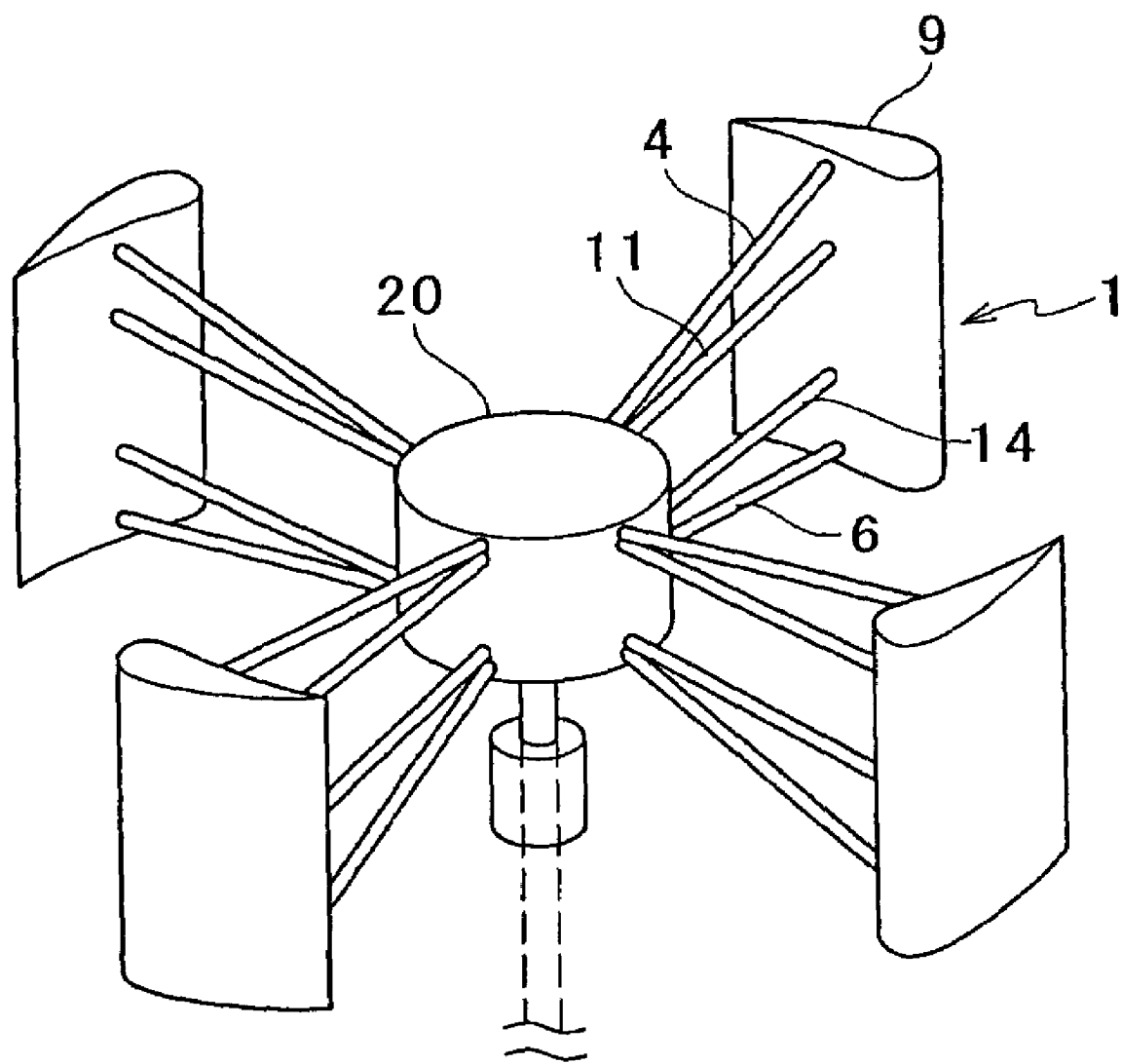
FIG. 14 is a perspective view illustrating the vertical axis type wind power station according to the invention.

Here will be described a light-weight vertical axis type wind power station, which can suppress such a bending moment sufficiently as is generated by the centrifugal force either at the joint portion of an arm and the blade or at the central portion of the blade. FIG. 13 is a schematic diagram illustrating a construction of the light-weight vertical axis type wind power station according to the invention, which can suppress the bending moment sufficiently. FIG. 14 is a perspective view illustrating the vertical axis type wind power station of FIG. 13.

The vertical axis type wind power station 1 is constructed to include: a rotating post 2 erected upright; a plurality of longitudinal blades 9 arranged in the circumferential direction of the rotating post 2; rotors 18 and 20 provided at the leading end of the rotating post 2; two upper and lower arms 4 and 6 attached obliquely upward or downward to the rotors 18 and 20, for supporting the two longitudinally upper and lower portions of the blade 9; and two intermediate arms 11 and 14 attached to the rotors 18 and 20 or the upper and lower arms 4 and 6, for supporting the two intermediate portions of the blade 9.

The blade 9 is similar to the blade 3 shown in FIG. 3.

The tube-shaped rotor 20 is inserted onto and jointed to the leading end of the rotating post 2. The tube-shaped rotor 20 may be formed into any of a circular tube, a polygonal tube and a framed structure but is a circular tube in this case. The tube-shaped rotor 20 is made of a light, strong aluminum alloy or the like so that the vertical axis type wind power station 1 is made light-weight.

The tube-shaped rotor 20 has its axial center of gravity located at c/2 or the center of length c of the blade 9 and its circumferential center of gravity located at the same axis as that of the rotating post 2. Therefore, the vertical axis type wind power station 1 has its center of gravity located at that of the tube-shaped rotor 20. Moreover, the tube-shaped rotor 20 is shaped to have vertical and transverse symmetries with respect to the center of gravity.

Below the center of gravity of the tube-shaped rotor 20, the rotating post 2 is rotatably supported by a housing 22 through a bearing 21a, a bearing 21 and a thrust bearing 30 so that the tube-shaped rotor 20 rotates together with the rotating post 2. The bending stress against a transverse load such as a cross wind can be reduced by minimizing the distance m between the center of gravity of the tube-shaped rotor 20 and the bearing 21a.

The upper arm 4 is arranged obliquely downward with respect to the tube-shaped rotor 20 and has its first end portion 3 attached to the upper portion of the tube-shaped rotor 20 and its upper joint portion 7 jointed to a main supporting member 19 of the blade 9 so that it supports the longitudinally upper portion of the blade 9. The lower arm 6 is arranged obliquely upward with respect to the tube-shaped rotor 20 and has its second end portion 5 attached to the lower portion of the tube-shaped rotor 20 and its lower joint portion 8 jointed to the main supporting member 19 of the blade 9 so that it supports the longitudinally lower portion of the blade 9.

The upper arm 4 and the lower arm 6 are attached to the vicinities of the center of gravity of the vertical axis type wind power station, that is, to the upper portion and the lower portion of the tube-shaped rotor 20 so that they balance the bending moments generated at the upper joint portion 7 and the lower joint portion 8.

Figure 15:
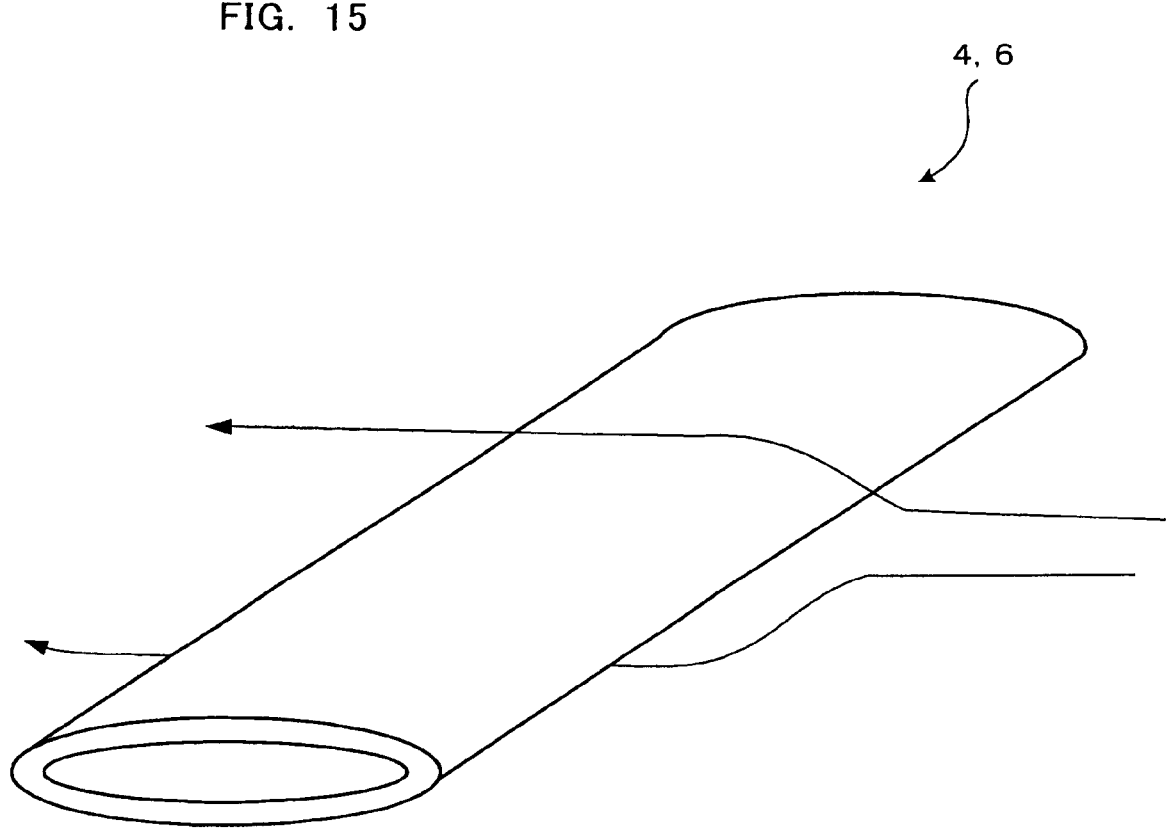
FIG. 15 is a perspective view illustrating an arm of the vertical axis type wind power station according to the invention.

The upper arm 4 and the lower arm 6 are formed into a hollow tube having a flattened section, as shown in FIG. 15, and are made of a light-weight, strong aluminum alloy or the like. Therefore, the upper and lower arms 4 and 6 can reduce the weight of the vertical axis type wind power station 1, and their sectional shape can reduce the windage loss and the inertia.

The first intermediate arm 11 is a main arm having a third end portion 10 attached to the upper portion of the tube-shaped rotor 20 and is horizontally arranged to have a first intermediate joint portion 12 jointed to the main supporting member 19 of the blade 9, so that it supports the intermediate upper portion of the blade 9. The second intermediate arm 14 is a main arm having a fourth end portion 13 attached to the lower portion of the tube-shaped rotor 20 and is horizontally arranged to have a second intermediate joint portion 15 jointed to the main supporting member 19 of the blade 9, so that it supports the intermediate lower portion of the blade 9.

The first intermediate arm 11 and the second intermediate arm 14 are attached to the center of gravity of the vertical axis type wind power station, that is, in vertical symmetry with respect to the center of gravity of the tube-shaped rotor 20 so that they balance the bending moments generated at the first intermediate joint portion 12 and the second intermediate joint portion 15.

The first intermediate arm 11 and the second intermediate arm 14 are formed into a hollow tube having a flattened section, like the upper arm 4 and the lower arm 6 shown in FIG. 15, but are the main arms for supporting the blade 9 firmly so that they are made thicker than the upper arm 4 and the lower arm 6. The first intermediate arm 11 and the second intermediate arm 14 are also made of a light-weight, strong aluminum alloy or the like. Therefore, the first and second intermediate arms 11 and 14 can reduce the weight of the vertical axis type wind power station 1, and their sectional shape can reduce the windage loss and the inertia.

Here in FIG. 13, the portions of the tube-shaped rotor 20, to which the two intermediate arms and the upper and lower arms are attached, are made different. However, it goes without saying that the first intermediate arm 11 and the upper arm 4 could be attached to the common portion of the tube-shaped rotor 20 and that the second intermediate arm 14 and the lower arm 6 could also be attached to the common portion of the tube-shaped rotor 20.

The housing 22 is provided with a base 23, which is fixed on the not-shown foundation by suitable fixing means. Moreover, a generator 25 is connected to the lower portion of the rotating post 2 through a suitable gear mechanism 24. In another construction, the generator 25 may be connected directly to the rotating post 2.

Here will be described the actions of the vertical axis type wind power station 1.

The blades 9 rotate, as they receive the cross wind, in the circumferential direction of the rotating post 2, so that the tube-shaped rotor 20 accordingly rotates. The turning force of the tube-shaped rotor 20 acts on the rotating post 2, which is vertically supported by the bearings 21 and 21a and which is horizontally supported by the thrust bearing 30 for bearing the axial load. As a result, the rotating post 2 rotates to transmit its turning force to the generator 25 through the gear mechanism 24 below the rotating post 2. Thus, the vertical axis type wind power station generates the electric power.

Next, the following tests have been done to acquire the optimum positional relation between the blade and the arm of the vertical axis type wind power station thus constructed.

Figure 16:
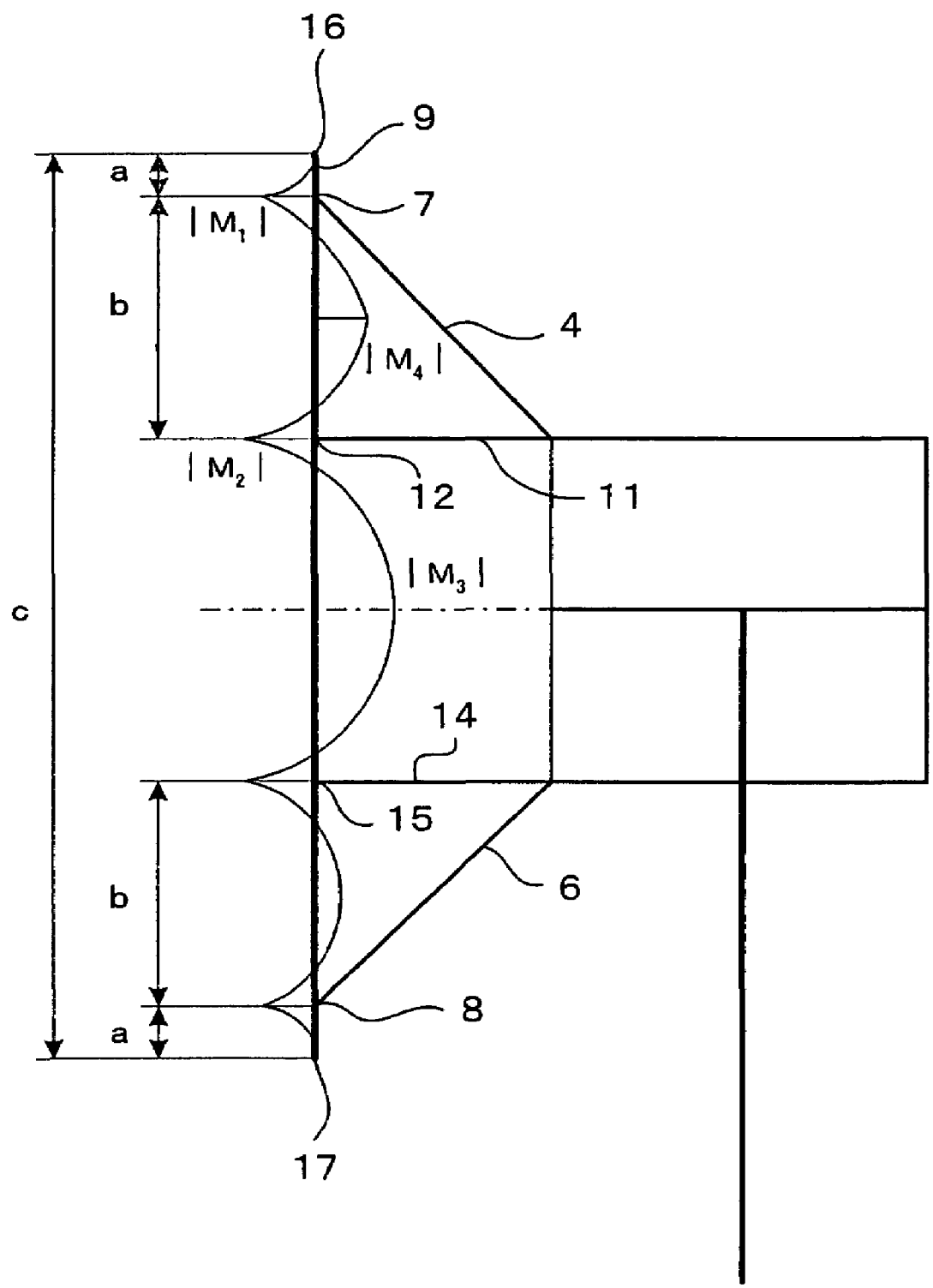
FIG. 16 is a schematic diagram illustrating a bending moment to be loaded on the blade of the vertical axis type wind power station according to the invention.

As schematically illustrated in FIG. 13 and FIG. 16: the longitudinal length of the blade is designated by c; the distance from the upper end 16 of the blade to the upper joint portion 7 is designated by a; and the distance from the upper joint portion 7 to the first intermediate joint portion 12 is designated by b. Likewise, the distance from the lower end 17 of the blade to the lower joint portion 8 is designated by a, and the distance from the lower joint portion 8 to the second intermediate joint portion 15 is designated by b.

As illustrated in FIG. 16: a bending moment to be generated at the upper joint portion 7 and the lower joint portion 8 is designated by $M_1$; a bending moment to be generated at the first intermediate joint portion 12 and the second intermediate joint portion 15 is designated by $M_2$; a bending moment to be generated at a central portion of the blade is designated by $M_3$; and a bending moment to be generated at the distance b is designated by $M_4$.

Figure 17:
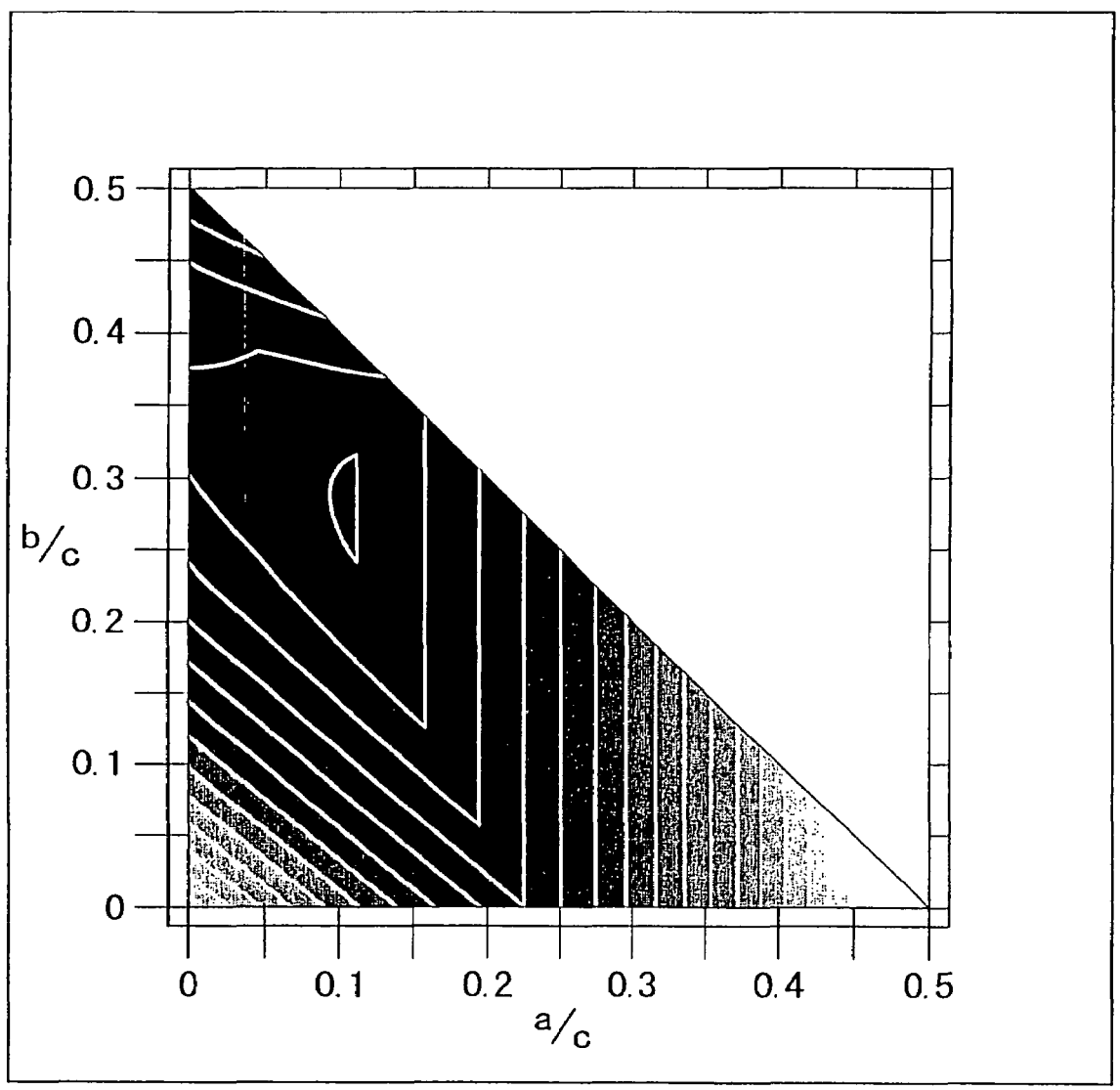
FIG. 17 is a graphic diagram of the contour lines, which were drawn by the maximums of the individual bending moments to be loaded on the vertical axis type wind power station according to the invention and which were determined by the finite element method.

Next, contour lines, as drawn by the absolute values $|M_1|$ to $|M_4|$ (as will be represented by $|M_i|$) of the individual bending moments, were determined by the finite element method. The results are presented in FIG. 17. Here, the ordinate indicates b/c, and the abscissa indicates a/c. From FIG. 6, it has been found out that the minimum of the absolute value $|M_i|$ of the individual bending moments exists in the vicinity of a/c=0.11 and b/c=0.28.

Figure 18:
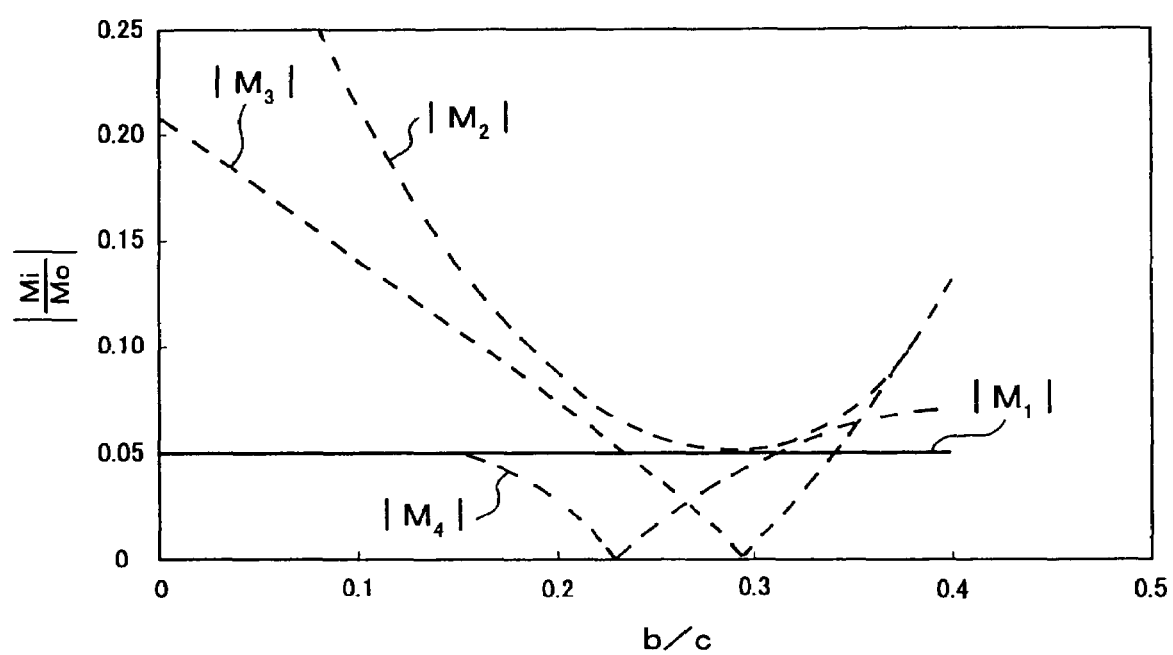
FIG. 18 is a graphic diagram of the changes, which were determined for a parameter a/c fixed, in the individual bending moments to be loaded on the vertical axis type wind power station according to the invention.

Next, the magnitude of $|M_i|/|M_0|$ at the time when the value b/c was changed was measured for the abscissa of b/c and the ordinate of $|M_i|/|M_0|$ with the value a/c being fixed in the vicinity of 0.11. Here, the value $|M_0|$ indicates the absolute value of the bending moment of the case, in which the blade was supported at the center point. The results are presented in FIG. 18. From FIG. 7, it has been found out that the value $|M_i|$ can be suppressed to 10% or less of the value $|M_0|$ for b/c=0.18 to 0.37.

Figure 19:
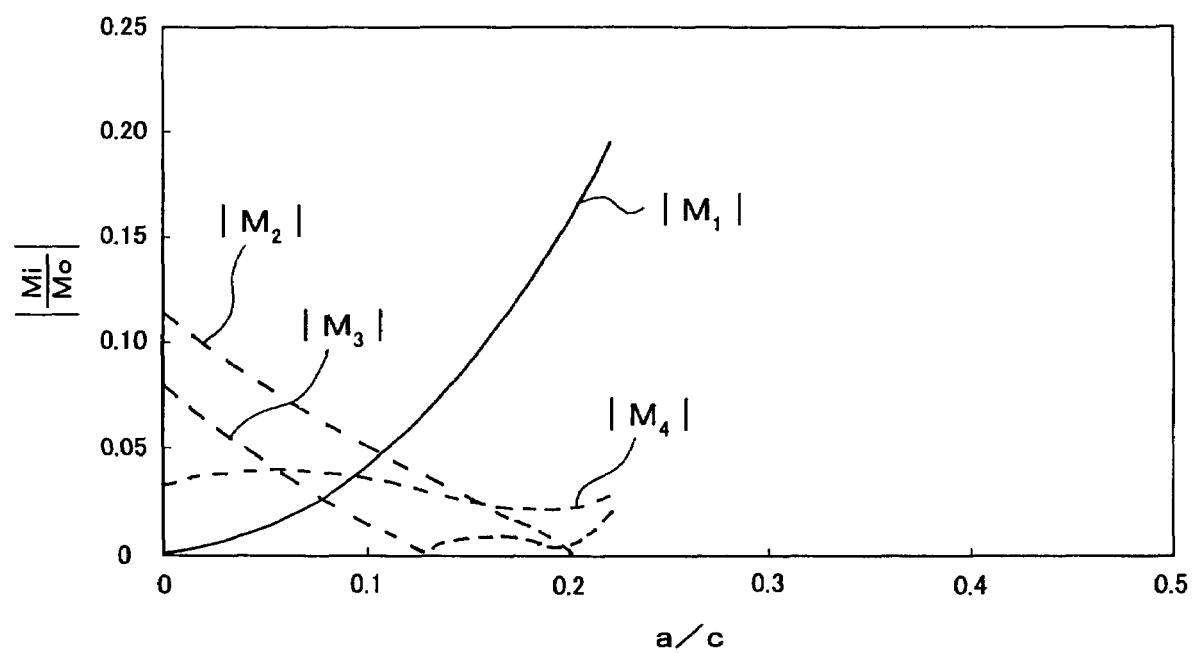
FIG. 19 is a graphic diagram of the changes, which were determined for a parameter b/c fixed, in the individual bending moments to be loaded on the vertical axis type wind power station according to the invention.

Next, the magnitude of $|M_i|/|M_0|$ at the time when the value a/c was changed was measured for the abscissa of a/c and the ordinate of $|M_i|/|M_0|$ with the value b/c being fixed in the vicinity of 0.28. The results are presented in FIG. 19. From FIG. 19, it has been found out that the value $|M_i|$ can be suppressed to 10% or less of the value $|M_0|$ for a/c=0.02 to 0.16.

As described hereinbefore, the vertical axis type wind power station 1 is constructed to minimize the individual bending moments $M_1$ to $M_4$ resulting from the centrifugal force, for b/c=0.18 to 0.37 and a/c=0.02 to 0.16.

As a result, even if the four arms are made slender, short and light, a sufficient durability against the bending moment can be added to the blade. It is, therefore, possible to provide a light-weight vertical axis type wind power station, the cost for which can be lowered.

Here will be described the effects of the vertical axis type wind power station 1.

In the vertical axis type wind power station thus constructed, the blades 9 are supported at the upper and lower points and at the two central points by the two upper and lower arms 4 and 6 and the two intermediate arms 11 and 14, which are attached to the vicinities of the center of gravity of the tube-shaped rotor 20, and the positions of the supporting points of the blades 9 are balanced vertically symmetrically with respect to the center of gravity of the tube-shaped rotor 20. Therefore, it is possible to minimize the bending moments, which are generated at the blades 9 by the centrifugal force. Especially, the distances between the individual supporting points can be optimized, as described above, to minimize the bending moments reliably. Moreover, the arms are made light and shaped to have the horizontally flat section so that the resistance to be borne by the arms can be reduced to reduce the windage loss and to lighten the vertical axis type wind power station.

Figure 20:
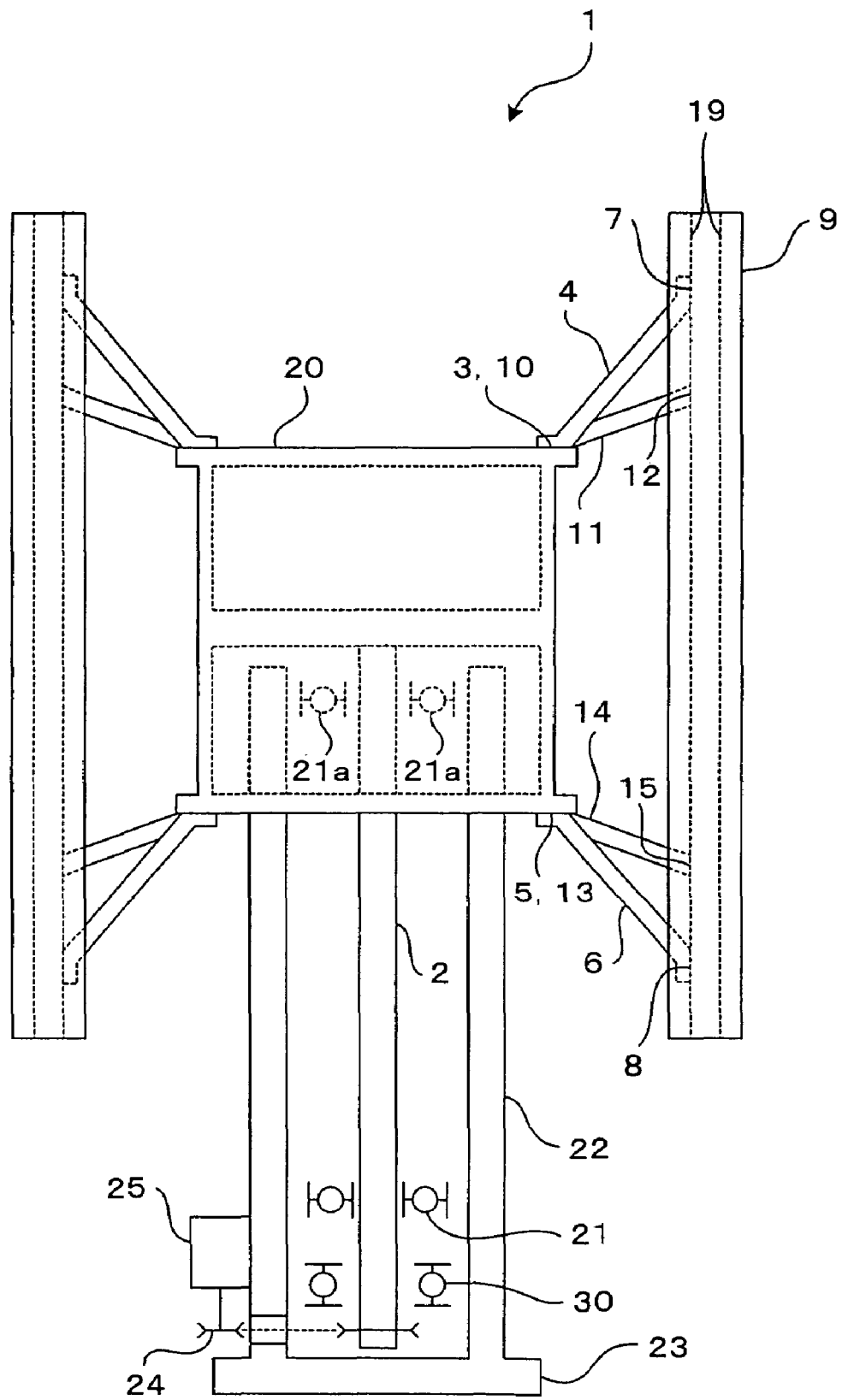
FIG. 20 is a schematic diagram illustrating the construction of one modified example of the vertical axis type wind power station according to the invention.

On the other hand, the vertical axis type wind power station 1 according to the first mode of embodiment of the invention may be constructed, as shown in FIG. 20. Specifically, the first intermediate arm 11 and the second intermediate arm 14 are obliquely arranged. The third end portion 10 of the first intermediate arm 11 is jointed to the first end portion 3 or the joint portion of the tube-shaped rotor 20 and the upper arm 4, and the fourth end portion 13 of the second intermediate arm 14 is jointed to the second end portion 5 or the joint portion of the tube-shaped rotor 20 and the lower arm 6.

Here in FIG. 20, the two intermediate arms and the upper and lower arms are attached at the common positions to the tube-shaped rotor 20. However, it goes without saying that the two intermediate arms and the upper and lower arms could be attached to different portions.

Figure 21:
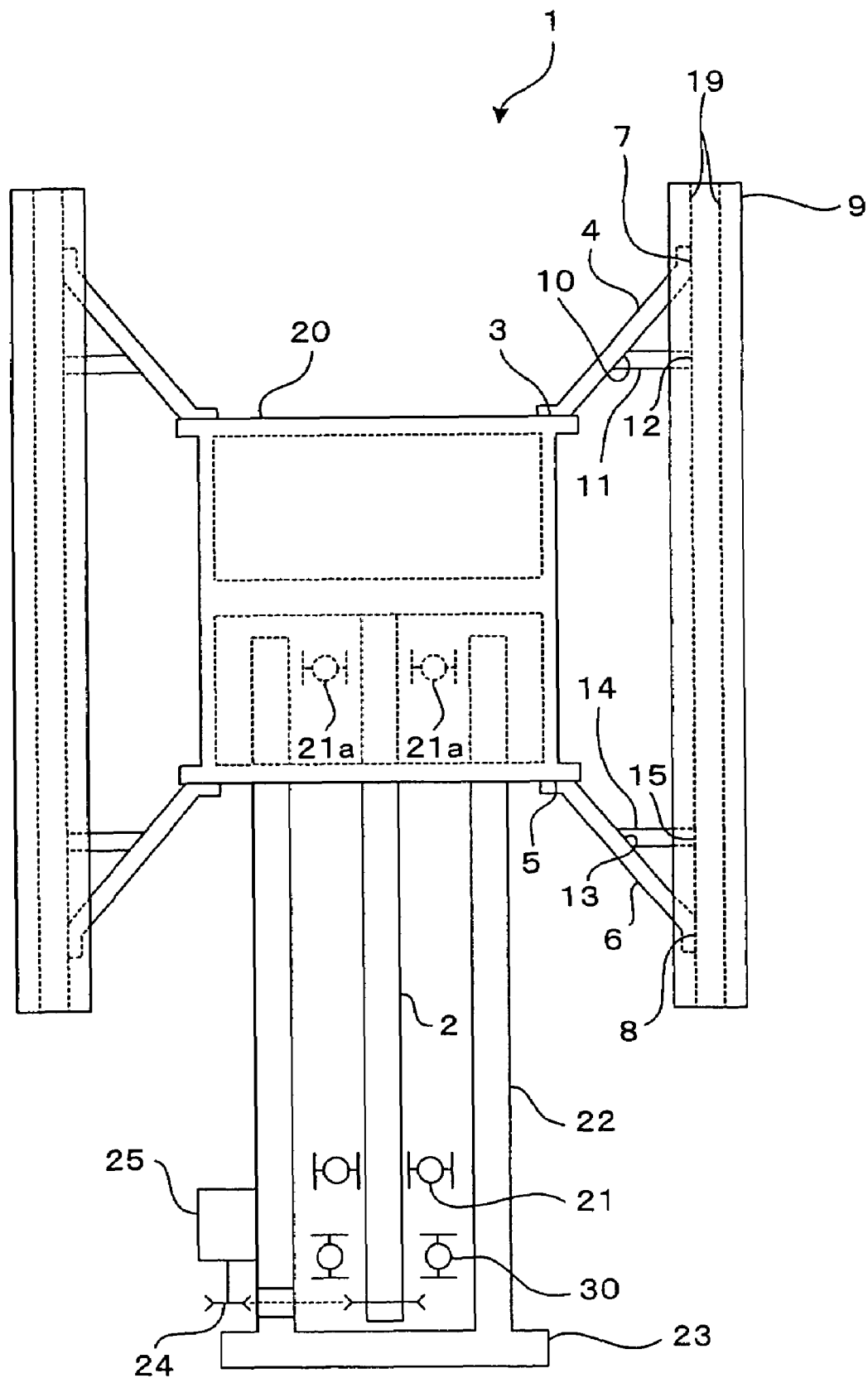
FIG. 21 is a schematic diagram illustrating the construction of another modified example of the vertical axis type wind power station according to the invention.

Moreover, the vertical axis type wind power station 1 may also be constructed, as shown in FIG. 21. Specifically, the first intermediate arm 11 and the second intermediate arm 14 are horizontally arranged, but the third end portion 10 of the first intermediate arm 11 is jointed to the upper arm 4, and the fourth end portion 13 of the second intermediate arm 14 is jointed to the lower arm 6. As a result, it is possible to shorten the two intermediate arms.

Here, the first intermediate arm 11 and the second intermediate arm 14 should not be limited to the horizontal arrangement but may be obliquely arranged.

Figure 22:
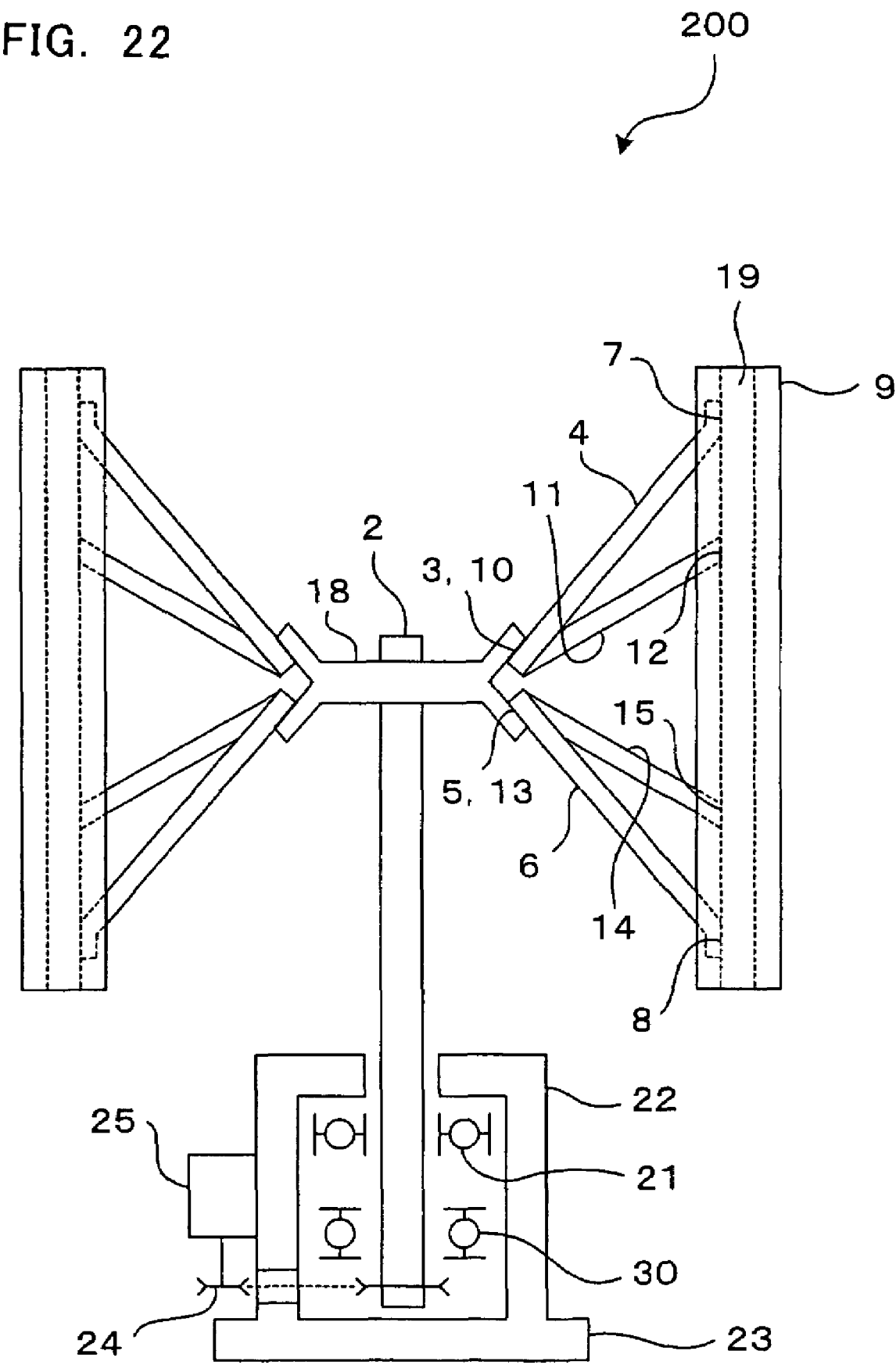
FIG. 22 is a schematic diagram illustrating the construction of the vertical axis type wind power station according to the invention.

With reference to FIG. 22, here will be described a construction of a vertical axis type wind power station 200 or another example of the vertical axis type wind power station 1. The construction of the vertical axis type wind power station 200 is different from the vertical axis type wind power station 1 in that a disc 18 is disposed in place of the tube-shaped rotor 20 at the upper portion of the rotating post 2.

The upper arm 4 is arranged obliquely downward with respect to the disc 18, and has its first end portion 3 attached to the upward folded portion of the disc 18 and its upper joint portion 7 jointed to the main supporting member 19 of the blade 9 thereby to support the longitudinally upper portion of the blade 9. The lower arm 6 is arranged obliquely upward with respect to the disc 18, and has its second end portion 5 attached to the downward folded portion of the disc 18 and its lower joint portion 8 jointed to the main supporting member 19 of the blade 9 thereby to support the longitudinally lower portion of the blade 9.

The first intermediate arm 11 has its third end portion 10 attached to the upward folded portion of the disc 18 and is obliquely arranged to have its first intermediate joint portion 12 jointed to the main supporting member 19 of the blade 9 thereby to support the intermediate upper portion of the blade 9. The second intermediate arm 14 has its fourth end portion 13 attached to the downward folded portion of the disc 18 and is obliquely arranged to have its second intermediate joint portion 15 jointed to the main supporting member 19 of the blade 9 thereby to support the intermediate lower portion of the blade 9.

Here in FIG. 22, the two intermediate arms and the upper and lower arms are attached at the common positions to the disc 18. However, it goes without saying that the two intermediate arms and the upper and lower arms could be attached to different portions.

The remaining points are similar to those of the vertical axis type wind power station 1 thus far described. Not only the actions and effects but also the fact in which the bending moment can be minimized by optimizing the positional relation between the blades and the arms, is similar so that their description is omitted.

Figure 23:
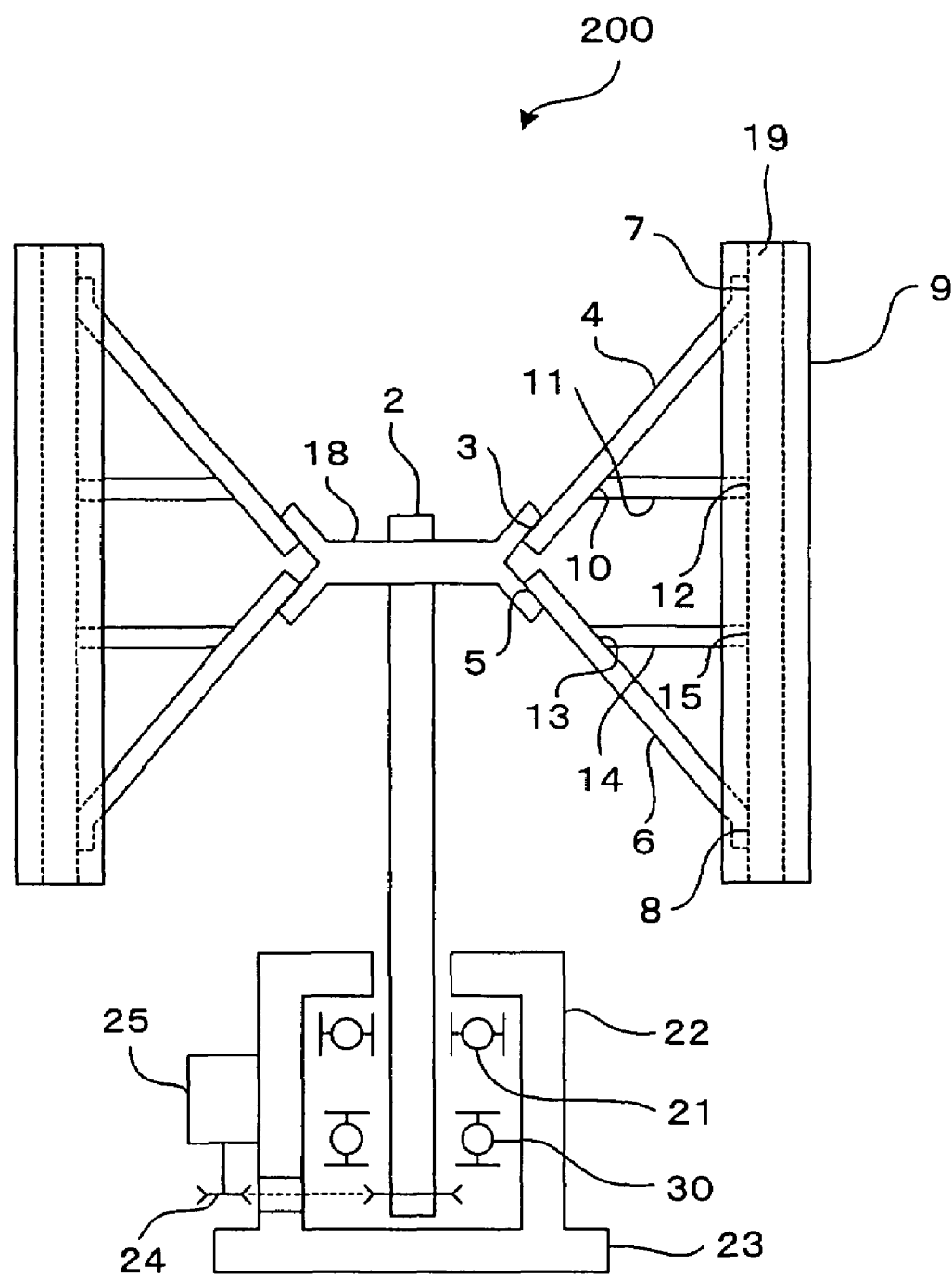
FIG. 23 is a schematic diagram illustrating the construction of one modified example of the vertical axis type wind power station according to the invention.

Moreover, the vertical axis type wind power station 200 may also be constructed, as shown in FIG. 23. Specifically, the first intermediate arm 11 and the second intermediate arm 14 are horizontally arranged. The first intermediate arm 11 has its third end portion 10 jointed to the upper arm 14, and the second intermediate arm 14 has its fourth end portion 13 jointed to the lower arm 6. As a result, the two intermediate arms can be shortened.

Here, the first intermediate arm 11 and the second intermediate arm 14 should not be limited to the horizontal arrangement but may also be obliquely arranged.

Moreover, the invention has been described in connection with the preferred modes of embodiment but could be modified within the scope of its gist. Specifically in the vertical axis type wind power station 1 shown in FIG. 13, the bending moment due to the transverse load can be reduced to zero by locating the position of the bearing 21*a* adjacent to the tube-shaped rotor 20, at the axial center of gravity.

Moreover, the two intermediate arms 11 and 14 are grasped as the main arms for supporting the blade 9, but the upper and lower arms 4 and 6 may also be the main arms. In this modification, the upper and lower arms 4 and 6 may be made thicker than the two intermediate arms 11 and 14 thereby to support the blade 9 firmly.

Moreover, the longitudinal blades may take a double structure, which is composed of a plurality of inner circumference blades arranged in the inner circumference of the rotating post and outer circumference blades connected to the inner circumference blades and arranged in the outer circumference. In this structure, the four arms for supporting the inner circumference blades are arranged to minimize the bending moment due to the centrifugal force, and the four arms extending from the inner circumference blades for connect/support the outer circumference blades are arranged to minimize the bending moment due to the centrifugal force, so that the vertical axis type wind power station can have a lift enhanced for the wind.

FIG. 7 is a diagram showing a rotating post height adjusting mechanism and a rotating post supporting mechanism. As shown in FIGS. 7(*a*) and 7(*d*), the rotating post height adjusting mechanism 300 is constructed to include: a tube-shaped rotating post 301 provided at its upper portion with support members 305 having blades 303 attached thereto and at its lower portion with two portions having two cuts of the same shape; a rod-shaped shaft 302 provided at its upper portion with a plurality of diametrically through holes and at its lower portion with a partial notch; and a fixing support pin 304 for fixing and supporting the rotating post 301 and the rotating post 302.

The rotating post 302 is provided with the through holes 302*a* so that the height of the rotating post 301 can be adjusted by changing the inserted position of the fixing support pin 304 in the through hole 302*a* and by fixing and supporting the rotating post 301 and the rotating post 302. AS shown in FIG. 7(*b*), moreover, the rotating post 302 has its lower portion cut off to be fitted in a rotating post supporting member 306, so that it can be removed. Here, the structure should not be limited to the shape shown in FIG. 7(*b*), if it can fit the rotating post 302 in its supporting member 306. For example, the structure may be formed into a polygonal shape such as a triangle or square or may be splined.

FIG. 7(*c*) is a diagram presenting a section of the rotating post at the portion of the fixing support pin 304.

If the mode of embodiment thus far described is combined with other ones, there can be attained effects that the height of the rotating post can be easily adjusted in each station, and that the rotating post can slide to expel an irrational force even if the struts are bent or thermally expanded.

Figure 9:
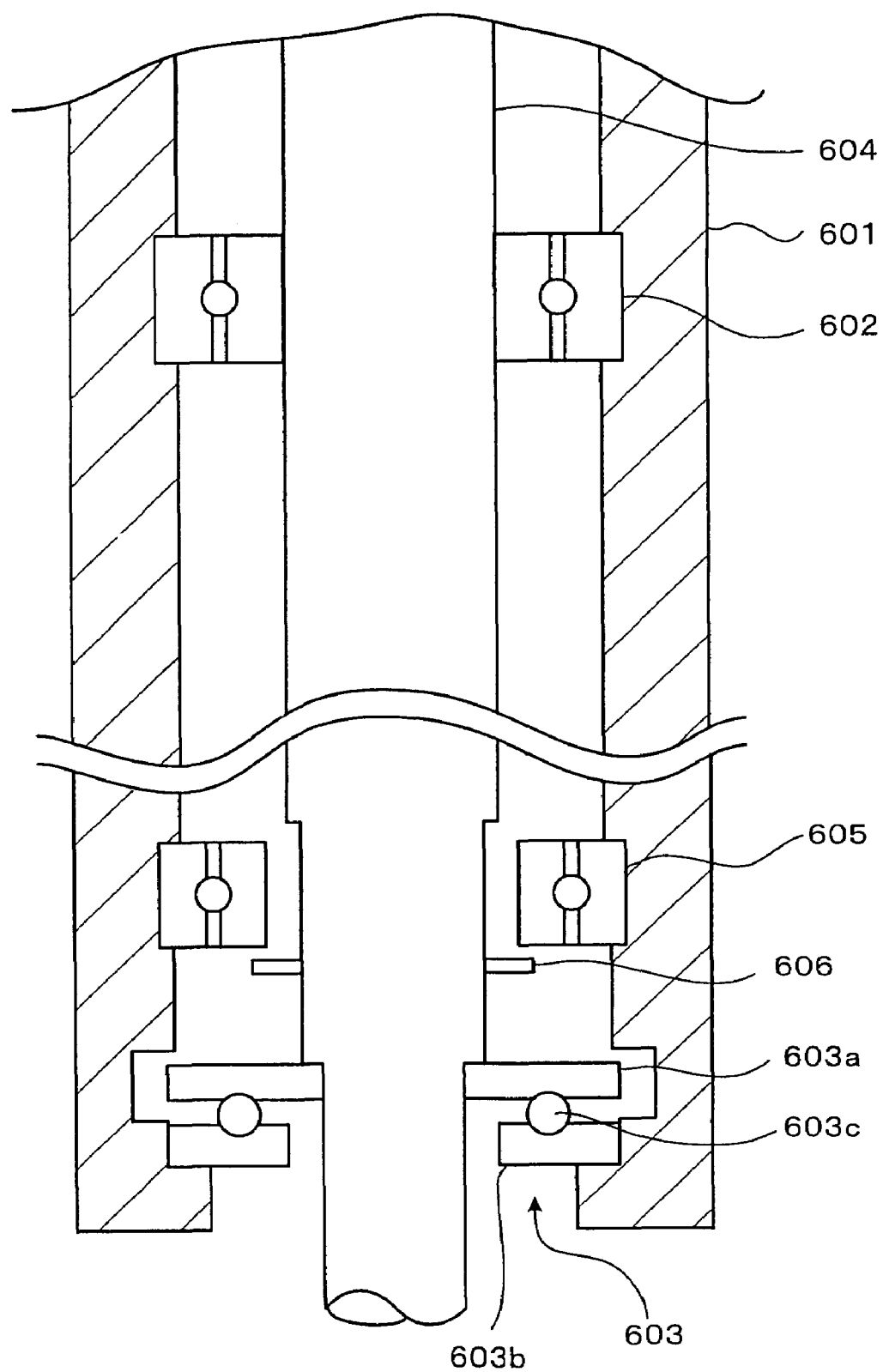
FIG. 9 is a diagram showing one example of a mode of embodiment for suppressing the turning load of the rotating post.

FIG. 9 is a diagram showing one example of a mode of embodiment for suppressing the turning load of the rotating post. In a tube 601 positioned upward, there are arranged a radial ball bearing 602, a thrust ball bearing 603, a rotating post 604 and a touchdown ball bearing 605.

The radial ball bearing 602 bears the load perpendicular to the axis of rotation and is fixed in the upper portion of the inner wall of the tube 601 thereby to support the rotating post 604 rotatably.

The thrust ball bearing 603 bears the load on the axis of rotation, and is composed of: a ring-shaped plate member 603*a* on one side; a ring-shaped plate member 603*b* on the other side; and a plurality of balls 603*c*. The one-side ring-shaped plate member 603*a* is fixed normal to the tube 601 in the lower portion of the inside of the tube 601, and is arranged at a clearance from the inner wall of the tube 601. Moreover, the other-side ring-shaped plate member 603*b* is fixed normal to the rotating post 604, and is arranged at a clearance from the outer wall of the rotating post 604. The balls 603*c* are so held between the plate member 603*a* and the plate member 603b as can move freely along the not-shown circumferential grooves formed in those plate members. With this construction, the thrust ball bearing 603 supports the rotating post 604 rotatably.

The rotating post 604 is rotatably supported at the central portion of the tube 601 by the radial ball bearing 602 and the thrust ball bearing 603. The rotating post 604 is so stepped in section at its lower portion as to fit the ring-shaped plate of the upper portion of the thrust ball bearing 603. To the rotating post 604 near and below the touchdown ball bearing 605, there is attached a ring-shaped plate member 606 for restricting the upward movement of the rotating post 604 together with the touchdown ball bearing 605.

This touchdown ball bearing 605 is mounted in the inner wall of the tube 601 above and near the thrust ball bearing 603 and at a clearance from the rotating post 604.

Here will be described the actions of this mode of embodiment. The thrust ball bearing 603 cannot bear the transverse load. Therefore, the load at the time when the rotating post 604 rocks transversely is concentrated at the radial ball bearing 602 disposed above, so that the structure is weak against the transverse load. Therefore, the touchdown ball bearing 605 is disposed below the tube 601, to bear the transverse load resulting from the rocking motions of the rotating post 604 thereby to support the rotating post 604 rotatably till the rotating post 604 stabilizes in its turning motions. And, the rotating post 604 leaves the touchdown ball bearing 605 as its rotation starts to stabilize.

According to this mode of embodiment, the transverse load when the rotating post 604 rocks can be borne by the touchdown ball bearing 605 in place of the thrust ball bearing 603 incompetent therefor. As a result, the rotating post 604 can turn stably.

Here, a radial roller bearing may also be used in place of the radial ball bearing 602. Moreover, this radial ball bearing 602 may also be fixed at the midway portion of the tube 601.

On the other hand, the thrust ball bearing 603 may also be replaced by a thrust roller bearing or a thrust magnetic bearing. Moreover, the touchdown ball bearing 605 may also be replaced by a touchdown roller bearing. Moreover, the touchdown ball bearing 605 may also be disposed below and near the thrust ball bearing 603.

Figure 5:
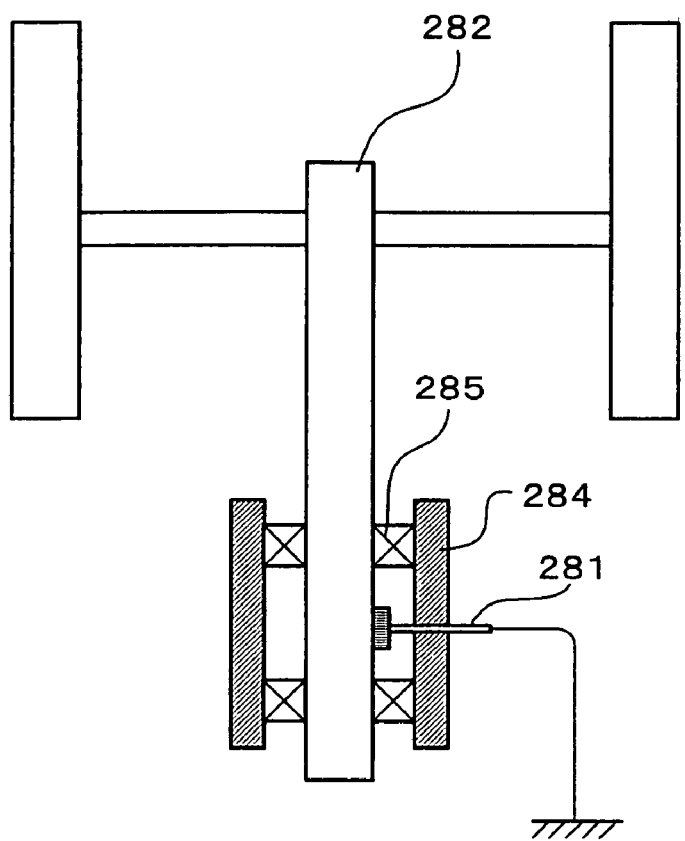
FIG. 5(a) is a diagram showing one example of the mode of embodiment for leaking the electricity from the rotating post.
FIG. 5(b) is a diagram showing another example of the mode of embodiment for leaking the electricity from the rotating post.
Figure 5:
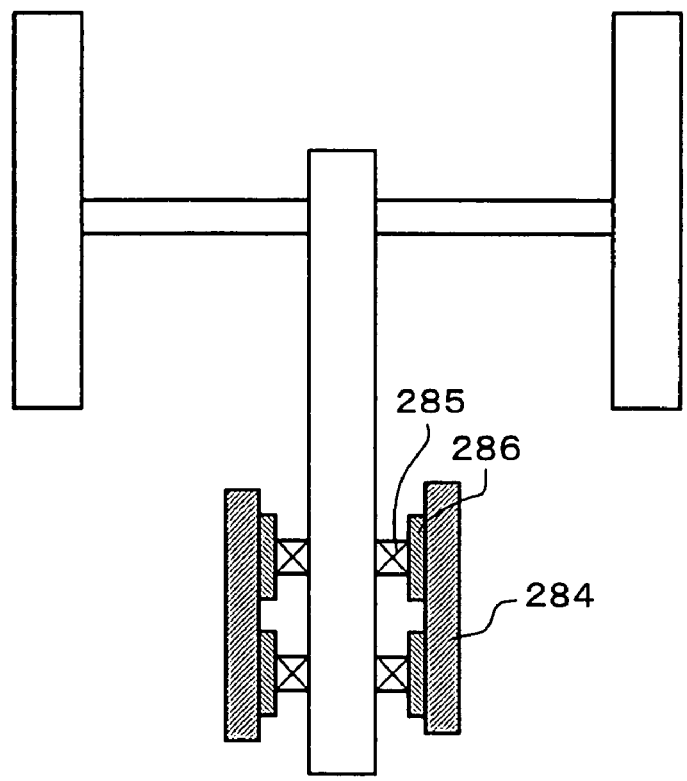

FIG. 5(a) is a diagram showing one example of the mode of embodiment for leaking the electricity from the rotating post. An electric brush 281 for leaking the electricity from the rotating post 282 is so disposed at a midway portion of the outer tube 284 of bearings 285 that its leading end portion may contact with the rotating post 282. On the other hand, the side portion of the electric brush 281, as opposite to the side contacting with the rotating post 282, is earthed to the ground.

According to the mode of embodiment described above, it is possible to prevent the damage at the falling time of a thunderbolt.

FIG. 5(b) is a diagram showing another example of the mode of embodiment for leaking the electricity from the rotating post. Insulating members 286 are sandwiched between the rotating post 282 and the outer tube 284 of the bearings 285 for supporting the rotating post 282.

According to the mode of embodiment described above, it is possible to attain effects similar to those of the mode of embodiment of FIG. 5(a).

Figure 24:
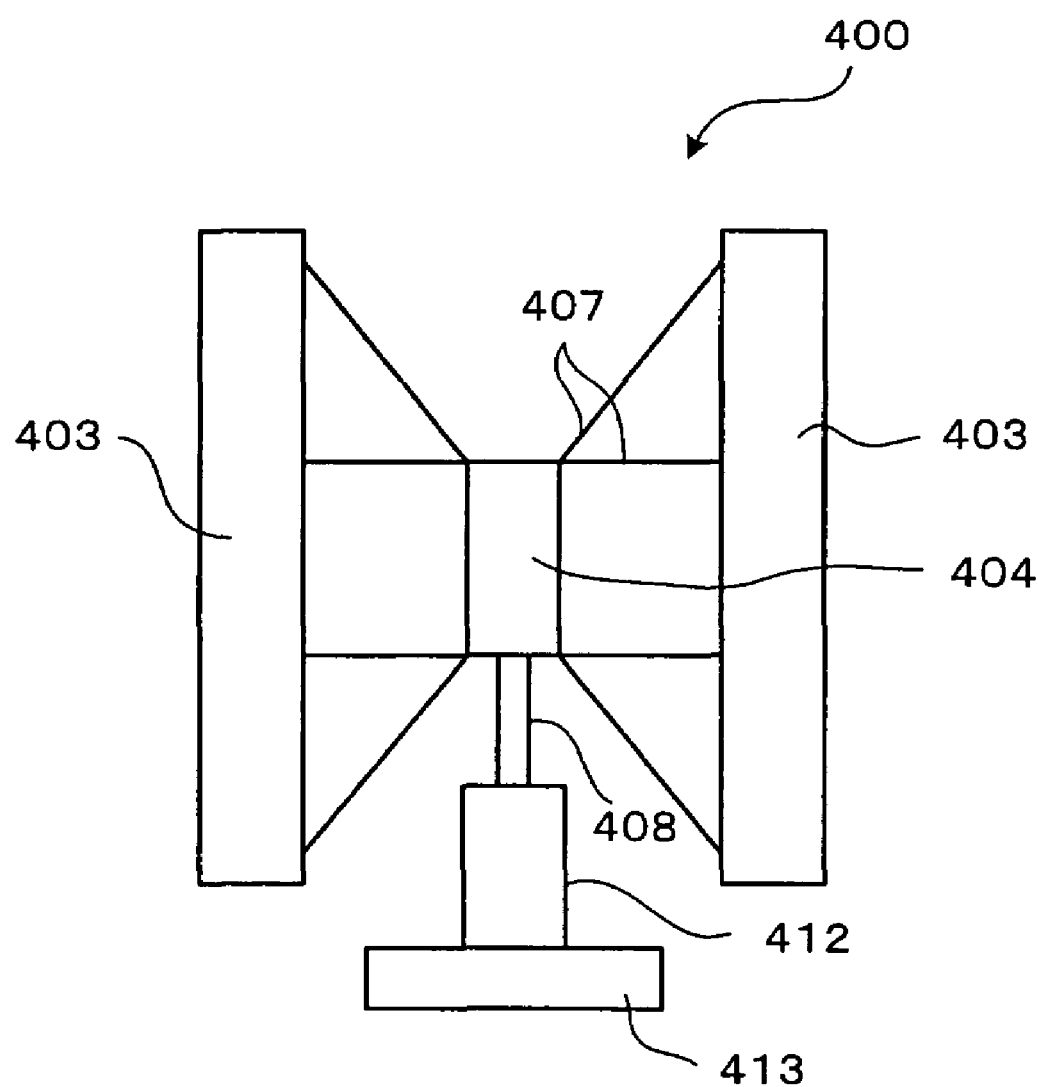
FIG. 24 is a schematic diagram of the entirety of the vertical axis type wind power station according to the invention.
Figure 25:
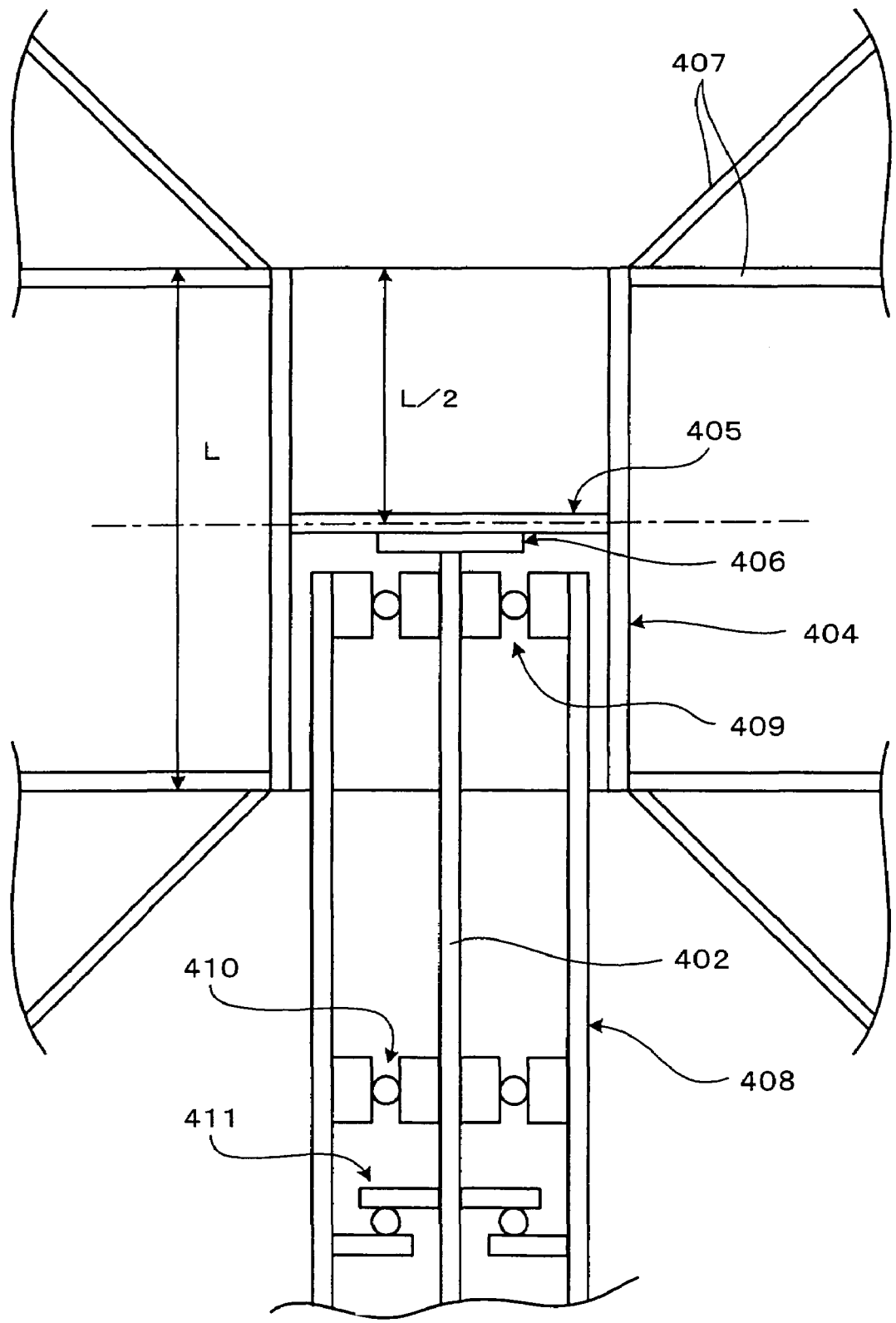
FIG. 25 is a sectional view of one example of the peripheral portion of a tube-shaped rotating post in the vertical axis type wind power station of FIG. 24.

Here will be described a vertical axis type wind power station according to the invention, as shown in FIG. 24. FIG. 25 is a sectional view of one example of the peripheral portion of the tube-shaped rotating post in the vertical axis type wind power station of FIG. 24.

The vertical axis type wind power station 400 according to the invention is provided, as shown in FIG. 24 and FIG. 25, with: a rotating post 402 erected upright; two longitudinal blades 403 attached in the circumferential direction of the rotating post 402; a tube-shaped rotating member 404 attached to the rotating post 402 through disc-shaped flanges 405 and 406; support members 407 connecting the tube-shaped rotating member 404 and the individual blades 403; a tube 408 supporting the rotating post 402 rotatably through bearings 409, 410 and 411; a generator device 412 arranged below the rotating post 402; and a base 413 for supporting the station as a whole.

The rotating post 402 is arranged at the center of the vertical axis type wind power station 401 thereby to transmit the turning force of the rotating member 404 to the generator device 412.

Figure 28:
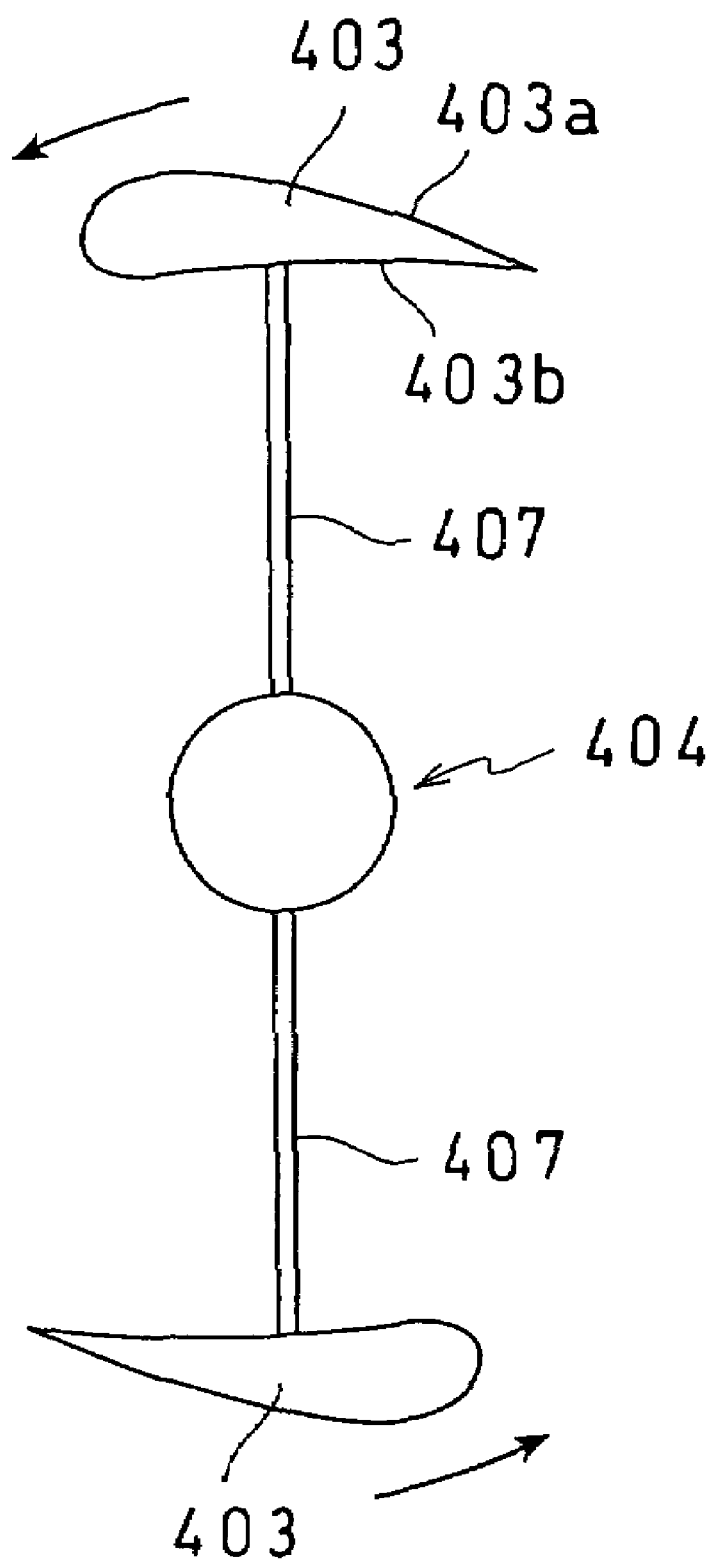
FIG. 28 is a top plan view of the vertical axis type wind power station according to the invention.

The blade 403 is shaped to have a section of or like the wing of an aeroplane, as shown in FIG. 27. As shown in FIG. 28, moreover, the blades 403 are arranged symmetrically with respect to the tube-shaped rotating member 404, as shown in FIG. 28, when the vertical axis type wind power station 400 is seen downward. Here, the number of the blades 403 is exemplified by two in this mode of embodiment, but may be three or more. Moreover, one face 403a and the other face 403b of one of the two blades 403 shown in FIG. 28 may be reversed.

The tube-shaped rotating member 404 is made of a tube having a circular section and is provided at its central portion with the plate-shaped horizontal flange 405. Moreover, the tube-shaped rotating member 404, the flange 405 and the blades 3 are so arranged that their individual vertical center lines may be aligned (as referred to a single-dotted line in FIG. 25). As shown in FIG. 25, more specifically, the tube-shaped rotating member 404, the flange 405 and the blades 403 are arranged with the center line, which is located at a distance of L/2 from one end of the tube-shaped rotating member 404 having a length L.

Here, the tube-shaped rotating member 404 may be a tube having a polygonal section, a tube having a framed structure or a tube having a vertical spindle shape.

The flange 406 is provided for fixing the flange 405 reliably on the rotating post 2.

The support members 407 are provided for fixing and supporting the blades 403 and the tube-shaped rotating member 404, and are arranged vertically symmetrically with respect to the single-dotted line in FIG. 25. The support members 407 may be a rod or pipe shape or a plate shape. In the case of the pipe shape, the pipe may be pushed in the sectional direction to have an elliptical section and may be attached in a direction to suppress the air resistance. Moreover, the construction may be modified to balance the strength and the light weight by combining thin support members and thick support members.

In the upright tube 408, there are arranged the radial ball bearings 409 and 410, the rotating post 402 and the thrust ball bearing 411.

The radial ball bearings 409 and 410 bear the load in the direction perpendicular to the direction of the rotating post, and are fixed in the upper and midway portions on the inner wall of the tube 408 thereby to support the rotating post 402 rotatably. Here, the radial ball bearing 410 may be replaced by the so-called "touchdown ball bearing" for bearing the load of the rotating post 402 temporarily when the rotating post 402 rocks transversely.

The thrust ball bearing 411 bears the load in the longitudinal direction of the rotating post 402, and is arranged on the inner wall of the tube 408 below and near the radial ball bearing 410.

Here, the radial ball bearings 409 and 410 may also be replaced by radial roller bearings. Moreover, the thrust ball bearing 411 may also be replaced by a thrust roller bearing or a thrust magnetic bearing.

In case the touchdown ball bearing is used, moreover, it may also be replaced by a touchdown roller bearing. In this case, moreover, the touchdown ball bearing may also be disposed below and near the thrust ball bearing 411.

Here will be described the actions of the vertical axis type wind power station 400.

The blades 403 transmit, when they receive the wind, the power of the wind force through the support members 407 to the tube-shaped rotating member 404. The support members 407 and the blades 403 attached to the tube-shaped rotating member 404 are arranged to balance the center of gravity on the single-dotted line in FIG. 25, and the distance between the center of gravity of the tube-shaped rotating member 404 and the disposition of the bearings is short, so that the tube-shaped rotating member 404 rotates while being well balanced in the circumferential direction. And, the tube-shaped rotating member 404 transmits the turning force to the rotating post 402 through the flanges 405 and 406, which are disposed at the center in the tube-shaped rotating member 404. The rotating post 402 rotates while being rotatably supported by the bearings 409, 410 and 411 in the tube 408, thereby to transmits the turning force to the generator device 412. As a result, the power is generated by the generator device 412.

According to this mode of embodiment, the support members 407 and the blades 403 attached to the tube-shaped rotating member 404 are arranged to balance the center of gravity with respect to the single-dotted line in FIG. 25, and the distance between the center of gravity of the tube-shaped rotating member 404 and the disposition of the bearings is short, so that the tube-shaped rotating member 404 rotates while being well balanced in the circumferential direction and so that the horizontal bending moment due to the cross wind can be reduced on the rotating post 402. As a result, the rotating post need not be thickened so that the diameters of the bearings can be reduced. Therefore, it is possible to provide a small-sized light-weight vertical axis type wind power station, which can suppress the mechanical loss thereby to make the power generation efficient.

Figure 26:
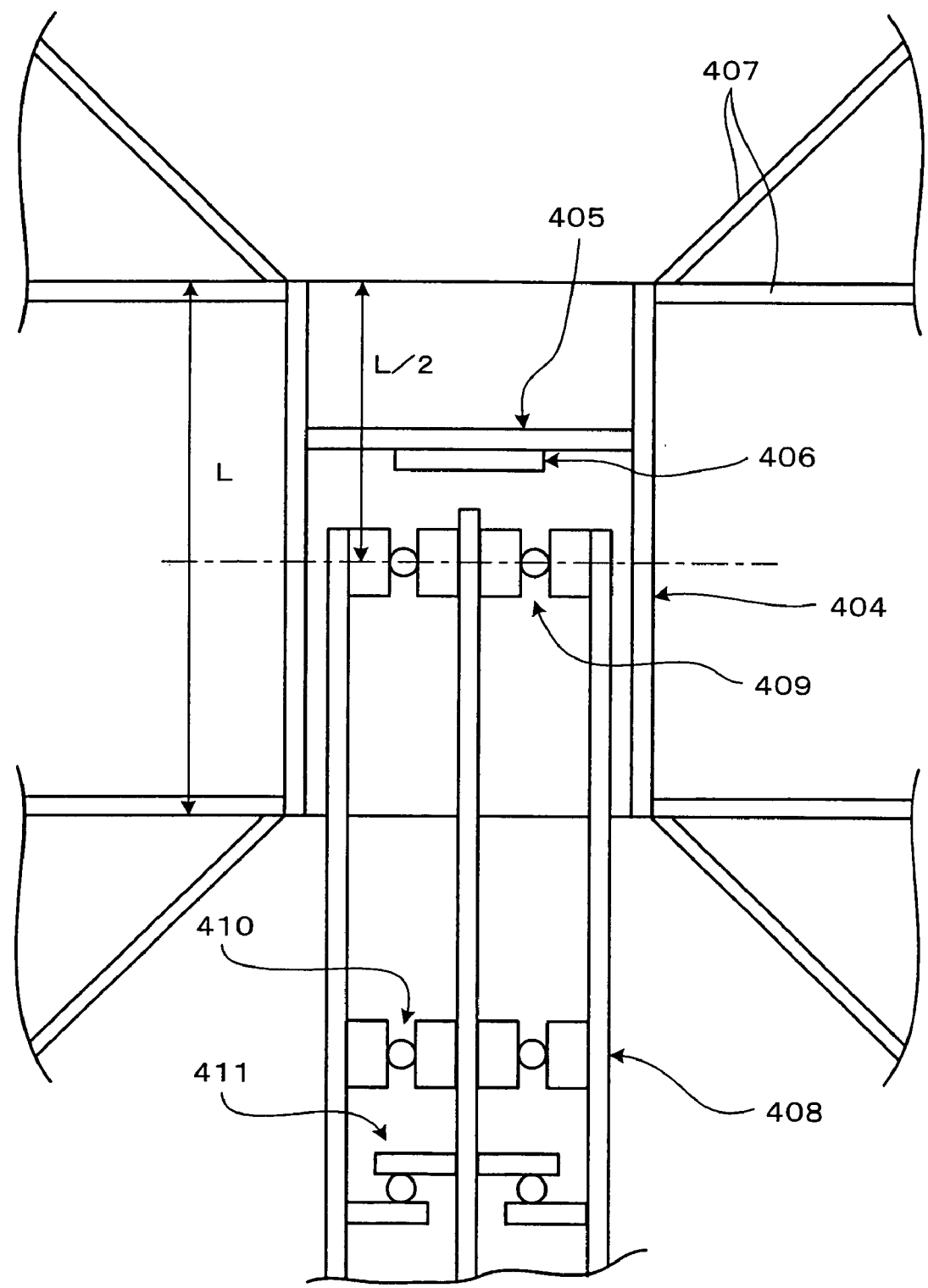
FIG. 26 is a sectional view of another example of the peripheral portion of a tube-shaped rotating post in the vertical axis type wind power station of FIG. 24.

Here will be described another example of the vertical axis type wind power station 400 according to the invention. FIG. 26 is a sectional view of another example of a tube-shaped rotating member in the vertical axis type wind power station of FIG. 24. Here, the description may be omitted on the portions similar to those of the vertical axis type wind power station 400.

The vertical axis type wind power station having the tube-shaped rotating member 404 of FIG. 26 has a construction substantially similar to that of the vertical axis type wind power station 400, excepting that the tube-shaped rotating member 404, the radial ball bearing 9 and the blades 403 are arranged to have their individual vertical center lines aligned (as referred to a single-dotted line in FIG. 26). As shown in FIG. 26, more specifically, the tube-shaped rotating member 404, the radial ball bearing 409 and the blades 403 are arranged on the center line, which is located at the distance of L/2 from one end of the tube-shaped rotating member 404 having the length L.

Here will be described the actions of that another example of the vertical axis type wind power station 400.

The blades 403 transmit, when they receive the wind, the power of the wind force through the support members 407 to the tube-shaped rotating member 404.

The support members 407 and the blades 403 attached to the tube-shaped rotating member 404 are arranged to balance the center of gravity with respect to the single-dotted line in FIG. 26, and the distance between the center of gravity of the tube-shaped rotating member 404 and the disposition of the bearings is short, so that the tube-shaped rotating member 404 rotates while being well balanced in the circumferential direction. And, the tube-shaped rotating member 404 transmits the turning force to the rotating post 2 through the flanges 405 and 406, which are disposed at the center in the tube-shaped rotating member 404. The rotating post 2 rotates while being rotatably supported by the bearings 409, 410 and 411 in the tube 408, thereby to transmits the turning force to the generator device 412. As a result, the power is generated by the generator device 412.

According to that another example of the vertical axis type wind power station 400, it is possible to attain effects similar to those of the aforementioned vertical axis type wind power station 400.

Here will be described the structure and method for mounting the wind-driven device of the small-sized wind power station according to the invention.

Figure 29:
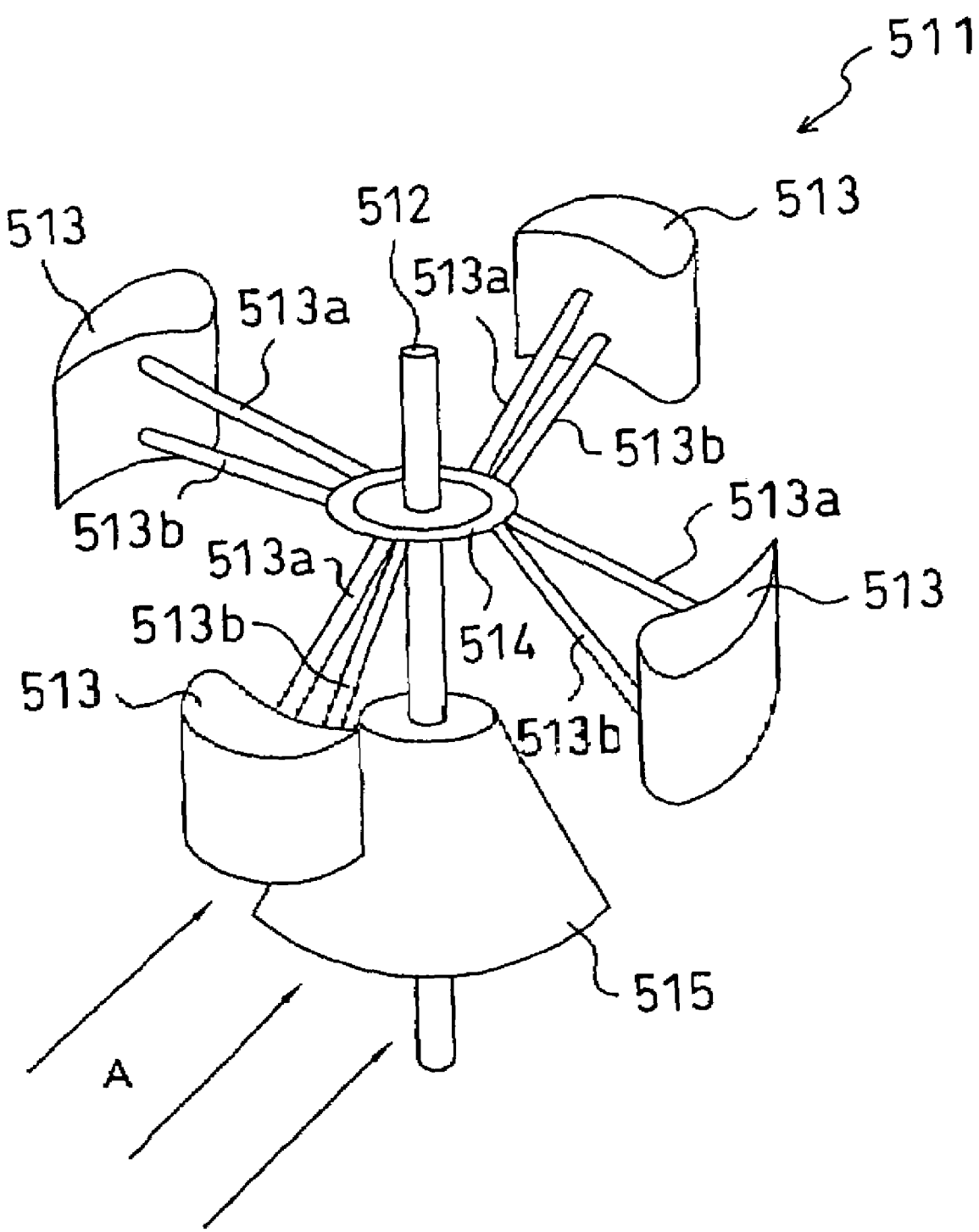
FIG. 29 is a perspective view of a wind-driven device according to the invention.

First of all, the description is made on a wind-driven device 511 according to the invention. As shown in FIG. 29, the wind-driven device 511 is provided with a rotating shaft 512, blades 513, a rotating plate 514 and a wind collecting member 515. This wind collecting member 515 is formed into a shape of a hollow cone having a tip cut off. In the face of the wind collecting member 515, from which the tip is cut off, there is formed a (not-shown) hole for inserting the rotating shaft 512 thereinto. The rotating shaft 512 is rotatably inserted into that hole.

The disc-shaped rotating plate 514 is so arranged in the vicinity of the upper end portion of the rotating shaft 512 that it may rotate with the rotating shaft 512. Moreover, the not-shown power generator is connected to the rotating shaft 512 so that it generates the electric power with the turning drive force of the rotating shaft 512. The rotating plate 514 is provided with upper support members 513a and lower support members 513b, which are fixed to the upper portions and the lower portions of the blades 513, respectively.

These blades 513 are equivalently arranged on the rotating plate 514 through the upper support members 513a and the lower support members 513b. The blades 513 are extended perpendicularly of the rotating direction and are curved to receive a wind A easily. This wind A forces the curved portions of the blades 513 to turn the blades 513 thereby to rotate the rotating shaft 512. Moreover, the wind A blowing below the blades 513 is turned upward by the skirted side face of the wind collecting member 515 thereby to turn the blades 513.

Figure 30:
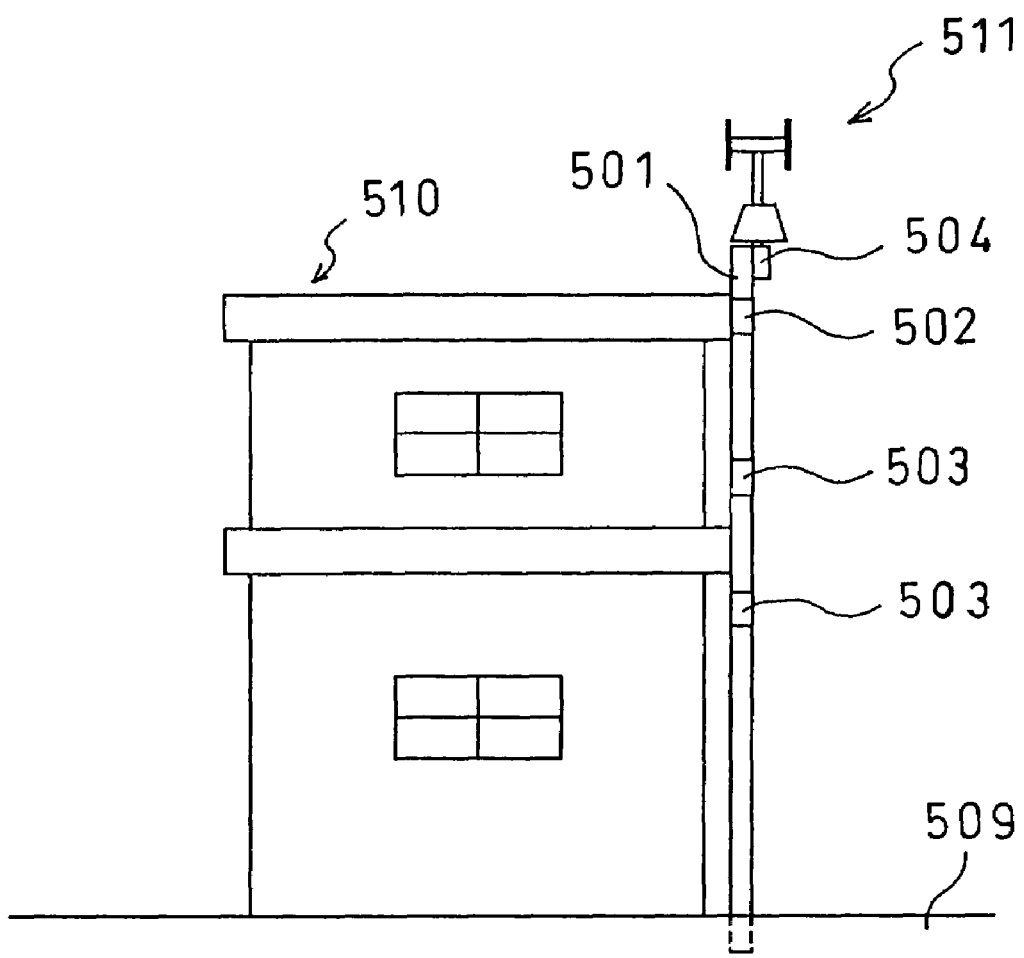
FIG. 30 is a schematic diagram of a mounting structure of the wind-driven device according to a preferred mode of embodiment of the invention.

Here will be described the mounting structure according to this mode of embodiment, in case the wind-driven device 511 thus far described is placed on a building 510 of reinforced concrete. As shown in FIG. 30, the structure for mounting the wind-driven device according to this mode of embodiment is provided with a fixing pole 501, a connecting member 502, joints 503 and a fan fixing member 504.

This fan fixing member 504 is disposed at the upper end portion of the fixing pole 501. Moreover, the fan fixing member 504 is provided with the not-shown bearing, through which the rotating shaft 512 of the wind-driven device 511 is rotatably supported by the fan fixing member 504. As a result, the wind-driven device 511 is supported at the upper end portion of the fixing pole 501. Here, the power generator connected to the rotating shaft 512 may be disposed in the fan fixing member 504.

Figure 31:
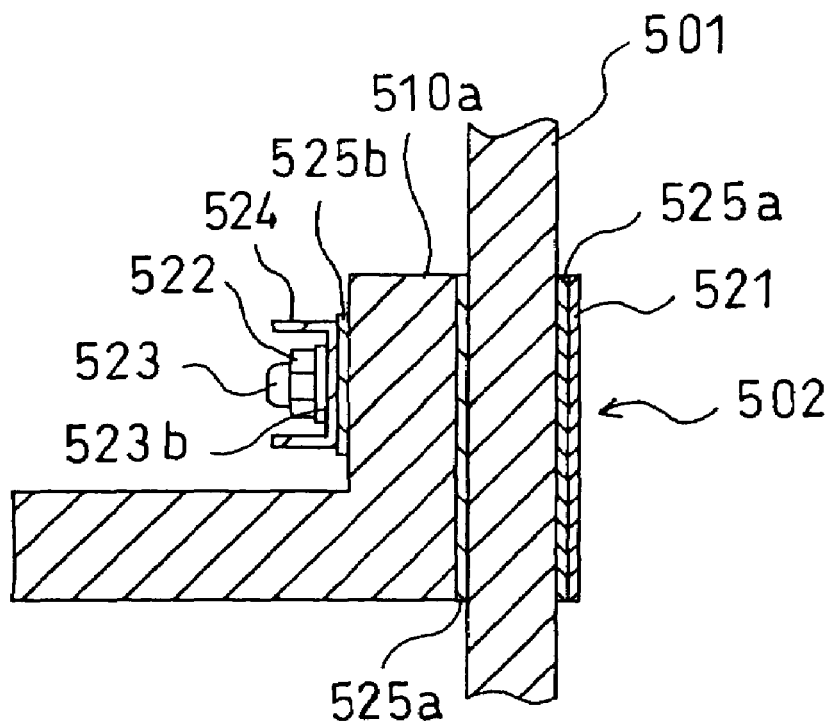
FIG. 31(a) is a sectional view of the portion, at which the connecting member drawn in FIG. 30 is disposed.
FIG. 31(b) is a top plan view of the portion, at which the connecting member drawn in FIG. 30 is disposed.
Figure 31:
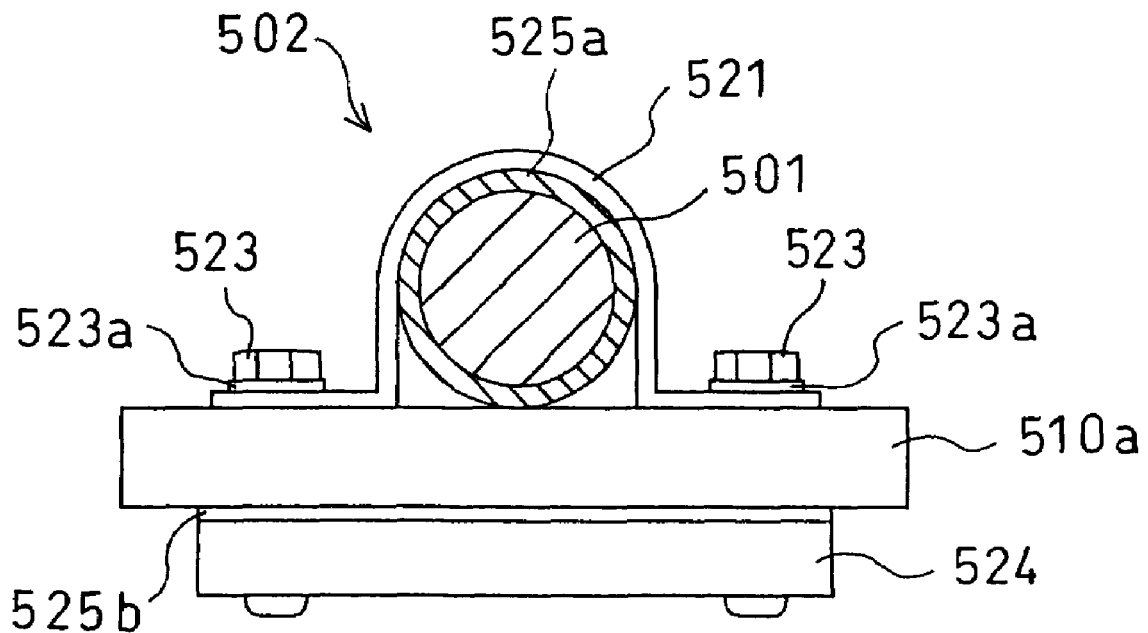

The fixing pole 501 is fixed on the building 510 near the upper end portion having the wind-driven device 511 by the connecting member 502. This connecting member 502 is described in the following. As shown in FIG. 31, the connecting member 502 is provided with a U-shaped fixture 521, a nut 522, a bolt 523, neoprene rubber members 525a and 525b, and a C-shaped fixture 524.

The U-shaped fixture 521 is provided with two joint portions, which have (not-shown) holes and which are disposed in the open portion of the U-shape. These joint portions are held in contact with the wall 510a of the building 510 of the U-shaped fixture 521 while fitting the fixing pole 501 in the U-shaped recess. Here in the portion of the fixing pole 501, where the U-shaped fixture 521 is arranged, the neoprene rubber member 525a of foamed rubber is wound on the fixing pole 501. As a result, the fixing pole 501 can be tightly fixed on the wall 510a by the U-shaped fixture 521 so that the fixed portion can be made stronger.

Across the wall 510a of the building 510 and at a position opposite to the U-shaped fixture 521, there are arranged the neoprene rubber member 525b and the C-shaped fixture 524. Of these, the neoprene rubber member 525b is sandwiched between the wall 510a and the C-shaped fixture 524. In the wall 510a of the building 510 and the vicinities of the two ends of the neoprene rubber member 525b and the C-shaped fixture 524, there are formed (not-shown) holes. The neoprene rubber member 525b and the C-shaped fixture 524 are arranged with those individual holes being registered with each other.

The bolts 523 are inserted from the side of the U-shaped fixture 521 into the holes, and the nuts 522 are fastened from the side opposite to the U-shaped fixture 521, thereby to fix the U-shaped fixture 521, the neoprene rubber member 525b and the C-shaped fixture 524 on the wall 510a. At this time, a washer 523a and a spring washer 523b are sandwiched individually between the bolt 523 and the U-shaped fixture 521 and between the nut 522 and the C-shaped fixture 524.

The neoprene rubber member 525b eliminates the clearance between the C-shaped fixture 524 and the wall 510a thereby to fix the C-shaped fixture 524 firmly on the wall 510a. Moreover, the fixture 524 is shaped in the letter "C" to enclose above and below the nut 522. With this C-shaped fixture 524, the fastening pressure of the nut 522 is dispersed but not concentrated at one portion thereby to improve the durability.

Moreover, a waterproof sealant is applied to the inner walls of the holes formed in the wall 510a and to the surfaces of the nuts 522, the bolts 523 and the individual washers 523a and 523b. As a result, the wall 510a can be prevented from being soaked with the water of rain.

Here, the connecting member 502 is disposed at a position above the central portion of the fixing pole 501. As a result, the distance from the disposition of the connecting member 502 to the lower end portion of the fixing pole 501 is longer than the distance from the disposition of the connecting member 502 to the upper end portion of the fixing pole 501. Even in case a strong force is applied to the wind-driven device by a strong wind, therefore, it is not applied to the fixed portion of the fixing pole 501 and a ground 509, as will be described in the following.

Figure 32:
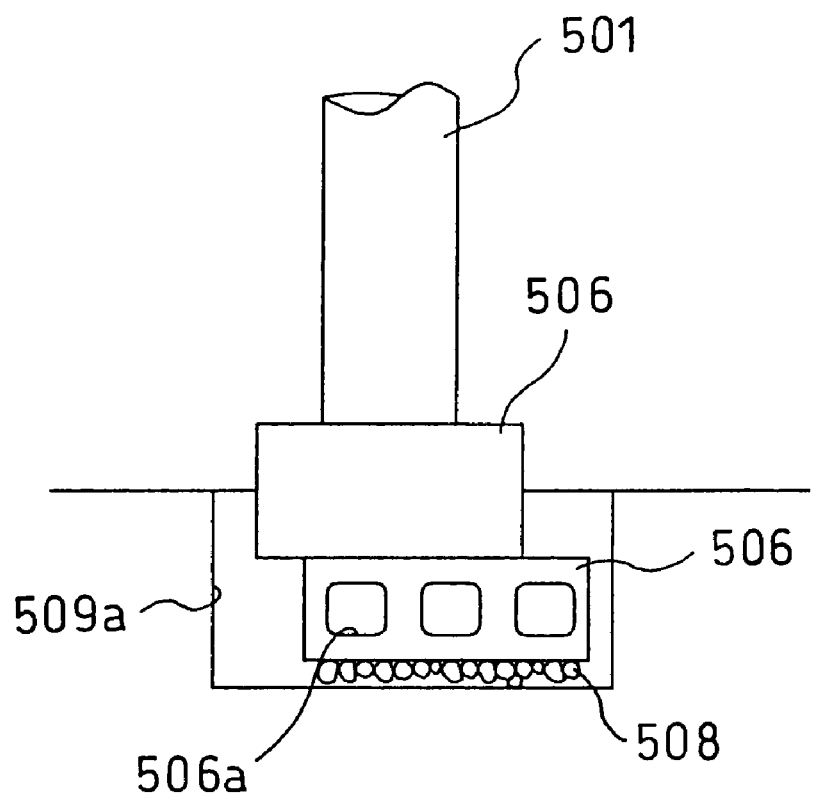
FIG. 32(a) is a sectional view of a fixing portion of the fixing pole and the ground drawn in FIG. 30.
FIG. 32(b) is a top plan view of the fixing portion of the fixing pole and the ground drawn in FIG. 30.
Figure 32:
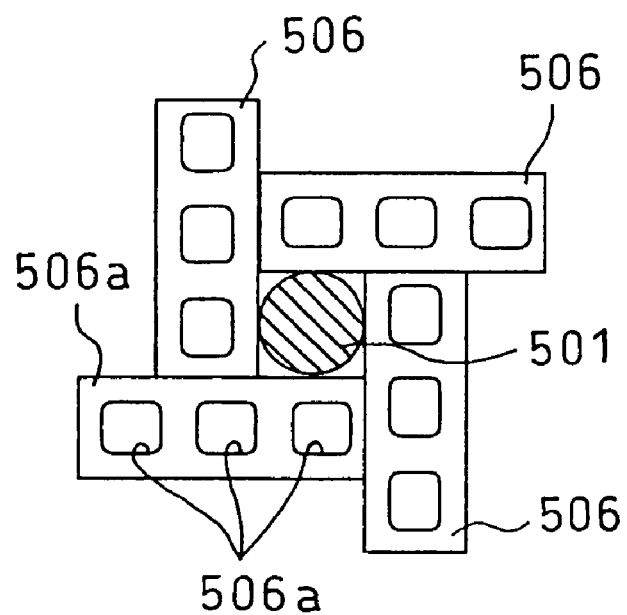

The fixing pole 501 is buried at its lower end portion in the ground 509. For the portion to bury the fixing pole 501, as shown in FIG. 32(a) and FIG. 32(b), a hole 509a having a depth of about 30 cm is formed in the ground 509. And, the hole 509a is paved on its bottom with gravel 508 as thick as about 10 cm. The (not-shown) cement is poured over the gravel 508 thereby to fix the gravel 508.

Blocks 506 are laid in juxtaposition over the poured cement before the cement solidifies. The block 506 has a rectangular parallelepiped shape and has holes 506a extending perpendicularly to the longitudinal direction. Here, the direction, in which the holes 506a are perpendicular to the ground 509, is determined as the longitudinal direction of the block 506. Cement is then poured over the juxtaposed blocks 506 to erect the fixing pole 501 upright. This fixing pole 501 erected is enclosed and fixed by the four blocks 506 placed in the longitudinal direction to form a swastika pattern. And, cement is poured into the holes 506a of the four blocks 506 of the swastika pattern. Moreover, the hole 509a is buried with the soil or the like to fix the fixing pole 501 in the ground 509.

Figure 33:
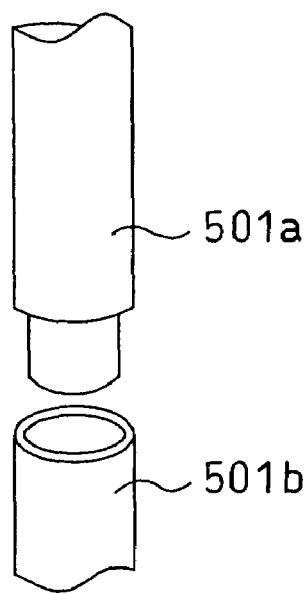
FIG. 33(a) is a view illustrating a connecting structure of pipes forming the fixing pole.
FIG. 33(b) is an enlarged view of the joint portion drawn in FIG. 30.
Figure 33:
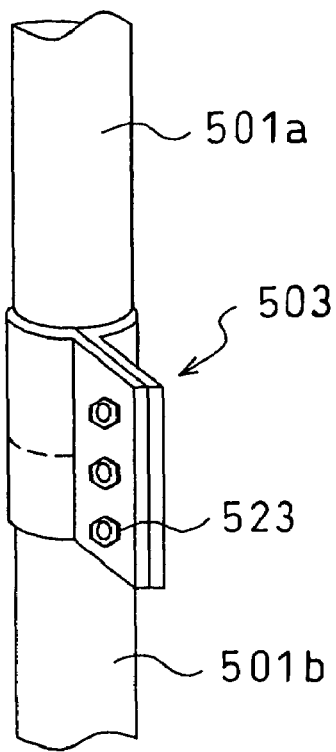

On the other hand, the fixing pole 501 is formed into one tube-shaped rod by connecting a plurality of pipes 501a, 501b, - - -, and so on removably. As shown in FIG. 33(a), the pipes 501a and 501b are tubes, each of which is reduced at its one end to have a slightly smaller diameter. The pipes 501a and 501b are connected by fitting the diametrically reduced end of the pipe 501a in the unreduced end of the pipe 501b.

The joint 503 covers and fixes the connected portion of the pipes 501a and 501b. The joint 503 has a hollow tube-shaped fixture, which can enclose the pipes 501a and 501b (or the fixing pole 501). Moreover, the tube-shaped fixture is partially cut off and is provided at the cut portion with two joint members, which have (not-shown) holes and which are separated but can mate each other. By bringing the two joint members away from each other, the cut portion is opened so that the pipes 501a and 501b can be fitted in the hollow tube-shaped fixture of the joint 503.

With the pipes 501a and 501b being fitted in the joint 503, the bolts 523 are inserted from one side into the holes of the joint members of the joint 503, and the nuts 522 are fastened from the other side. Then, the pipes 501a and 501b are fixed by the joint 503.

Here will be described the method for mounting the wind-driven device 511. First of all, the hole 509a is formed in the ground 509, and the fixing pole 501 is fixed upright in the ground 509, as has been described hereinbefore. The fixing pole 501 is fixed at a region over its central portion on the building 510 by the connecting member 502.

Moreover, the fan fixing member 504 having the bearings is arranged at the upper end of the fixing pole 501. The wind-driven device 511 is arranged on the fan fixing member 504 so that its rotating shaft 512 may be rotatably supported through the bearings of the fan fixing member 504.

According to the invention, as has been described hereinbefore, the connecting position between the fixing pole 501 and the building 510 is disposed at a position above the central portion of the fixing pole 501. As a result, the distance from the connecting position to the lower end portion of the fixing pole 501 is longer than the distance from the connecting position to the upper end portion of the fixing pole 501. Even in case the strong force is applied to the wind-driven device 511 by a strong wind if the connecting position is considered as a fulcrum, therefore, it is not applied from a relation of the balance of forces to the lower end portion of the fixing pole 501, as fixed in the ground 509. This makes it unnecessary to fix the fixing pole 501 firmly in the ground 509 and to dig the hole 509a deeply thereby to facilitate the installing works. As a result, it is also possible to suppress the rise in cost for the installation. Moreover, the fixing pole 501 is formed by connecting the pipes 501a, 501b, - - -, and so on removably so that it can be easily transported.

Figure 34:
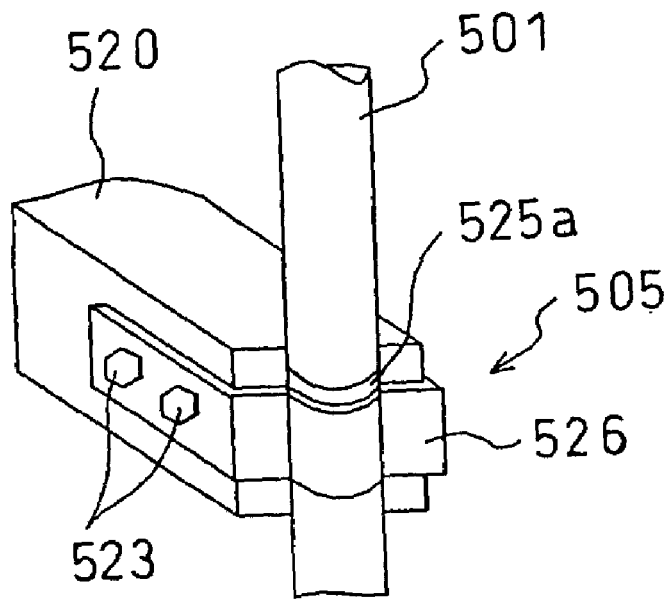
FIG. 34(a) is a perspective view of the connecting member of the mounting structure of a wind-driven device of a modification.
FIG. 34(b) is a top plan view of the connecting member of the mounting structure of the wind-driven device of the modification.
Figure 34:
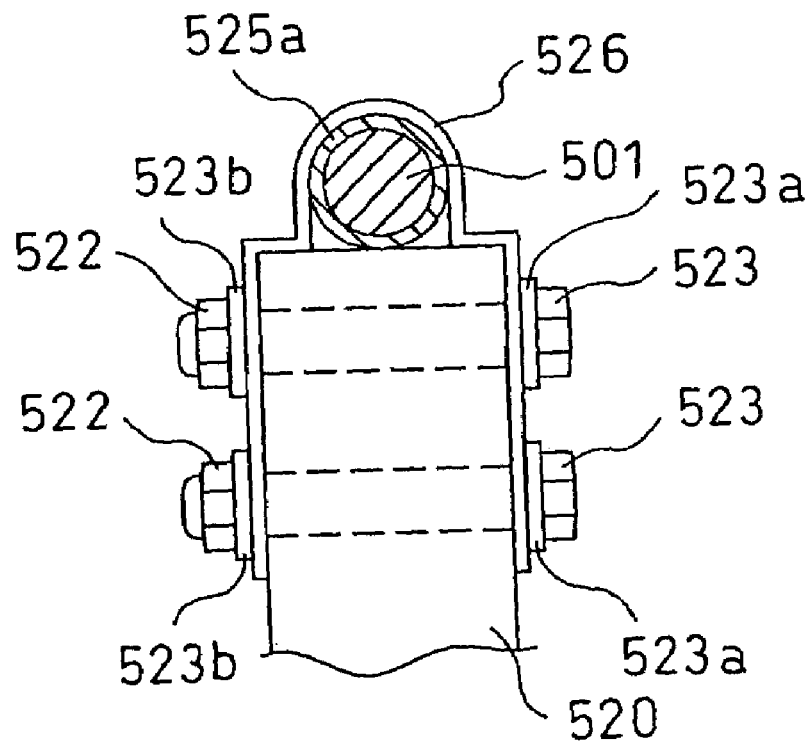

Here, this mode of embodiment has been described on the case, in which the wind-driven device 511 is fixed on the building 510 of the reinforced concrete. In a modification, the wind-driven device 511 may also be fixed on a wooden house. In this case, as shown in FIG. 34, the fixing pole 501 is fixed on a wooden column 520 by a connecting member 505 having a clamping fixture 526. This clamping fixture 526 is a U-shaped fixture having a width substantially equal to that of the wooden column 520, and has joint portions for clamping the column 520. Moreover, the clamping fixture 526 and the column 520 have not-shown holes, and the clamping fixture 526 is arranged to register those holes.

Like the U-shaped fixture 521, the clamping fixture 526 fits the fixing pole 501 in its U-shaped recessed portion and clamps the column 520 tightly. At this time, the neoprene rubber member 525*a* is wound on the portion, in which the fixing pole 501 contacts with the clamping fixture 526 and the column 520. And, the bolts 523 are inserted from one side into the holes, and the nuts 522 are fastened from the other side thereby to fix the fixing pole 501 on the column 520. Here, the washer 523*a* and the spring washer 523*b* are sandwiched individually between the bolt 523 and the clamping fixture 526 and between the nut 522 and the clamping fixture 526. Moreover, a waterproof sealant is applied to the inner walls of the holes formed in the column 520 and to the surfaces of the bolts 523 and the individual washers 523*a* and 523*b*. As a result, the column 520 can be prevented from being soaked with the water.

On the other hand, the invention has been described on the basis of its preferable modes of embodiment but can be modified within the scope of the gist thereof.

For example, the structures of the connecting member 502 and the joint 503 thus far described for fixing the fixing pole 501 should neither be limited to those described in this mode of embodiment, nor should be limited the structure for burying the fixing pole 501 in the ground. It goes without saying that the depth of the hole 509*a* formed in the ground 509 should not be limited to the specified numerical value. Moreover, the fixing pole 501 is formed into the single circular column but may also be one long rod or may not have the tube-shaped shape. Moreover, the connecting structure of the pipes 501*a*, 501*b*, - - - , and so on should not be limited to that of the aforementioned mode of embodiment. For example, the connecting portions may use a screw type structure.

On the other hand, the wind-driven device 511 should not be limited to that described in this mode of embodiment. Moreover, the structure of the fan fixing member 504 for fixing the wind-driven device on the fixing pole 501 may also be other than that described in this mode of embodiment.

The fixing pole 501 is fixed on the building 510 by the connecting member 502 but may also be fixed at a plurality of positions. In this case, the fixing pole 501 may also be connected to the building 510 below its central portion. On the other hand, the method of mounting the wind-driven device 511 should not be limited to the mounting procedure described in this mode of embodiment.

Here will be described a wind power plant according to the invention.

Figure 35:
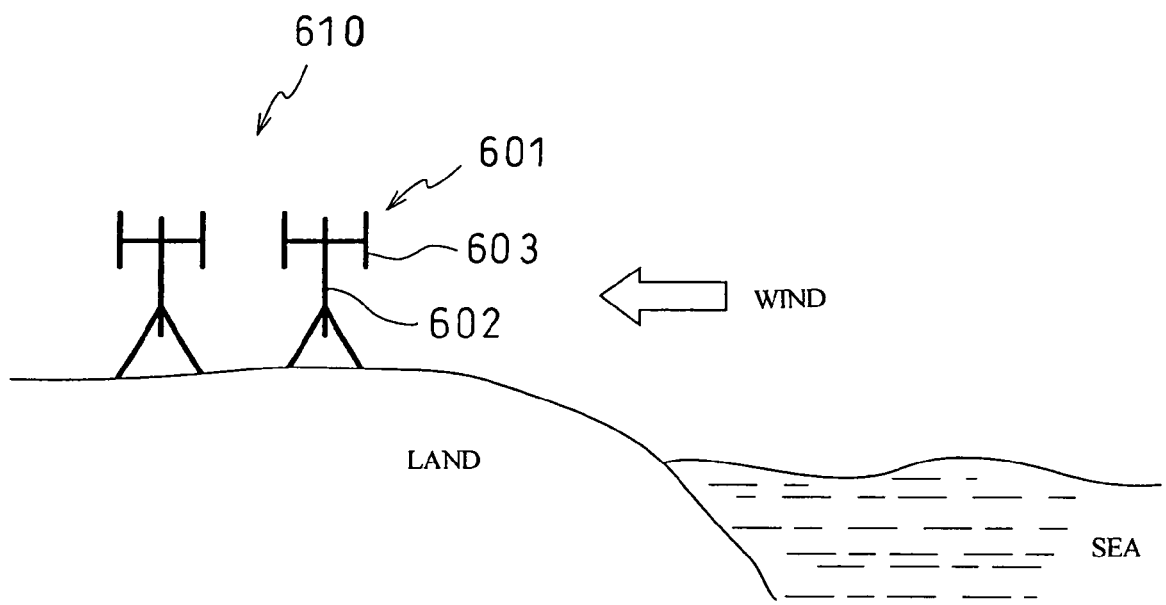
FIG. 35 is a schematic diagram showing a windbreak wind power plant according to the invention.

A windbreak wind power plant 610 according to one mode of embodiment of the invention is provided with a plurality of vertical axis type wind power stations 601 at a predetermined position of a shoreline, as schematically shown in FIG. 35. The foregoing vertical axis type wind power station or wind-driven device can be used as those vertical axis type wind power stations 601.

Figure 36:
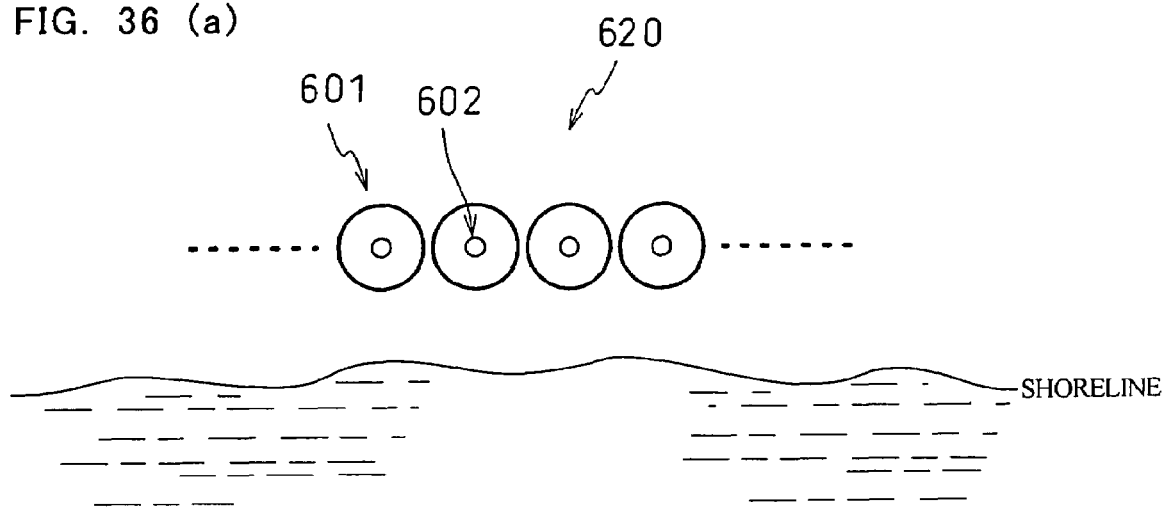
FIG. 36 presents diagrams showing examples of the installation of the windbreak wind power plant.
Figure 36:
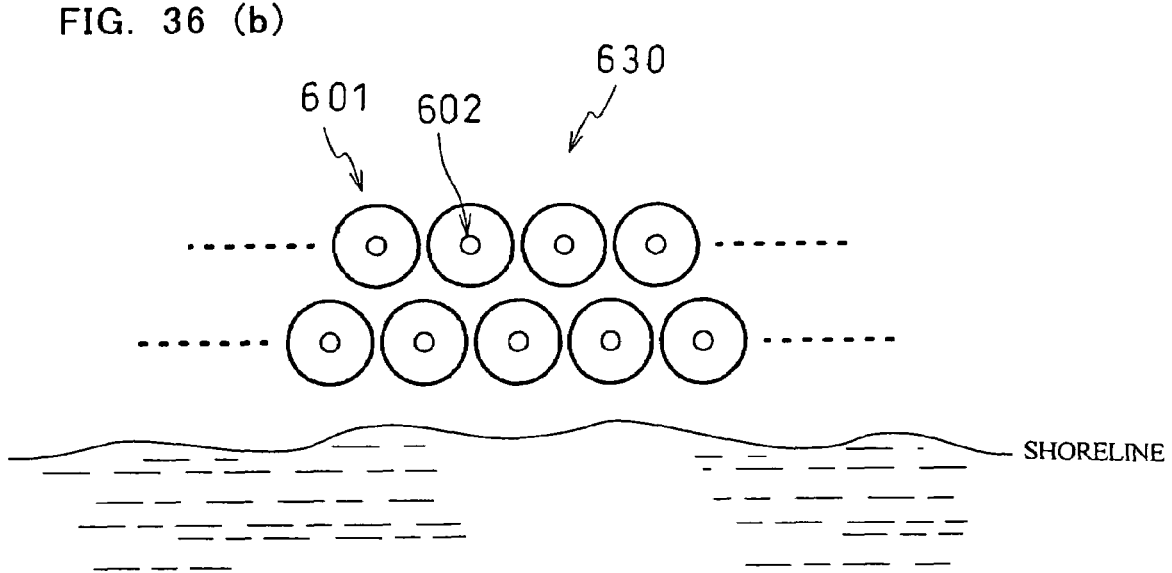

FIG. 36 presents diagrams showing examples of the installation of the windbreak wind power plant. FIG. 36(*a*) is a schematic diagram showing the case, in which the vertical axis type wind power stations are arranged in only one row on the ground along the shoreline, and FIG. 36(*b*) is a schematic diagram showing the case, in which the vertical axis type wind power stations of a second row are arranged on the land side between the row of FIG. 36(*a*). Here, the inner circle portions indicate center shafts 602, and the outer circles indicate the loci of turning motions of blades 603. Here, it is preferred that the blades 603 have a sectional shape of the wing of an aeroplane.

In FIG. 36(*a*), the vertical axis type wind power stations 601 are arranged at an equal interval on one row along the shoreline. The individual vertical axis type wind power stations 601 may be so arranged at a distance two times or more of the distance (or the radius of gyration) from the centers of the rotating shafts 602 to the outermost portions of the blades 603 that the individual blades may be prevented from contacting with each other.

Thus, the vertical axis type wind power stations 601 used have the longitudinal blades 603. Therefore, the individual vertical axis type wind power stations 601 can be disposed close to each other so that an effective windbreak can be made while generating the electric power.

In a windbreak wind power plant 630 of FIG. 36(*b*), the vertical axis type wind power stations of the second row are so disposed on the land side of the windbreak wind power plants 620 of FIG. 36(*a*) that their adjoining vertical axis type wind power stations are equidistantly arranged.

Thus, the vertical axis type wind power stations 601 used have the longitudinal blades so that their individual ones can be disposed close to each other. Therefore, it is possible to perform a more efficient windbreak than that of the plant shown in FIG. 36(*a*) while generating the electric power simultaneously.

In the windbreak wind power plants 620 and 630 thus far described, the vertical axis type wind power stations 601 are arrayed in the first and second rows. However, the invention should not be limited to those arrays, but the windbreak wind power plant may have the vertical axis type wind power stations 601 arrayed in three or more rows.

Figure 37:
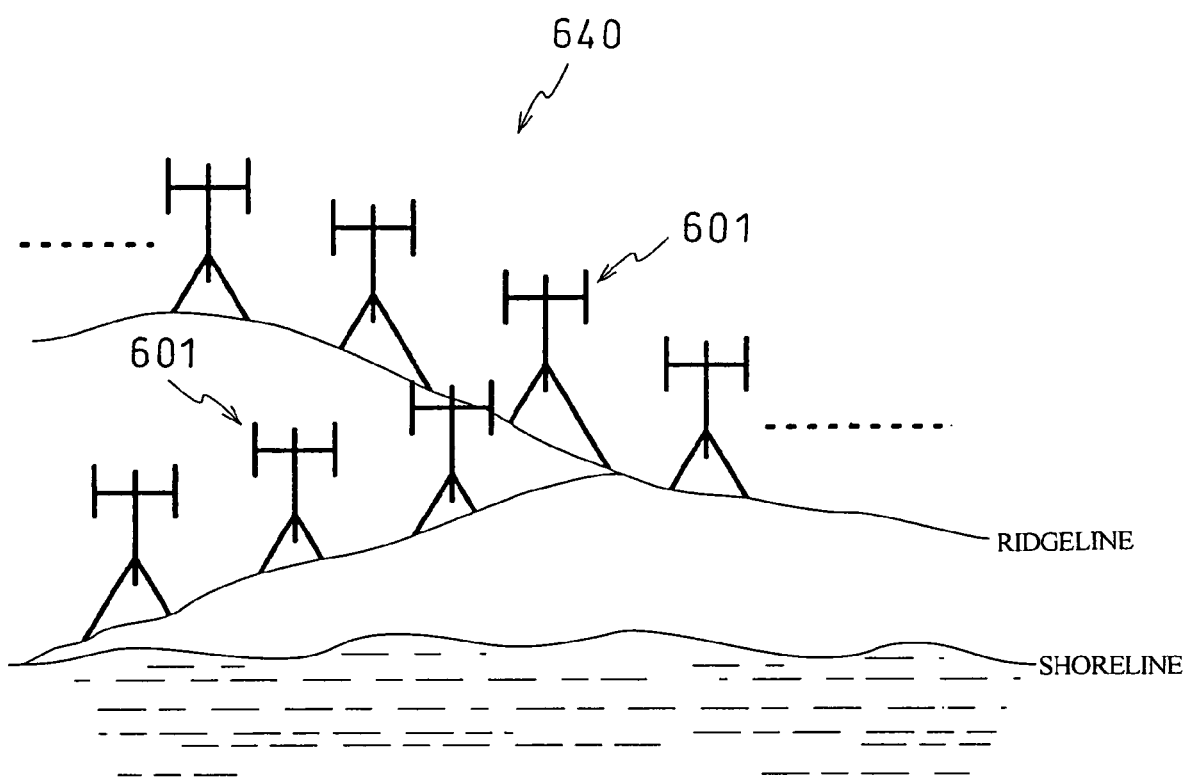
FIG. 37 is a schematic diagram showing another example of the windbreak wind power plant according to the invention.

Another example of the windbreak wind power plant is shown in FIG. 37. Even when the wind power plant is disposed along the ridgeline near the shoreline, as shown in FIG. 37, the windbreak can also be efficiently performed while generating the electric power simultaneously.

Figure 38:
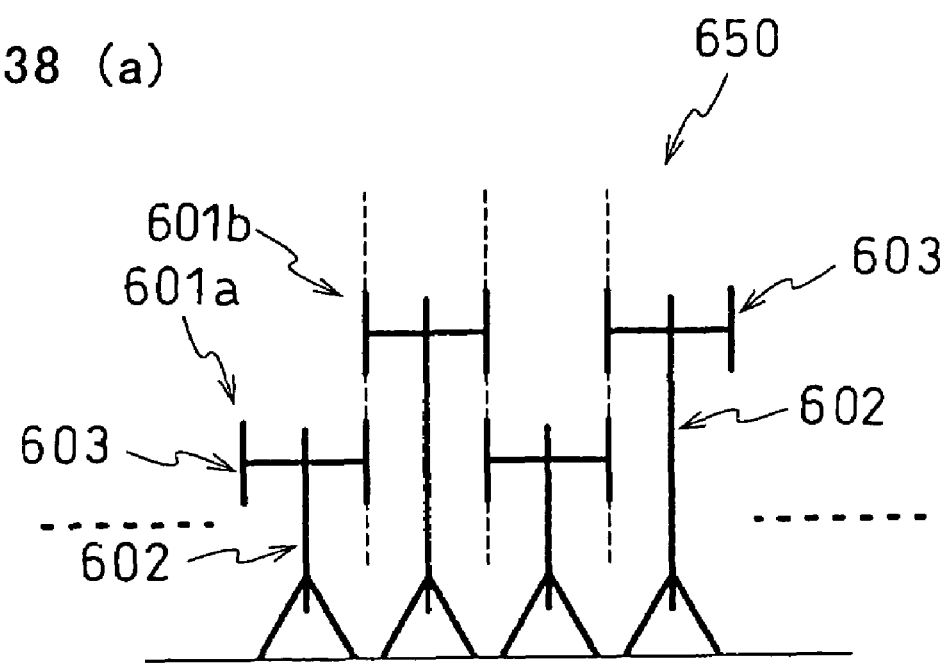
FIG. 38 presents schematic diagrams showing windbreak wind power plants, in which the blades of the individual vertical axis type wind power stations have individually different height positions.
Figure 38:
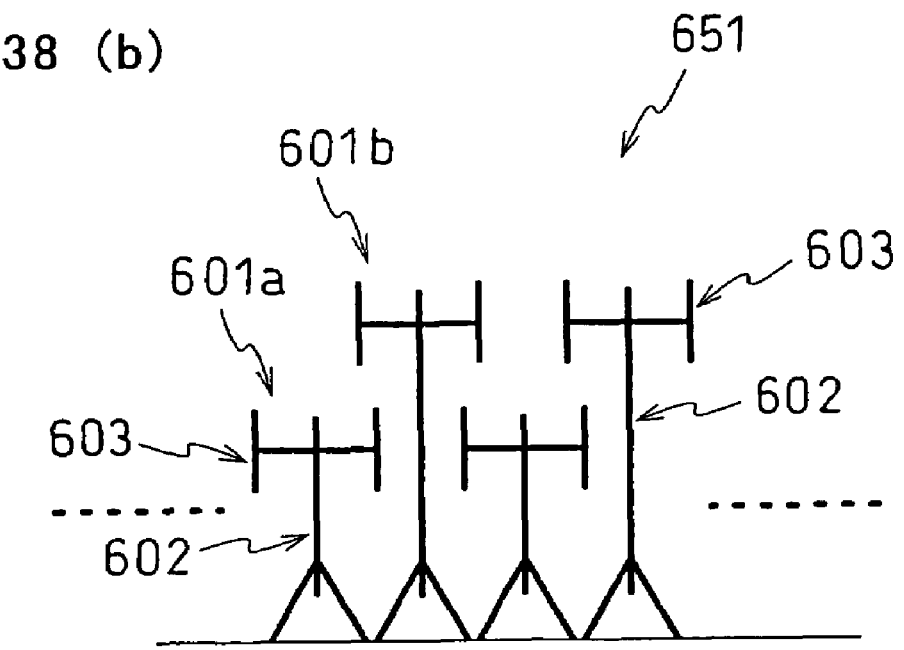

Another example of the windbreak wind power plant is shown in FIG. 38. FIG. 38 presents schematic diagrams showing windbreak wind power plants, in which the blades of the individual vertical axis type wind power stations have different height positions. FIG. 38(*a*) is a side elevation showing the arrangement, in which the loci of turning motions of the blades overlap just at one point when the windbreak wind power plant is viewed from above, and FIG. 38(*b*) is a side elevation showing the arrangement, in which the loci of turning motions of the blades overlap when the windbreak wind power plant is viewed from above.

In the windbreak wind power plant 650, as shown in FIG. 38(*a*), the individual vertical axis type wind power stations 601 are arranged in such one row that the turning locus of the blades 603 arrayed at an upper stage in the vertical axis type wind power stations 601*a* and the turning locus of the blades 603 arrayed at a lower stage in the vertical axis type wind power stations 601*b* may overlap (as referred to broken lines of FIG. 38(*a*)) when the windbreak wind power plant 650 is viewed from above.

With this arrangement, the upper and lower winds can be efficiently caught to perform the efficient windbreak and to generate the electric power.

As shown in FIG. 38(*b*), the individual vertical axis type wind power stations 601 are so closely arranged in one row that the turning locus of the blades 603 arrayed at an upper stage in the vertical axis type wind power stations 651a and the turning locus of the blades 603 arrayed at a lower stage in the vertical axis type wind power stations 601b may overlap when the windbreak wind power plant 651 is viewed from above.

With this arrangement, the upper and lower winds can be more efficiently caught than the windbreak wind power plant 650 shown in FIG. 38(a), to perform the efficient windbreak and to generate the electric power.

Here, FIGS. 38(a) and 38(b) show the examples, in which the vertical axis type wind power stations are arranged in one row. However, the invention should not be limited thereto but may be modified into an arrangement of two or more rows. Moreover, the blades 603 are positioned at the two upper and lower stages of the vertical axis type wind power stations 601a and 601b. However, the arrangement may also have three or more stages.

On the other hand, the windbreak wind power plant may combine the arrangements of FIG. 38(a) and FIG. 38(b). In this modification, the windbreak wind power plant may also have the vertical axis type wind power stations 601 of three or more rows.

INDUSTRIAL APPLICABILITY

The invention can provide a wind power station and a wind power plant, which are made efficient by utilizing the natural energy such as a wind. Therefore, the invention can be expected to serve as an aid for solving the environmental problems.

The invention claimed is:

1. A vertical axis type wind power station comprising:
a rotating post disposed upright; and
a plurality of longitudinal blades attached in the circumferential direction to said rotating post,
wherein said blades include main supporting members longitudinal of said blades, a multiplicity of wings-like boards inserted and fixed on said main supporting members, and contouring sheets applied around said wings-like boards, and
wherein said wings-like boards have projections formed on their peripheries that extend through said contouring sheets.

2. A vertical axis type wind power station as set forth in claim 1,
wherein said main supporting members, said wings-like boards and said contouring sheets are made of an aluminum alloy.

3. A vertical axis type wind power station as set forth in claim 1,
wherein said main supporting members have a polygonal section, one side of which is parallel to the chord length.

4. A vertical axis type wind power station as set forth in claim 3, further comprising a plate-shaped mounting bracket having a horizontal parallel face and attached to said main supporting member,
wherein a portion of said mounting bracket is accommodated in a space surrounded with said contouring sheet,
another portion of said mounting bracket extends through and projects from said contouring sheet toward the side of said rotating post, and
said mounting bracket has a side formed at least in its portion on said projecting portion and arranged in parallel with the chord length.

5. A vertical axis type wind power station as set forth in claim 4, further comprising:
support members mounted on said rotating post and configured to support said blades,
wherein said support member and said projecting portion of said bracket are jointed at at least two points and positioned at at least one point between said at least two jointed points.

6. A vertical axis type wind power station comprising:
a rotating post disposed upright; and
a plurality of longitudinal blades attached in the circumferential direction to said rotating post as set forth in claim 1,
wherein said blades include horizontal straightening plates.

7. A vertical axis type wind power station as set forth in claim 6,
wherein said straightening plates have a section similarly enlarged from the contour of the horizontal section of said blades.

8. A vertical axis type wind power station as set forth in claim 7,
wherein said straightening plates are so obliquely attached to said blades as to generate a lift at said rotating post.

9. A vertical axis type wind power station as set forth in claim 6,
wherein said straightening plates are so obliquely attached to said blades as to generate a lift at said rotating post.

10. A vertical axis type wind power station comprising:
a rotating post disposed upright; and
a plurality of longitudinal blades attached in the circumferential direction to said rotating post,
wherein said blades include main supporting members longitudinal of said blades, a multiplicity of wings-like boards inserted and fixed on said main supporting members, and contouring sheets applied around said wings-like boards,
wherein said wings-like boards have folded seats for placing said contouring sheets.

11. A vertical axis type wind power station as set forth in claim 10,
wherein said main supporting members have a polygonal section, one side of which is parallel to the chord length.

12. A vertical axis type wind power station as set forth in claim 11, further comprising:
a plate-shaped mounting bracket having a horizontal parallel face and attached to said main supporting member,
wherein a portion of said mounting bracket is accommodated in a space surrounded with said contouring sheet,
other portion of said mounting bracket extends through and projects from said contouring sheet toward the side of said rotating post, and
said mounting bracket has a side formed at least in its portion said projecting portion and arranged in parallel with the chord length.

13. A vertical axis type wind power station as set forth in claim 12, further comprising:
support members mounted on said rotating post and configured to support said blades,
wherein said support member and said projecting portion of said bracket are jointed at at least two points and positioned at at least one point.

14. A vertical type wind power station as set forth in claim 10,
wherein said main supporting members, said wings-like boards and said contouring sheets are made of an aluminum alloy.

15. A vertical axis type wind power station comprising:
a rotating post disposed upright; and a plurality of longitudinal blades attached in the circumferential direction to said rotating post,
wherein said rotating post is provided with transversely upward upper support members and transversely downward lower support members,
said blades are attached at their longitudinally upper and lower portions to the leading ends of said upper support members and said lower support members, and
each of said upper support member and said lower support member is generally formed from a plate-shaped member into an angle section that has a smaller modulus of section toward the leading end.

16. A vertical axis type wind power station as set forth in claim 15,
wherein said upper support member and said lower support member have substantial triangle sections.

17. A vertical axis type wind power station comprising:
a rotating post disposed upright;
a plurality of longitudinal blades arranged in the circumferential direction of said rotating post;
a rotor mounted on the leading end of said rotating post so that the position of the leading end of said rotating post is at the center of gravity of said vertical axis type wind power station;
two upper and lower arms attached obliquely downward or upward to said rotor and configured to support the two longitudinally upper and lower portions of the blade; and
two intermediate arms attached to said rotors in vertical symmetry with respect to a center of gravity of said rotors and configured to support the two intermediate portions between a longitudinal center and each of the two upper and lower portions of said blade.

18. A vertical axis type wind power station as set forth in claim 17,
wherein if: the longitudinal length of said blade is designated by c; the distance from the upper and lower ends of said blade to the supporting points of said two upper and lower portions is designated by a; and the distance from the supporting points of said two upper and lower supporting portions to said two intermediate portions is designated by b, the supporting points of said two upper and lower portions are positioned within a range of a/c=0.02 to 0.16, and the supporting points of said two intermediate portions are positioned within a range of b/c=0.18 to 0.37.

19. A vertical axis type wind power station as set forth in claim 18,
wherein said two upper and lower arms and said two intermediate arms are formed of hollow arms having hollow sections.

20. A vertical axis type wind power station as set forth in claim 18,
wherein said two upper and lower arms and said two intermediate arms are formed into a shape having a transversely flattened section.

21. A vertical axis type wind power station as set forth in claim 18,
wherein said rotor used is a tube-shaped rotor, and wherein said upper and lower arms are attached to the upper and lower ends of said rotor.

22. A vertical axis type wind power station as set forth in claim 17,
wherein said rotor used is a tube-shaped rotor, and wherein said upper and lower arms are attached to the upper and lower ends of said rotor.

23. A vertical axis type wind power station comprising:
a rotating post disposed upright;
a plurality of longitudinal blades attached in the circumferential direction to said rotating post;
a tube-shaped member arranging said rotating post therein;
a radial bearing arranged at the upper portion or the intermediate portion in said tube-shaped member and configured to support said rotating post rotatably;
a thrust bearing arranged at the lower portion in said tube-shaped member and configured to support said rotating post rotatably; and
a bearing disposed near said thrust bearing in the inner wall of said tube-shaped member at a clearance from said rotating post,
wherein said rotating post contacts, when it is transversely rocked, with the bearing disposed in the inner wall of said tube-shaped member.

24. A vertical axis type wind power station comprising:
a rotating post disposed upright by at least two bearings;
a plurality of longitudinal blades attached in the circumferential direction to said rotating post; and
an electric brush between said at least two bearings which is earthed to the ground to leak the electricity from said rotating post.

25. A vertical axis type wind power station comprising:
a rotating post disposed upright;
a plurality of longitudinal blades attached in the circumferential direction to said rotating post;
a tube-shaped rotor arranged concentrically of the center axis of said rotating post and in the vicinity of the upper portion of said rotating post;
a plate-shaped member disposed to have a horizontal flat face in said tube-shaped rotor; and
a bearing configured to support said rotating post rotatably,
wherein said tube-shaped rotor is connected to said rotating post through said plate-shaped member in the vicinity of the vertical center in said tube-shaped rotor, and
wherein said bearing is arranged near just below said connected position.

26. A vertical axis type wind power station as set forth in claim 25,
wherein said plate-shaped member is positioned at the vertical center position of said tube-shaped rotor.

27. A vertical axis type wind power station as set forth in claim 25,
wherein said bearing is arranged at the vertical center position of said tube-shaped rotor.

28. A vertical axis type wind power station comprising:
a rotating post disposed upright;
a plurality of longitudinal blades arranged in the circumferential direction of said rotating post;
a rotor mounted on the leading end of said rotating post so that the position of the leading end of said rotating post is at the center of gravity of said vertical axis type wind power station;
two upper and lower arms attached obliquely downward or upward to said rotor and configured to support the two longitudinally upper and lower portions of the blade; and
two intermediate arms attached to said upper and lower arms in vertical symmetry with respect to the center of gravity of said upper and lower arms, and configured to support the two intermediate portions between a longitudinal center and each of the two upper and lower portions of said blade.

29. A vertical axis type wind power station as set forth in claim 28,
wherein if: the longitudinal length of said blade is designated by c; the distance from the upper and lower ends of said blade to the supporting points of said two upper and lower portions is designated by a; and the distance from the supporting points of said two upper and lower supporting portions to said two intermediate portions is designated by b, the supporting points of said two upper and lower portions are positioned within a range of a/c=−0.02 to 0.16, and the supporting points of said two intermediate portions are positioned within a range of b/c=0.18 to 0.37.

30. A vertical axis type wind power station as set forth in claim 29,
wherein said two upper and lower arms and said two intermediate arms are formed of hollow arms having hollow sections.

31. A vertical axis type wind power station as set forth in claim 29,
wherein said two upper and lower arms and said two intermediate arms are formed into a shape having a transversely flattened section.

32. A vertical axis type wind power station as set forth in claim 28,
wherein said rotor used is a tube-shaped rotor, and wherein said upper and lower arms are attached to the upper and lower ends of said rotor.

33. A vertical axis type wind power station comprising:
a rotating post disposed upright by at least two bearings;
an outer tube supporting said at least two bearings;
a plurality of longitudinal blades attached in the circumferential direction to said rotating post; and
an insulating member sandwiched between said at least two bearings and the outer tube of the at least two bearings supporting said rotating post.

34. A vertical axis type wind power station comprising:
a rotating post disposed upright;
a plurality of longitudinal blades attached in the circumferential direction said rotating post;
a tube-shaped rotor arranged concentrically of the center axis of said rotating post and in the vicinity of the upper portion of said rotating post;
an intervening member disposed in aid tube-shaped rotor; and
a bearing configured to support said rotating post rotatably, wherein said tube-shaped rotor is connected to said rotating post through said intervening member in the vicinity of the vertical center in said tube-shaped rotor, and wherein said bearing is arranged near just below said connected position.

35. A vertical axis type wind power station as set forth in claim 34,
wherein said intervening member is positioned at the vertical center position of said tube-shaped rotor.

36. A vertical axis type wind power station as set forth in claim 34,
wherein said bearing is arranged at the vertical center position of said tube-shaped rotor.

37. A vertical axis type wind power station comprising:
a rotating post disposed upright in a tube;
a plurality of longitudinal blades attached in the circumferential direction to said rotating post;
a radial ball bearing arranged between an inner wall of said tube and said rotating post and configured to support said rotating post rotatably and bear a load perpendicular to an axis of rotation;
a thrust ball bearing arranged between the inner wall of said tube and said rotating post and configured to bear a load on an axis of rotation; and
a touchdown ball bearing arranged between the inner wall of said tube and said rotating post and having a clearance from either the inner wall of said tube or said rotating post and configured to bear a load perpendicular to the axis of rotation.

38. A vertical axis type wind power station comprising:
a rotating post disposed upright in a tube;
a plurality of longitudinal blades attached in the circumferential direction to said rotating post;
a bearing arranged between an inner wall of said tube and said rotating post and configured to bear a load whenever said rotating post rocks perpendicularly to the axis of rotation;
a bearing arranged between the inner wall of said tube and said rotating post and configured to bear a load perpendicular to the axis of rotation; and
a bearing arranged between the inner wall of said tube and said rotating post for bearing a load temporarily only when said rotating post rocks perpendicularly to the axis of rotation.

* * * * *